United States Patent
Wang et al.

(10) Patent No.: US 10,756,861 B2
(45) Date of Patent: Aug. 25, 2020

(54) COMMUNICATION METHOD, AND RELATED DEVICE AND SYSTEM

(71) Applicant: HUAWEI TECHNOLOGIES CO., LTD., Shenzhen, Guangdong (CN)

(72) Inventors: Ting Wang, Shanghai (CN); Shengyue Dou, Shanghai (CN); Yuanjie Li, Shanghai (CN); Feng Qian, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/674,186

(22) Filed: Nov. 5, 2019

(65) Prior Publication Data

US 2020/0076553 A1    Mar. 5, 2020

Related U.S. Application Data

(63) Continuation of application No. PCT/CN2018/083096, filed on Apr. 13, 2018.

(30) Foreign Application Priority Data

May 5, 2017 (CN) .......................... 2017 1 0323434
Aug. 24, 2017 (CN) .......................... 2017 1 0732932

(51) Int. Cl.
    *H04B 7/02*    (2018.01)
    *H04L 5/00*    (2006.01)
    (Continued)

(52) U.S. Cl.
    CPC ......... *H04L 5/0035* (2013.01); *H04B 7/0413* (2013.01); *H04L 5/0005* (2013.01);
    (Continued)

(58) Field of Classification Search
    CPC ... H04L 5/0035; H04L 5/0005; H04L 5/0048; H04L 25/0224; H04W 28/06; H04W 28/08; H04B 7/0413
    (Continued)

(56) References Cited

U.S. PATENT DOCUMENTS

2012/0243500 A1*  9/2012  Chandrasekhar ..... H04W 72/02
                                                          370/330
2014/0177547 A1*  6/2014  Guo ...................... H04L 5/0053
                                                          370/329
(Continued)

FOREIGN PATENT DOCUMENTS

CN   102215182 A   10/2011
CN   104581961 A    4/2015
(Continued)

OTHER PUBLICATIONS

3GPP TS 36.213 V14.2.0 (Mar. 2017), 3rd Generation Partnership Project, Technical Specification Group Radio Access Network, Evolved Universal Terrestrial Radio Access (E-UTRA), Physical layer procedures (Release 14),Mar. 2017, 454 pages.

(Continued)

*Primary Examiner* — Tesfaldet Bocure
(74) *Attorney, Agent, or Firm* — Fish & Richardson P.C.

(57) ABSTRACT

Embodiments of this application disclose a communication method, and a related device and system. The method includes: receiving, by a reception point, first indication information, where the first indication information is used to indicate a time-frequency resource location of a first demodulation reference signal of first data; receiving, by the reception point, second indication information, where the second indication information is used to indicate a time-frequency resource location of a second demodulation reference signal; and determining, by the reception point, a time-frequency resource location of the first data based on the time-frequency resource location of the second demodulation reference signal, and demodulating the first data based on the first demodulation reference signal. Receiving performance of the reception point can be improved. On the premise that a resource conflict does not occur, two base (Continued)

stations communicate with a terminal device by using a time-frequency resource allocated by a second base station.

19 Claims, 19 Drawing Sheets

(51) Int. Cl.
    *H04B 7/0413* (2017.01)
    *H04L 25/02* (2006.01)
    *H04W 28/06* (2009.01)
    *H04W 28/08* (2009.01)

(52) U.S. Cl.
    CPC ........ *H04L 5/0048* (2013.01); *H04L 25/0224* (2013.01); *H04W 28/06* (2013.01); *H04W 28/08* (2013.01)

(58) Field of Classification Search
    USPC .................. 375/267, 299, 347; 455/101, 132
    See application file for complete search history.

(56) References Cited

U.S. PATENT DOCUMENTS

| | | | |
|---|---|---|---|
| 2014/0192734 A1 | 7/2014 | Ng et al. | |
| 2014/0355709 A1* | 12/2014 | Liu | H04L 5/0048 375/267 |
| 2016/0255519 A1 | 9/2016 | Cheng et al. | |
| 2017/0237535 A1* | 8/2017 | Park | H04B 7/024 370/329 |
| 2019/0373592 A1* | 12/2019 | Ji | H04L 5/0048 |
| 2019/0393937 A1* | 12/2019 | Kim | H04L 25/0204 |

FOREIGN PATENT DOCUMENTS

| | | |
|---|---|---|
| CN | 105531949 A | 4/2016 |
| EP | 2346201 A2 | 7/2011 |

OTHER PUBLICATIONS

PCT International Search Report and Written Opinion in International Application No. PCT/CN2018/083,096, dated Jun. 28, 2018, 17 pages (With English Translation).

Huawei et al., "Details of QCL assumptions and related RS design considerations",3GPP Draft; R1-1704239, XP051242391,Apr. 2, 2017, 5 pages.

Qualcomm Incorporated, "Enhancement to QCL assumptions for DMRS antenna ports forNCJP",3GPP Draft; R1-1705004,XP051243135, Apr. 2, 2017, 3 pages.

Extended European Search Report issued in European Application No. 18794509.2 dated Mar. 18, 2020, 8 pages.

* cited by examiner

First data

Second demodulation reference signal

Third demodulation reference signal

COMMUNICATION METHOD, AND RELATED DEVICE AND SYSTEM

CROSS-REFERENCE TO RELATED APPLICATIONS

This application is a continuation of International Application No. PCT/CN2018/083096, filed on Apr. 13, 2018, which claims priority to Chinese Patent Application No. 201710323434.9, filed on May 5, 2017, and Chinese Patent Application No. 201710732932.9, filed on Aug. 24, 2017. All of the aforementioned patent applications are hereby incorporated by reference in their entireties.

TECHNICAL FIELD

This application relates to the field of wireless communications technologies, and in particular, to a communication method, and a related device and system.

BACKGROUND

In a multiple-input multiple-output (Multiple-Input Multiple-Output, MIMO) communications system, data, control signaling, and/or other information may be sent and received between devices in the communications system by using a plurality of sources and/or destinations (for example, corresponding to antennas). In some cases, compared with a single-input single-output communications system, the use of the plurality of sources and/or destinations for each shown transmission related to the MIMO communications system can result in a higher data rate, improved signal quality, and other similar advantages.

An example of the MIMO communications system is a coordinated multipoint transmission (Coordinate Multipoint Transmission, CoMP) system. In the transmission system, a plurality of transmission points (Transmission Point, TP) may coordinate, to exchange information with one or more reception points (Reception Point). When the plurality of transmission points coordinate to transmit data to a reception point, one transmission point may send a user-specific demodulation reference signal (DeModulation Reference Signal, DMRS) to the reception point, and the reception point can estimate a channel based on the demodulation reference signal sent by the transmission point, and then receive data sent by the transmission point and demodulate the data. In the prior art, a time-frequency resource location to which the DMRS sent by the transmission point to the reception point is mapped may overlap with a time-frequency resource location to which data sent by another coordinated transmission point to the reception point is mapped. Consequently, the reception point cannot correctly receive the DMRS, and then the reception point cannot correctly estimate the channel. Consequently, data receiving performance of the reception point is degraded, and system performance is degraded.

SUMMARY

This application provides a communication method, and a related device and system, to improve data receiving performance of a reception point.

According to a first aspect, a communication method is provided. The method includes: receiving, by a reception point, first indication information, where the first indication information is used to indicate a time-frequency resource location of a first demodulation reference signal of first data; receiving, by the reception point, second indication information, where the second indication information is used to indicate a time-frequency resource location of a second demodulation reference signal; and determining, by the reception point, a time-frequency resource location of the first data based on the time-frequency resource location of the second demodulation reference signal, and demodulating the first data based on the first demodulation reference signal.

Through the foregoing solution, data receiving performance of the reception point can be improved.

With reference to the first aspect, in some possible implementations, that the second indication information is used to indicate a time-frequency resource location of a second demodulation reference signal includes: the second indication information is used to indicate a time-frequency resource location of a second demodulation reference signal of second data, and the second demodulation reference signal is used to demodulate the second data.

With reference to the first aspect, in some possible implementations, the first data and the first demodulation reference signal are sent by a first transmission point, the second data and the second demodulation reference signal are sent by a second transmission point, and the first transmission point and the second transmission point are in a coordination relationship.

With reference to the first aspect, in some possible implementations, the reception point receives higher layer signaling, where the higher layer signaling carries related information of the time-frequency resource location of the second demodulation reference signal and an identifier corresponding to the related information; and the receiving, by the reception point, second indication information includes: receiving, by the reception point, the second indication information through physical layer signaling, where the second indication information includes at least one first identifier, and the first identifier corresponds to at least one group of related information of the time-frequency resource location of the second demodulation reference signal.

With reference to the first aspect, in some possible implementations, the receiving, by the reception point, second indication information includes:
receiving, by the reception point, the second indication information through physical layer signaling, where the second indication information includes related information of the time-frequency resource location of the second demodulation reference signal.

With reference to the first aspect, in some possible implementations, the determining, by the reception point, a time-frequency resource location of the first data based on the time-frequency resource location of the second demodulation reference signal includes: determining, by the reception point based on the time-frequency resource location of the second demodulation reference signal, a time-frequency resource location of data that is related to the time-frequency resource location of the second demodulation reference signal and that is in the first data, where the data related to the time-frequency resource location of the second demodulation reference signal includes at least one of a code word included in the first data, data of a layer corresponding to the code word included in the first data, and antenna port data that corresponds to a layer and that is included in the first data.

With reference to the first aspect, in some possible implementations, the related information of the time-frequency resource location of the second demodulation reference signal includes a pattern of the second demodulation reference signal and/or antenna port information related to the second demodulation reference signal, and the antenna port information includes a port number of an antenna port and/or a quantity of antenna ports.

With reference to the first aspect, in some possible implementations, the related information of the time-frequency resource location of the second demodulation reference signal includes information about an antenna port group corresponding to the second demodulation reference signal.

With reference to the first aspect, in some possible implementations, the reception point receives third indication information, where the third indication information is used to indicate a time-frequency resource location of a third demodulation reference signal; and the reception point determines the time-frequency resource location of the first data based on the time-frequency resource location of the second demodulation reference signal and the time-frequency resource location of the third demodulation reference signal.

With reference to the first aspect, in some possible implementations, the reception point receives fourth indication information, where the fourth indication information is used to indicate a time-frequency resource location of a fourth demodulation reference signal of the first data; and the reception point demodulates the first data based on the first demodulation reference signal and the fourth demodulation reference signal.

With reference to the first aspect, in some possible implementations, that the third indication information is used to indicate a time-frequency resource location of a third demodulation reference signal includes: the third indication information is used to indicate a time-frequency resource location of a third demodulation reference signal of second data, and the third demodulation reference signal is used to demodulate the second data.

With reference to the first aspect, in some possible implementations, the first data and the fourth demodulation reference signal are sent by a first transmission point, the second data and the third demodulation reference signal are sent by a second transmission point, and the first transmission point and the second transmission point are in a coordination relationship.

With reference to the first aspect, in some possible implementations, the reception point receives higher layer signaling, where the higher layer signaling carries related information of the time-frequency resource location of the third demodulation reference signal and an identifier corresponding to the related information; and the receiving, by the reception point, third indication information includes: receiving, by the reception point, the third indication information through physical layer signaling, where the third indication information includes at least one second identifier, and the second identifier corresponds to at least one group of related information of the time-frequency resource location of the third demodulation reference signal.

With reference to the first aspect, in some possible implementations, the receiving, by the reception point, third indication information includes: receiving, by the reception point, the third indication information through physical layer signaling, where the third indication information includes related information of the time-frequency resource location of the third demodulation reference signal.

With reference to the first aspect, in some possible implementations, the determining, by the reception point, the time-frequency resource location of the first data based on the time-frequency resource location of the second demodulation reference signal and the time-frequency resource location of the third demodulation reference signal includes: determining, by the reception point based on the time-frequency resource location of the second demodulation reference signal, a time-frequency resource location of data that is related to the time-frequency resource location of the second demodulation reference signal and that is in the first data, and determining, based on the time-frequency resource location of the third demodulation reference signal, a time-frequency resource location of data that is related to the time-frequency resource location of the third demodulation reference signal and that is in the first data, where the data related to the time-frequency resource location of the second demodulation reference signal includes at least one of a code word included in the first data, data of a layer corresponding to the code word included in the first data, and antenna port data that corresponds to a layer and that is included in the first data, and the data related to the time-frequency resource location of the third demodulation reference signal includes at least one of the code word included in the first data, the data of the layer corresponding to the code word included in the first data, and the antenna port data that corresponds to a layer and that is included in the first data.

With reference to the first aspect, in some possible implementations, the related information of the time-frequency resource location of the third demodulation reference signal includes a pattern of the third demodulation reference signal and/or antenna port information related to the third demodulation reference signal, and the antenna port information includes a port number of an antenna port and/or a quantity of antenna ports.

With reference to the first aspect, in some possible implementations, the related information of the time-frequency resource location of the third demodulation reference signal includes information about an antenna port group corresponding to the third demodulation reference signal.

With reference to the first aspect, in some possible implementations, the terminal device determines the time-frequency resource location of the third demodulation reference signal based on the time-frequency resource location of the second demodulation reference signal, where a preset mapping relationship exists between the time-frequency resource location of the third demodulation reference signal and the time-frequency resource location of the second demodulation reference signal.

According to a second aspect, a communication method is provided. The method includes: determining, by a first transmission point, a time-frequency resource location of first data based on a time-frequency resource location of a second demodulation reference signal; and sending, by the first transmission point, first indication information to a reception point, where the first indication information is used to indicate a time-frequency resource location of a first demodulation reference signal of the first data.

With reference to the second aspect, in some possible implementations, the first transmission point receives second indication information sent by a second transmission point, where the second indication information is used to indicate the time-frequency resource location of the second demodulation reference signal.

With reference to the second aspect, in some possible implementations, the first transmission point sends higher layer signaling to the reception point, where the higher layer signaling carries related information of the time-frequency resource location of the first demodulation reference signal and an identifier corresponding to the related information; and the first transmission point sends physical layer signaling to the reception point, where the physical layer signaling carries the first indication information, the first indication information includes at least one first identifier, and the first identifier corresponds to at least one group of related information of the time-frequency resource location of the first demodulation reference signal.

With reference to the second aspect, in some possible implementations, the first transmission point sends the first indication information through the physical layer signaling, where the first indication information includes related information of the time-frequency resource location of the first demodulation reference signal.

With reference to the second aspect, in some possible implementations, the related information of the time-frequency resource location of the first demodulation reference signal includes a pattern of the first demodulation reference signal and/or antenna port information related to the first demodulation reference signal, and the antenna port information includes a port number of an antenna port and/or a quantity of antenna ports.

With reference to the second aspect, in some possible implementations, the related information of the time-frequency resource location of the first demodulation reference signal includes information about an antenna port group corresponding to the first demodulation reference signal.

According to a third aspect, a communication method is provided. The method includes: sending, by a second transmission point, second indication information to a reception point, where the second indication information is used to indicate a time-frequency resource location of a second demodulation reference signal.

With reference to the third aspect, in some possible implementations, the second transmission point sends the second indication information to a first transmission point.

With reference to the third aspect, in some possible implementations, the second indication information is used to indicate a time-frequency resource location of a second demodulation reference signal of second data, and the second demodulation reference signal is used to demodulate the second data.

With reference to the third aspect, in some possible implementations, the second transmission point sends higher layer signaling to the reception point, where the higher layer signaling carries related information of the time-frequency resource location of the second demodulation reference signal and an identifier corresponding to the related information; and the second transmission point sends physical layer signaling to the reception point, where the physical layer signaling carries the second indication information, the second indication information includes at least one second identifier, and the second identifier corresponds to at least one group of related information of the time-frequency resource location of the second demodulation reference signal.

With reference to the third aspect, in some possible implementations, the second transmission point sends the second indication information through the physical layer signaling, where the second indication information includes related information of the time-frequency resource location of the second demodulation reference signal.

With reference to the third aspect, in some possible implementations, data that is related to the time-frequency resource location of the second demodulation reference signal and that is in the first data includes at least one of a code word included in the first data, data of a layer corresponding to the code word included in the first data, and antenna port data that corresponds to a layer and that is included in the first data.

With reference to the third aspect, in some possible implementations, the related information of the time-frequency resource location of the second demodulation reference signal includes a pattern of the second demodulation reference signal and/or antenna port information related to the second demodulation reference signal, and the antenna port information includes a port number of an antenna port and/or a quantity of antenna ports.

With reference to the third aspect, in some possible implementations, the related information of the time-frequency resource location of the second demodulation reference signal includes information about an antenna port group corresponding to the second demodulation reference signal.

With reference to the third aspect, in some possible implementations, the second transmission point sends third indication information to the reception point, where the third indication information is used to indicate a time-frequency resource location of third demodulation reference information.

With reference to the third aspect, in some possible implementations, the second transmission point sends the third indication information to the first transmission point.

With reference to the third aspect, in some possible implementations, the third indication information is used to indicate a time-frequency resource location of a third demodulation reference signal of second data, and the third demodulation reference signal is used to demodulate the second data.

With reference to the third aspect, in some possible implementations, the second transmission point sends higher layer signaling to the reception point, where the higher layer signaling carries related information of the time-frequency resource location of the third demodulation reference signal and an identifier corresponding to the related information; and the second transmission point sends physical layer signaling to the reception point, where the physical layer signaling carries the third indication information, the third indication information includes at least one second identifier, and the second identifier corresponds to at least one group of related information of the time-frequency resource location of the third demodulation reference signal.

With reference to the third aspect, in some possible implementations, the second transmission point sends the third indication information through the physical layer signaling, where the third indication information includes related information of the time-frequency resource location of the third demodulation reference signal.

With reference to the third aspect, in some possible implementations, data that is related to the time-frequency resource location of the second demodulation reference signal and that is in the first data includes at least one of a code word included in the first data, data of a layer corresponding to the code word included in the first data, and antenna port data that corresponds to a layer and that is included in the first data.

With reference to the third aspect, in some possible implementations, the related information of the time-frequency resource location of the third demodulation reference signal includes a pattern of the third demodulation reference signal and/or antenna port information related to the third demodulation reference signal, and the antenna port information includes a port number of an antenna port and/or a quantity of antenna ports.

With reference to the third aspect, in some possible implementations, the related information of the time-frequency resource location of the third demodulation reference signal includes information about an antenna port group corresponding to the third demodulation reference signal.

In a possible design, a reception point provided in this application may include a corresponding module configured to perform a behavior of the reception point in the foregoing method design. The module may be software and/or hardware.

In a possible design, a first transmission point provided in this application may include a corresponding module configured to perform a behavior of the first transmission point in the foregoing method design. The module may be software and/or hardware.

In a possible design, a second transmission point provided in this application may include a corresponding module configured to perform a behavior of the second transmission point in the foregoing method design. The module may be software and/or hardware.

According to still another aspect of this application, a computer-readable storage medium is provided. The computer-readable storage medium stores an instruction. When the instruction is run on a computer, the computer is enabled to perform the method according to the foregoing aspects.

According to still another aspect of this application, a computer program product including an instruction is provided. When the instruction is run on a computer, the computer is enabled to perform the method according to the foregoing aspects.

According to still another aspect of this application, a coordinated multipoint transmission system is provided. The system can perform the method according to the foregoing aspects. For an apparatus included in the system, refer to the apparatus according to the foregoing aspects.

DESCRIPTION OF EMBODIMENTS

Terms used in implementations of this application are merely intended to explain specific embodiments of this application rather than limit this application.

For ease of understanding the embodiments of this application, a coordinated multipoint transmission system related to the embodiments of this application and a related application scenario are first described.

Figure 1:
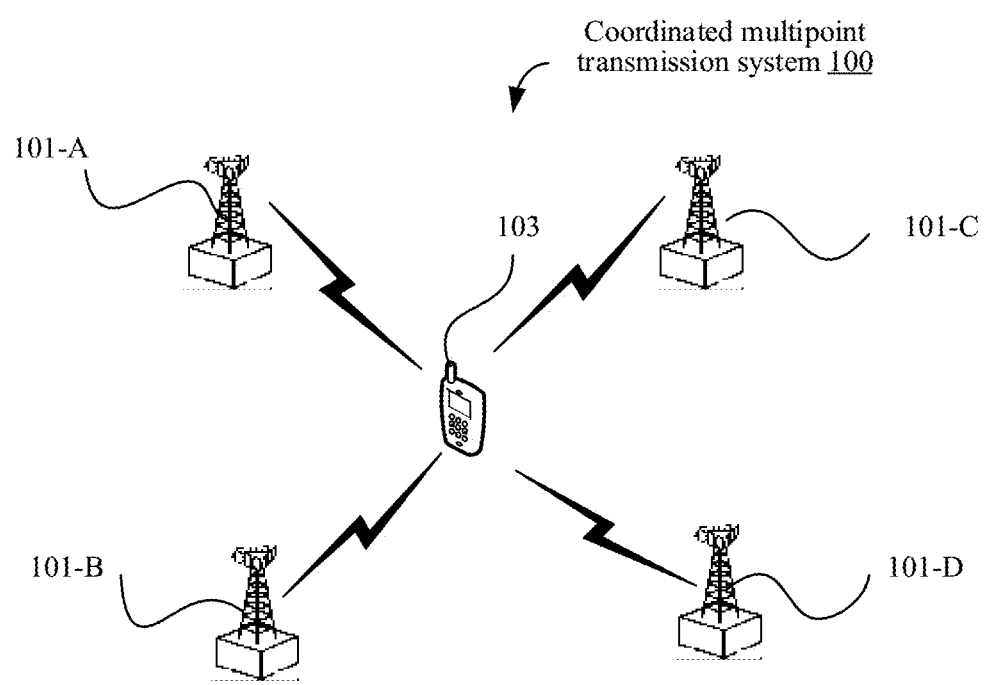
FIG. 1 is a schematic architectural diagram of a coordinated multipoint transmission system according to an embodiment of this application.

FIG. 1 shows a coordinated multipoint transmission system 100 related to this application. The coordinated multipoint transmission system includes transmission points 101-A to 101-D and a reception point 103. The system 100 can implement a method embodiment of the embodiments of this application.

In some embodiments of this application, the transmission points 101-A to 101-D may be network devices, and the reception point 103 is a terminal.

In some other embodiments of this application, the transmission points 101-A to 101-D may be terminals, and the reception point 103 is a network device.

A network device described in the embodiments of this application includes, for example, a base station (for example, an access point), and may be a device communicating with a wireless terminal through one or more sectors on an air interface in an access network. The base station may be configured to mutually convert a received over-the-air frame and an Internet Protocol (IP) packet and serve as a router between the terminal and a remaining portion of the access network, where the remaining portion of the access network may include an IP network. The base station may coordinate attribute management of the air interface. For example, the base station may include an evolved NodeB (eNB or e-NodeB, evolutional Node B) in an LTE system or an LTE-advanced (LTE-Advanced, LTE-A) system, or a micro/pico eNB (micro/pico eNB) in an LTE system or LTE-A system, or may include a next generation node B (next generation node B, gNB) in an NR system, or a transmission point (transmission point, TP), or may be a transmission and reception point (transmission and receiver point, TRP). This is not limited in the embodiments of this application.

The terminal described in the embodiments of this application is a device providing voice and/or data connectivity to a user, and may include, for example, a handheld device having a wireless connection function or a processing device connected to a wireless modem. The terminal may communicate with a core network through a radio access network (Radio Access Network, RAN), and exchange voice and/or data with the RAN. The terminal may include an access point (Access Point, AP), user equipment (User Equipment, UE), a wireless terminal, a mobile terminal, a subscriber unit (Subscriber Unit), a subscriber station (Subscriber Station), a mobile station (Mobile Station), a mobile console (Mobile), a remote station (Remote Station), an access point (Access Point, AP), a remote terminal (Remote Terminal), an access terminal (Access Terminal), a user terminal (User Terminal), a user agent (User Agent), a user device (User Device), or the like. For example, the terminal may include a mobile telephone (or referred to as a "cellular" phone), a computer having a mobile terminal, a portable, pocket-sized, handheld, computer built-in, or in-vehicle mobile apparatus, an intelligent wearable device, or the like. For example, it may be a device such as a personal communication service (Personal Communication Service, PCS) phone, a cordless telephone set, a session initiation protocol (SIP) phone, a wireless local loop (Wireless Local Loop, WLL) station, or a personal digital assistant (Personal Digital Assistant, PDA), a smartwatch, a smart helmet, smart glasses, or a smart band. The terminal may be distributed in the coordinated multipoint transmission system 100, or may be distributed on an edge location of a cell covered by two network devices. The terminal may be immobile or mobile.

In the coordinated multipoint transmission system 100, a coordination relationship is established, for at least one reception point, between at least two of the transmission points 101-A to 101-D, and information such as data or signaling may be transmitted to the reception point 103 based on a coordination protocol. One or more antenna ports are configured for the transmission points 101-A to 101-D and the reception point 103, and signal transmission can be implemented by using a MIMO technology. Data transmitted by any one of the transmission points 101-A to 101-D to the reception point may include a code word (Code Word, CW), or data of a layer (layer) corresponding to a code word, or data belonging to each antenna port (port) at a layer (layer) corresponding to a code word. Herein, data of a layer (layer) corresponding to a code word means that the code word undergoes processing (for example, code block segmentation, code block cascade, scrambling, or modulation), and then undergoes layer mapping, and the code word is mapped to at least one layer, that is, each layer to which the code word is mapped includes all or some data of the code word. Herein, data belonging to each antenna port at a layer corresponding to a code word means that one layer to which the code word is mapped corresponds to at least one antenna port, that is, each antenna port corresponding to the layer includes all or some of data of the layer. Certainly, the transmission points 101-A to 101-D may coordinate to transmit data. For example, the transmission point 101-A and the transmission point 101-B can coordinate to transmit different code words in data, and when the data includes a first code word and a second code word, the transmission point 101-A may transmit the first code word through coordination, and correspondingly the transmission point 101-B may transmit the second code word. Alternatively, the transmission point 101-A and the transmission point 101-B can coordinate to transmit data of different layers of a same code word in data. For example, if one code word is mapped to data of a first layer and data of a second layer, the data of the first layer to which the code word is mapped may be transmitted through the transmission point 101-A, and the data of the second layer to which the code word is mapped may be transmitted through the transmission point 101-B. Alternatively, the transmission point 101-A and the transmission point 101-B can coordinate to transmit data of different antenna ports corresponding to a same layer in a same code word in data. For example, if data of a first layer to which one code word is mapped belongs to a first antenna port and a second antenna port separately, the transmission point 101-A transmits data belonging to the first antenna port, and the transmission point 101-B transmits data belonging to the second antenna port.

In the prior art, the transmission point 101-A sends data to the reception point 130, a time-frequency resource occupied by the data may be a resource block (Resource Block, RB), and the resource block includes a plurality of resource elements.

The transmission point 101-B sends a demodulation reference signal to the reception point 103, and a time-frequency resource occupied by the demodulation reference signal may be one or more discrete resource elements (Resource Element, RE); and the resource element is a subcarrier in frequency domain and a symbol in time domain. The RE is a minimum time-frequency resource unit for transmitting data or a signal. The reception point 103 can estimate, through the demodulation reference signal sent by the transmission point 101-B, a signal used to receive data sent by the transmission point 101-B, and then receive the data sent by the transmission point 101-B.

The time-frequency resource occupied by the data transmitted by the transmission point 101-A conflicts with the time-frequency resource occupied by the demodulation reference signal transmitted by the transmission point 101-B, that is, the RE occupied by the demodulation reference signal may be in the RB occupied by the data. In this scenario, the data transmitted by the transmission point 101-A and the demodulation reference signal transmitted by the transmission point 101-B interfere with each other, the reception point 103 cannot correctly receive the demodulation reference signal transmitted by the transmission point 101-B, and a transmission channel of the transmission point 101-B is estimated inaccurately. Consequently, the reception point 103 cannot correctly receive the data transmitted by the transmission point 101-B, and performance of the system 100 is degraded.

For the foregoing application scenario and existing technical defects, technical solutions of the embodiments of this application are described below with reference to the accompanying drawings.

Figure 2:
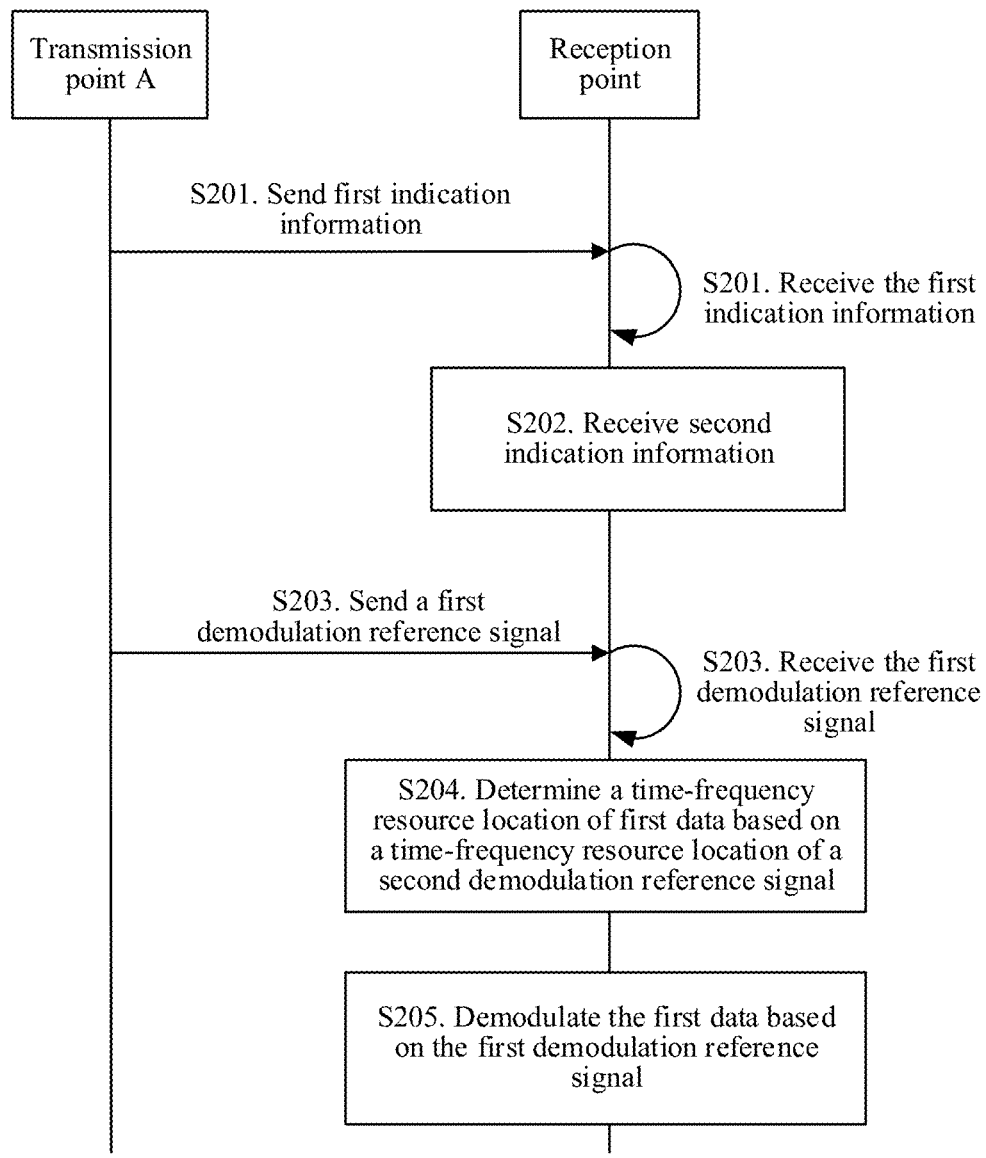
FIG. 2 is a schematic flowchart of a communication method according to an embodiment of this application.

FIG. 2 is a schematic flowchart of a communication method according to an embodiment of this application. As shown in FIG. 2, the method includes at least the following steps.

Step S201. A transmission point A sends first indication information to a reception point, where the first indication information is used to indicate a time-frequency resource location of a first demodulation reference signal of first data; and the reception point receives the first indication information.

In some possible implementations, the transmission point A sends the first indication information to the reception point, where the first indication information is used to indicate the time-frequency resource location of the first demodulation reference signal of the first data. The first data is data that the transmission point A needs to send to the reception point. The reception point can receive the first indication information; and can determine the time-frequency resource location of the first demodulation reference signal according to the first indication information, then receive the first demodulation reference signal based on the time-frequency resource location of the first demodulation reference signal, and demodulate the first data based on the first demodulation reference signal.

While transmitting data (for example, the first data) to the reception point, the transmission point A may send the first indication information to the reception point; or before or after transmitting the first data to the reception point, the transmission point A may send the first indication information to the reception point. A sending time at which the transmission point A sends the first indication information is not specifically limited in this embodiment of this application.

The data (for example, the first data) sent by the transmission point A to the reception point may carry the first indication information, or control signaling sent by the transmission point A to the reception point may carry the first indication information. For example, when the transmission point is a base station, downlink control information (Downlink Control Information, DCI) sent by the transmission point A to the reception point carries the first indication information.

Step S202. The reception point receives second indication information, where the second indication information is used to indicate a time-frequency resource location of a second demodulation reference signal.

In some possible embodiments, the reception point can receive the second indication information, where the second indication information is used to indicate the time-frequency resource location of the second demodulation reference signal. In this embodiment of this application, the second demodulation reference signal may be specific to at least one piece of data transmitted by at least one transmission point in a coordinated multipoint transmission system to the reception point. For example, the second demodulation reference signal may be specific to second data transmitted by a transmission point B in the coordinated multipoint transmission system to the reception point; or the second demodulation reference signal may be specific to third data transmitted by the transmission point A to the reception point, and the third data is different from the first data, where that the third data is different from the first data includes: a time-frequency resource location occupied by the third data is different from that occupied by the first data, data content of the third data is different from that of the first data, or the like. Alternatively, the second demodulation reference signal may be not specific to data, and the time-frequency resource location of the second demodulation reference signal is predefined by the coordinated multipoint transmission system. To be specific, the time-frequency resource location of the second demodulation reference signal is not specific to one time of particular data transmission, but is universal in data transmission, and the time-frequency resource location of the second demodulation reference signal may be universal for one or more transmission points in the coordinated multipoint transmission system.

In some possible implementations, the second indication information that is used to indicate the time-frequency resource location of the second demodulation reference signal and that is received by the reception point may be sent by a transmission point that needs to transmit data. For example, if the transmission point B needs to transmit the second data, where the second demodulation reference signal is used to demodulate the second data, the transmission point B sends the second indication information to the reception point. Alternatively, the second indication information may be uniformly sent by one transmission point after a plurality of coordinated transmission points make an agreement on a requirement of sending indication information once or each time. A transmission point transmitting the second indication information is not specifically limited in this embodiment of this application.

In some possible implementations, after the reception point receives the first indication information sent by the transmission point A, the reception point may request to obtain the second indication information from the transmission point A or a transmission point having a coordination relationship with the transmission point A; after a transmission point having a coordination relationship with the transmission point A learns that the transmission point A needs to send the first data to the reception point, the transmission point is triggered to send the second indication information to the reception point; a transmission point having a coordination relationship with the transmission point A receives a request of the transmission point A, and the transmission point is triggered to send the second indication information to the reception point; or after the transmission point A sends the first indication information, the second indication information is sent to the reception point.

Step S203. The transmission point A sends the first demodulation reference signal to the reception point, and the reception point receives the first demodulation reference signal on the time-frequency resource location of the first demodulation reference signal according to the first indication information.

In some possible implementations, after the reception point receives the first indication information, the reception point can determine the time-frequency resource location of the first demodulation reference signal according to the first indication information, the transmission point A may send the first demodulation reference signal to the reception point, and the reception point can receive the first demodulation reference signal on the corresponding time-frequency resource location based on the learned time-frequency resource location of the first demodulation reference signal. The reception point receives the first demodulation reference signal to estimate a received signal of the first data. Optionally, the reception point may determine a time-frequency resource location of the first data with reference to a cell-specific reference signal (Cell Reference Signal) indicated by the transmission point A.

Step S204. The reception point determines a time-frequency resource location of the first data based on the time-frequency resource location of the second demodulation reference signal.

Figure 3A:
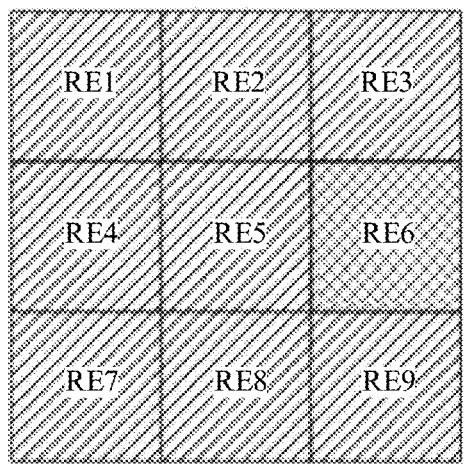
FIG. 3A and FIG. 3B are a schematic diagram of locations on which REs carry data and a second demodulation reference signal when some reception points receive data according to an embodiment of this application.
Figure 3A:
Figure 3B:
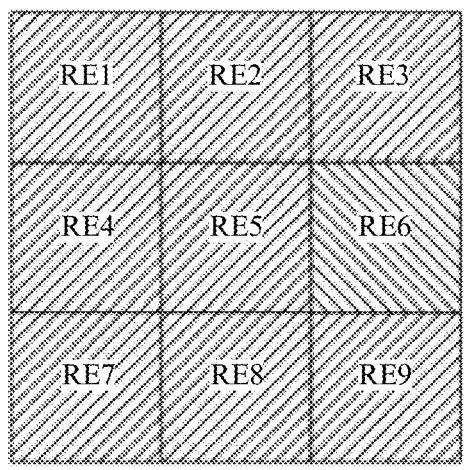
Figure 3B:

In some possible implementations, after receiving the second indication information, the reception point can determine the time-frequency resource location of the second demodulation reference signal according to the second indication information, and then the reception point can determine the time-frequency resource location of the first data based on the time-frequency resource location of the second demodulation reference signal. Herein, an example in which the reception point determines the time-frequency resource location of the first data is described with reference to FIG. 3A and FIG. 3B. As shown in FIG. 3A, the reception point can determine a location of an RB of the first data, and the RB includes an RE 1 to an RE 9, where the RE 1 to the RE 9 jointly carry the first data. The reception point has determined that the RE 6 carries the second demodulation reference signal, that is, the time-frequency resource location of the second demodulation reference signal is the RE 6. In other words, the RE 6 carries data in the first data, and also carries the second demodulation reference signal. The reception point determines that time-frequency resource locations of the first data are the RE 1 to the RE 5 and the RE 7 to the RE 9. After determining the time-frequency resource locations of the first data, the reception point receives data on these time-frequency resource locations. As shown in FIG. 3B, the reception point can determine a location of an RB of the first data, and the RB includes an RE 1 to an RE 9, where the REs except the RE 6 jointly carry the first data. The reception point has determined that the RE 6 carries the second demodulation reference signal. To be specific, the time-frequency resource location of the second demodulation reference signal is the RE 6. Therefore, the reception point determines that time-frequency resource locations of the first data are the RE 1 to the RE 5 and the RE 7 to the RE 9. After determining the time-frequency resource locations of the first data, the reception point receives data on these time-frequency resource locations. To sum up, if the reception point receives the second indication information, the reception point may learn that the second demodulation reference signal is carried on the RE 6, and the first data is not mapped to the RE 6, thereby preventing the reception point from receiving the first data on the RE 6, to perform normal data rate matching and improve data receiving performance.

Optionally, the reception point may first determine data related to the time-frequency resource location of the second demodulation reference signal, and then determine a time-frequency resource location of the related data. If the first data includes a plurality of code words, that is, a minimum data unit of the first data is a code word, one or more code words related to the time-frequency resource location of the second demodulation reference signal may be first determined, and then a time-frequency resource location of the one or more code words is determined based on the time-frequency resource location of the second demodulation reference signal. If the first data includes data of layers corresponding to a plurality of code words, that is, a minimum data unit of the first data is a layer, data of one or more layers related to the time-frequency resource location of the second demodulation reference signal may be first determined, and then a time-frequency resource location of the data of the one or more layers is determined based on the time-frequency resource location of the second demodulation reference signal. If the first data includes antenna port data corresponding to a plurality of layers, that is, a minimum data unit of the first data is an antenna port, one or more pieces of antenna port data related to the time-frequency resource location of the second demodulation reference signal may be first determined, and then a time-frequency resource location of the one or more pieces of antenna port data is determined based on the time-frequency resource location of the second demodulation reference signal.

In some possible implementations, if the reception point determines that the RE 6 carries data, and the data belongs to the first data, the reception point may request the transmission point to perform retransmission, or request the transmission point to map the data on the time-frequency resource location to another time-frequency resource location, or choose to ignore the data on the time-frequency resource location. Further, optionally, after receiving the first data, the reception point sends a receiving report to the transmission point, to notify the transmission point that the data on the RE 6 is not received.

Step S205. The reception point demodulates the first data based on the first demodulation reference signal.

In some possible implementations, after receiving the first data, the reception point may demodulate the first data based on the first demodulation reference signal.

It should be noted that, an order of related execution steps is not specifically limited in this embodiment of this application. For example, the transmission point B may simultaneously receive the first indication information and the second indication information, that is, step S201 and step S202 are performed in parallel; or step S204 is performed before step S203.

It may be learned that, in this embodiment of this application, the reception point can determine, by receiving the first indication information, the time-frequency resource location of the first demodulation reference signal of the first data; and the reception point can determine, by receiving the second indication information, the time-frequency resource location of the second demodulation reference signal, and the reception point can determine the time-frequency resource location of the first data based on the time-frequency resource location of the second demodulation reference signal, so that the time-frequency resource location of the first data is excluded from the time-frequency resource location of the second demodulation reference signal, and further receiving interference from the reception point to the first data and the second demodulation reference signal can be avoided, to determine the time-frequency resource location of the first data, perform correct data rate matching, and improve receiving performance of the reception point.

Figure 4:
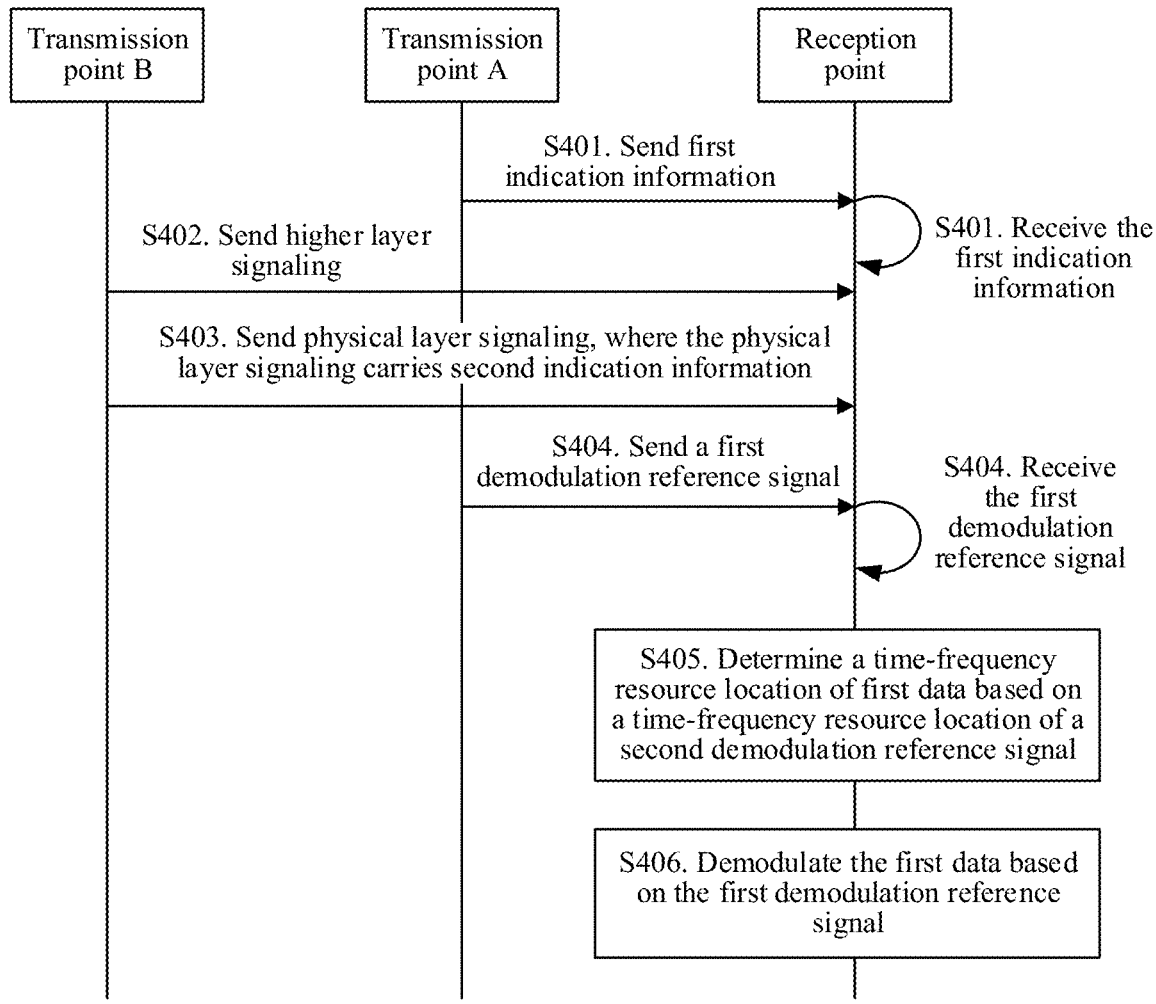
FIG. 4 is a schematic flowchart of another communication method according to an embodiment of this application.

FIG. 4 is a schematic flowchart of another communication method according to an embodiment of this application. As shown in FIG. 4, the method includes the following steps.

Step S401. A transmission point A sends first indication information to a reception point, where the first indication information is used to indicate a time-frequency resource location of a first demodulation reference signal of first data; and the reception point receives the first indication information.

Step S402. A transmission point B sends higher layer signaling to the reception point, where the higher layer signaling carries related information of the time-frequency resource location of the second demodulation reference signal and an identifier corresponding to the related information.

Step S403. The transmission point B sends physical layer signaling to the reception point, and the reception point receives second indication information through the physical layer signaling, where the second indication information includes at least one first identifier, and the first identifier corresponds to at least one group of related information of the time-frequency resource location of the second demodulation reference signal.

In some possible implementations, the transmission point B may first send the higher layer signaling such as radio resource control (Radio Resource Control, RRC) signaling or broadcast signaling to the reception point, where the higher layer signaling carries the related information of the time-frequency resource location of the second demodulation reference signal and the identifier corresponding to the related information.

In some possible implementations, first higher layer signaling carries the related information of the time-frequency resource location of the second demodulation reference signal and the identifier corresponding to the related information. The first higher layer signaling may carry at least one group of related information of the time-frequency resource location of the second demodulation reference signal, and an identifier corresponding to the related information. A relationship between related information and an identifier is not specifically limited in this embodiment of this application. For example, each group of related information corresponds to one identifier, or a plurality of groups of related information correspond to one identifier. For example, the first higher layer signaling may carry related information of all time-frequency resource locations of the second demodulation reference signal, the first higher layer signaling may carry a group of related information of the time-frequency resource location of the second demodulation reference signal, or the first higher layer signaling may carry one or more groups of related information, related to the first data, of the time-frequency resource location of the second demodulation reference signal. After receiving the related information and the identifier corresponding to the related information that are carried in the first higher layer signaling, the reception point may store the related information and the identifier corresponding to the related information.

The first higher layer signaling corresponds to at least one piece of physical layer signaling, and the physical layer signaling corresponding to the first higher layer signaling includes at least one identifier carried in the first higher layer signaling. In other words, the reception point receives the second indication information through the physical layer signaling, where the second indication information includes at least one identifier. The reception point may determine, based on the received at least one identifier, related information corresponding to the identifier, and then determine the time-frequency resource location of the second demodulation reference signal based on the determined related information. Herein, if the transmission point is a base station, the physical layer signaling may be control signaling such as DCI.

In some possible implementations, the second higher layer signaling can carry one or more groups of related information of a time-frequency resource location of at least one demodulation reference signal. For example, one piece of second higher layer signaling may carry one or more groups of related information of the time-frequency resource location of the first demodulation reference signal and one or more groups of related information of the time-frequency resource location of the second demodulation reference signal. For another example, the second higher layer signaling can carry one or more groups of related information of time-frequency resource locations of all demodulation reference signals sent by transmission points in a coordinated multipoint transmission system, and the second higher layer signaling is negotiated by the transmission points, and transmitted uniformly by one transmission point to carry the one or more groups of related information of the time-frequency resource locations of the demodulation reference signals. After receiving the related information and the identifier corresponding to the related information that are carried in the second higher layer signaling, the reception point may store the related information and the identifier corresponding to the related information.

The second higher layer signaling corresponds to at least one piece of physical layer signaling. The physical layer signaling corresponding to the second higher layer signaling includes at least one identifier, and optionally may include an identifier of a demodulation reference signal related to the at least one identifier. For example, one piece of physical layer signaling corresponding to the second higher layer signaling may include the first identifier and an identifier of the first demodulation reference signal, and indicate that the first identifier is related to the first demodulation reference signal; and may include a second identifier and an identifier of the second demodulation reference signal, and indicate that the second identifier is related to the second demodulation reference signal. In other words, the reception point can simultaneously receive the first indication information and the second indication information through the physical layer signaling. The reception point may determine, based on the received at least one identifier, related information corresponding to the identifier, and then determine the time-frequency resource locations of the first demodulation reference signal and the second demodulation reference signal based on the determined related information. Herein, if the transmission point is a base station, the physical layer signaling may be control signaling such as DCI.

In this embodiment of this application, optionally, the higher layer signaling such as RRC signaling includes one or more groups of data resource mapping indication (PDSCH-RE-MappingConfig) information, the data resource mapping indication information includes identification information (pdsch-RE-MappingConfigId) of the data resource mapping indication information and the related information of the time-frequency resource location of the second DMRS (the second demodulation reference signal), and the related information may indicate, for example, a pattern (DMRS pattern) of a demodulation reference signal and/or an antenna port (DMRS port) of a demodulation reference signal.

A specific signaling implementation is as follows:

```
PDSCH-RE-MappingConfig::=      SEQUENCE {
    pdsch-RE-MappingConfigId    identification information of data
    resource mapping indication information
    DMRS ports         ENUMERATED {7, 8, 9, 10, 11, 12, 13, 14,
                                   spare1},
    and/or
    DMRS pattern       ENUMERATED {pattern 1, pattern 2};
    or
    DMRS port group  ENUMERATED {group number 1, group
                                   number 2, ...},
    }
}
```

Based on the foregoing signaling implementation, content included in a type of data resource mapping indication information in RRC signaling is shown. The data resource mapping indication information includes identification information (pdsch-RE-MappingConfigId) of the data resource mapping indication information and the related information of the time-frequency resource location of the second DMRS, and the related information herein includes DMRS ports and/or a DMRS pattern; or a DMRS port group. Herein, the DMRS ports represent antenna port information of a DMRS (for example, the antenna port information herein includes a port number of an antenna port); the DMRS pattern represents a DMRS pattern; or the DMRS port group represents information about an antenna port group of a DMRS. For the related information of the time-frequency resource location of the second DMRS, refer to the following specific description in this application.

In this embodiment of this application, optionally, DCI specifically indicates a group of data resource mapping indication information that is configured through RRC. For example, identification information (for example, pdsch-RE-MappingConfigId) of data resource mapping indication information configured in the RRC signaling may be indicated through bits of a data resource mapping and quasi-co-location indicator (PDSCH RE Mapping and Quasi-Co-Location Indicator, PQI) field in the DCI. For a specific implementation, refer to Table 1. In Table 1, an example in which two bits represent a data resource mapping and quasi-co-location indicator field is described.

TABLE 1

| Data resource mapping and quasi-co-location indicator field (bit value) | Description |
| --- | --- |
| 00 | Identifier 1 of data resource mapping indication information |
| 01 | Identifier 2 of data resource mapping indication information |
| 10 | Identifier 3 of data resource mapping indication information |
| 11 | Identifier 4 of data resource mapping indication information |

Herein, the data resource mapping and quasi-co-location indicator field may also be understood as a specific implementation of the second indication information carried in the DCI. The second indication information indicates a corresponding identifier, and then can determine the related information of the time-frequency resource location of the second demodulation reference signal, where the related information corresponds to the identifier and is in the RRC. For example, in the foregoing example of the RRC signaling, the identification information of the data resource mapping indication information is the identifier 1, and the bit value of the data resource mapping and quasi-co-location indicator field in the DCI is "00", so that it may be determined that the DCI indicates the related information that is of the time-frequency resource location of the second demodulation reference signal and that is in the identifier 1, and then it may be determined that the related information is DMRS ports ENUMERATED {7, 8, 9, 10, 11, 12, 13, 14, spare1}, and/or DMRS pattern ENUMERATED {pattern 1, pattern 2}; or DMRS port group ENUMERATED {group number 1, group number 2, . . . }.

It may be learned that, provided that the reception point obtains the time-frequency resource location, in the data resource mapping indication information, of the second DMRS, the reception point may learn that data is not mapped to the time-frequency resource location of the second DMRS. To be specific, the reception point does not receive data on the time-frequency resource location of the second DMRS. In this embodiment of this application, the higher layer signaling received by the reception point may be the first higher layer signaling or the second higher layer signaling. This is not specifically limited herein. The physical layer signaling received by the reception point is physical layer signaling corresponding to higher layer signaling. Optionally, the transmission point B may directly receive the second indication information through physical layer signaling, where the second indication information includes the related information of the time-frequency resource location of the second demodulation reference signal. To be specific, the physical layer signaling can indicate the related information of the time-frequency resource location of the second demodulation reference signal. It should be understood that, the physical layer signaling may include only one or more groups of related information of the time-frequency resource location of the second demodulation reference signal; or the physical layer signaling may include one or more groups of related information of a time-frequency resource location of another demodulation reference signal. For example, the physical layer signaling may include both one or more groups of related information of the time-frequency resource location of the first demodulation reference signal and one or more groups of related information of the time-frequency resource location of the second demodulation reference signal.

In this embodiment of this application, optionally, the related information of the time-frequency resource location of the second demodulation reference signal may be indicated in the physical layer signaling through a data mapping indication information field. For example, the data mapping indication information field may be "DMRS pattern and/or port(s) for PDSCH RE mapping". DMRS pattern and/or DMRS port information is indicated through a bit value in the field, and a specific signaling example is as follows:

DMRS pattern and/or port(s) for PDSCH RE mapping

In this embodiment of this application, optionally, the first indication information and the second indication information may be both sent by the transmission point A, or may be both sent by the transmission point B; the transmission point A sends the first indication information, and the transmission point B sends the second indication information; the transmission point A sends the second indication information, and the transmission point B sends the first indication information; or the first indication information and the second indication information may be sent by a transmission point C. This is not specifically limited herein.

To sum up, in some possible implementations, the related information of the time-frequency resource location of the second demodulation reference signal may include a pattern of the second demodulation reference signal (DMRS Pattern) and/or antenna port (DMRS Port) information related to the second demodulation reference signal. The antenna port information includes a port number of an antenna port and/or a quantity of antenna ports.

During specific implementation, if the pattern of the second demodulation reference signal corresponds to the antenna port information, the higher layer signaling may carry any one of the pattern of the second demodulation reference signal or the antenna port information, and an identifier corresponding to the any one of the pattern of the second demodulation reference signal or the antenna port information. Alternatively, the physical layer signaling directly carries any one of the pattern of the second demodulation reference signal or the antenna port information. For example, a pattern 1 (pattern 1) of the second demodulation reference signal corresponds to port numbers {7, 8, 11, 13} of antenna ports, and a pattern 2 (pattern 2) of the second demodulation reference signal corresponds to port numbers {9, 10, 12, 14} of antenna ports. Therefore, in the physical layer signaling, a pattern or a port number of an antenna port may be indicated through one bit (bit). As shown in Table 2A, in the physical layer signaling, the pattern 1 may be indicated through a bit "0", and the pattern 2 may be indicated through a bit "1". Certainly, other indication manners may be further included. For example, the pattern 2 is indicated through a bit "0", and the pattern 1 is indicated through a bit "1". As further shown in Table 2B, in the physical layer signaling, port numbers {7, 8, 11, 13} of antenna ports may be indicated through a bit "0", and port numbers {9, 10, 12, 14} of antenna ports may be indicated through a bit "1". Certainly, other indication manners are further included. For example, in the physical layer signaling, port numbers {7, 8, 11, 13} of antenna ports may be indicated through a bit "1", and port numbers {9, 10, 12, 14} of antenna ports may be indicated through a bit "0". Herein, a bit value, indication information, and a correspondence between a bit value and indication information are only an example, and another bit value, another indication information, and another correspondence between a bit value and indication information may alternatively be used. This is not specifically limited herein.

TABLE 2A

| Bit value | DMRS pattern |
| --- | --- |
| 0 | Pattern 1 |
| 1 | Pattern 2 |

TABLE 2B

| Bit value | Port number of a DMRS antenna port |
| --- | --- |
| 0 | 7, 8, 11, 13 |
| 1 | 9, 10, 12, 14 |

During specific implementation, if a DMRS pattern does not correspond to a port number of a DMRS antenna port, the related information in the higher layer signaling or the physical layer signaling needs to include both a DMRS pattern and a port number of a DMRS antenna port. A DMRS pattern and a port number of a DMRS antenna port may be separately indicated, or a DMRS pattern and a port number of a DMRS antenna port may be jointly indicated. Two cases of separate indication and joint indication are respectively described below by using examples.

For example, in the physical layer signaling, a DMRS pattern may be indicated through one bit. Referring to Table 3A, the pattern 1 is indicated through one bit "0", and the pattern 2 is indicated through one bit "1". Alternatively, the pattern 1 is indicated through a bit "1", and the pattern 2 is indicated through a bit "0". Antenna port information of a DMRS may be indicated through two bits. Referring to Table 3B, bits "00" are used to indicate a port number {7} or indicate that a quantity of ports is 1; bits "01" are used to indicate port numbers {7, 8} or indicate that a quantity of ports is 2; bits "10" are used to indicate port numbers {7, 8, 9, 10} or indicate that a quantity of ports is 4; and bits "11" are used to indicate port numbers {7, 8, 9, 10, 11} or indicate that a quantity of ports is 5. The one bit and the two bits are respectively used to indicate a DMRS pattern and a port number of a DMRS antenna port. The one bit and the two bits may be adjacent or not adjacent in the physical layer signaling. Herein, a bit value, indication information, and a correspondence between a bit value and indication information are only an example, and another bit value, another indication information, and another correspondence between a bit value and indication information may alternatively be used. This is not specifically limited herein.

TABLE 3A

| Bit value | DMRS pattern |
| --- | --- |
| 0 | Pattern 1 |
| 1 | Pattern 2 |

TABLE 3B

| Bit value | DMRS antenna port information (port number/quantity of ports) |
| --- | --- |
| 00 | 7/1 |
| 01 | 7, 8/2 |
| 10 | 7, 8, 9, 10/4 |
| 11 | 7, 8, 9, 10, 11/5 |

For example, in the physical layer signaling, a DMRS pattern and DMRS antenna port information may be jointly indicated through three bits or four bits. Using three bits as an example, as shown in Table 4, Table 4 shows a bit value of four bits and a correspondence between a DMRS pattern and DMRS antenna port information. Herein, a bit value, indication information, and a correspondence between a bit value and indication information are only an example, and another bit value, another indication information, and another correspondence between a bit value and indication information may alternatively be used. This is not specifically limited herein.

TABLE 4

| Bit value | DMRS antenna port information (port number/quantity of ports) | DMRS pattern |
| --- | --- | --- |
| 000 | 7/1 | Pattern 1 |
| 010 | 7, 8/2 | Pattern 1 |
| 100 | 7, 8, 9, 10/4 | Pattern 1 |
| 110 | 7, 8, 9, 10, 11/5 | Pattern 1 |
| 001 | 7/1 | Pattern 2 |
| 011 | 7, 8/2 | Pattern 2 |
| 101 | 7, 8, 9, 10/4 | Pattern 2 |
| 111 | 7, 8, 9, 10, 11/5 | Pattern 2 |

In some possible implementations, the related information of the time-frequency resource location of the second demodulation reference signal may alternatively include information about an antenna port group corresponding to the second demodulation reference signal. Antenna ports are divided into groups and a correspondence between an antenna port group and each transmission point or quasi-co-location information is determined. For example, the transmission point A sends the first demodulation reference signal by using an antenna port having an antenna port number 7 or 8, it may be determined that antenna ports having antenna port numbers 7 and 8 are one antenna port group, and a group number of the antenna port group is an antenna port group 1; and the transmission point B sends the second demodulation reference signal by using an antenna port having an antenna port number 9 or 10, it may be determined that antenna ports having antenna port numbers 9 and 10 are one port group, and a group number of the antenna port group is an antenna port group 2. When receiving information about an antenna port group, the reception point can determine, based on the antenna port group, a time-frequency resource location of a demodulation reference signal corresponding to the information about the antenna port group. For example, if the reception point receives the antenna port group 1, the time-frequency resource location of the second demodulation reference signal is determined. Herein, the information about the antenna port group may be a group number of the antenna port group or other information of the antenna port group. Information about an antenna port group of the second demodulation reference signal may be indicated through one bit or two bits in the physical layer signaling, or information about an antenna port group of the second demodulation reference signal may be indicated through the higher layer signaling or jointly indicated through the higher layer signaling and the physical layer signaling. For example, refer to an indication manner of a DMRS pattern and/or a DMRS antenna port. This is not limited herein. Group division for antenna port groups may be predefined, that is, commonly learned by the reception point and the transmission point in the system, or may be notified by the transmission point to the reception point through signaling. This is not specifically limited herein.

A specific example of the physical layer signaling may be as follows: The transmission point sends a piece of indication information to the reception point, where the indication information may be indication information of data mapping, and the indication information includes the information about the antenna port group of the second demodulation reference signal. For example, the reception point receives the indication information through DCI signaling. When the reception point receives the indication information, it may be determined that data mapping is not performed, that is, data receiving is not performed on a time-frequency resource location corresponding to a DMRS antenna port in the DMRS antenna port group. For example, the information about the DMRS antenna port group is notified by using one or two bits of information. Details are as follows:

DMRS port group for PDSCH RE mapping—1 bit or 2 bits.

In this embodiment of this application, optionally, the reception point determines, based on the time-frequency resource location of the second demodulation reference signal, a time-frequency resource location of data that is related to the time-frequency resource location of the second demodulation reference signal and that is in the first data, where the data related to the time-frequency resource location of the second demodulation reference signal includes at least one of a code word included in the first data, data of a layer corresponding to the code word included in the first data, and antenna port data that corresponds to a layer and that is included in the first data.

Specifically, for example, using data mapping indication information carrying the related information of the time-frequency resource location of the second demodulation reference signal as an example, a relationship between the related information of the time-frequency resource location of the second demodulation reference signal and the first data (such as code word/layer/DMRS port) is described. Specifically, the relationship between the related information of the time-frequency resource location of the second demodulation reference signal and the first data (such as code word/layer/DMRS port) may be predefined or indicated, and specific indication signaling may be the higher layer signaling, the physical layer signaling, or the like.

The relationship is predefined. For example, an example of a correspondence between data mapping indication information and a code word is a correspondence between two pieces of data mapping indication information and two code words. For example, first data mapping indication information corresponds to data mapping of a first code word, and second data mapping indication information corresponds to data mapping of a second code word; and vice versa.

An example of a correspondence between data mapping indication information and a layer is a correspondence between two pieces of data mapping indication information and layers. For example, if there are two layers of data, first data mapping indication information corresponds to data mapping of a first layer of data, and second data mapping indication information corresponds to data mapping of a second layer of data. If there are three layers of data, first data mapping indication information corresponds to data mapping of a first layer of data and a second layer of data, and second data mapping indication information corresponds to data mapping of a third layer of data; or if there are three layers of data, first data mapping indication information corresponds to data mapping of a first layer of data, and second data mapping indication information corresponds to data mapping of a second layer of data and a third layer of data. Alternatively, if there are four layers of data, first data mapping indication information corresponds to data mapping of a first layer of data and a second layer of data, and second data mapping indication information corresponds to data mapping of a third layer of data and a fourth layer of data; if there are four layers of data, first data mapping indication information corresponds to data mapping of a first layer of data, and second data mapping indication information corresponds to data mapping of a second layer of data, a third layer of data, and a fourth layer of data; or if there are four layers of data, first data mapping indication information corresponds to data mapping of a first layer of data, a second layer of data, and a third layer of data, and second data mapping indication information corresponds to data mapping of a fourth layer of data. Other layers are also in a similar case. This is not specifically limited herein.

An example of a correspondence between data mapping indication information and an antenna port is a correspondence between two pieces of data mapping indication information and antenna ports. For example, if there are two antenna ports, first data mapping indication information corresponds to data mapping of data of a first antenna port, and second data mapping indication information corresponds to data mapping of data of a second antenna port; and vice versa. If there are three antenna ports, first data mapping indication information corresponds to data mapping of data of a first antenna port and a second antenna port, and second data mapping indication information corresponds to data mapping of data of a third antenna port; or if there are three antenna ports, first data mapping indication information corresponds to data mapping of data of a first antenna port, and second data mapping indication information corresponds to data mapping of data of a second antenna port and a third antenna port. Alternatively, if there are four antenna ports, first data mapping indication information corresponds to data mapping of data of a first antenna port and a second antenna port, and second data mapping indication information corresponds to data mapping of data of a third antenna port and a fourth antenna port; if there are four antenna ports, first data mapping indication information corresponds to data mapping of data of a first antenna port, and second data mapping indication information corresponds to data mapping of data of a second antenna port, a third antenna port, and a fourth antenna port; or if there are four antenna ports, first data mapping indication information corresponds to data mapping of data of a first antenna port, a second antenna port, and a third antenna port, and second data mapping indication information corresponds to data mapping of data of a fourth antenna port. Other layers are also in a similar case. This is not specifically limited herein.

In this embodiment of this application, optionally, when a plurality of transmission points coordinate to transmit data to one terminal device, the time-frequency resource location of the first data is specifically determined based on the time-frequency resource location of the second demodulation reference signal, and a specific example is as follows: The following data mapping indication information is used to carry the related information of the time-frequency resource location of the second demodulation reference signal.

A first case is: When coordinated transmission of a plurality of transmission points comes from a plurality of layers of one code word, the plurality of layers of the one code word respectively come from the plurality of transmission points. In this case, a transmission point may indicate, for each layer/each antenna port of one code word, a group of related information of the time-frequency resource location of the second DMRS to the terminal device.

For the first case, examples of at least the following three implementations may exist.

Implementation 1: One data mapping indication information identifier in higher layer signaling corresponds to one group of related information of the time-frequency resource location of the second DMRS, and a plurality of data mapping indication information identifiers are configured in DCI. For example, if two layers/two antenna ports are configured, two data mapping indication information identifiers are correspondingly configured in the DCI, a first data mapping indication information identifier corresponds to data transmission of a first layer (or data transmission of a first antenna port), and a second data mapping indication information identifier corresponds to data transmission of a second layer (or data transmission of a second antenna port).

Implementation 2: One data mapping indication information identifier in higher layer signaling corresponds to a plurality of groups of related information of the time-frequency resource location of the second DMRS, and one data mapping indication information identifier is configured in DCI. The terminal device may determine a plurality of groups of related information of the time-frequency resource location of the second DMRS based on the one data mapping indication information identifier in the DCI, and may further determine a time-frequency resource location of data based on a correspondence between data mapping indication information and data. For example, if two layers/two antenna ports are configured, one data mapping indication information identifier is correspondingly configured, and the identifier includes two groups of related information of the time-frequency resource location of the second DMRS. A first group of related information of the time-frequency resource location of the second DMRS corresponds to data transmission of a first layer (or data transmission of a first antenna port), and a second group of related information of the time-frequency resource location of the second DMRS corresponds to data transmission of a second layer (or data transmission of a second antenna port).

For example, in RRC signaling, one data mapping indication information identifier corresponds to a plurality of groups of related information of the time-frequency resource location of the second DMRS, and an example of a signaling implementation is as follows:

In the foregoing signaling implementation, two groups of related information of the time-frequency resource location of the second DMRS may be expressed in the manner (1); or two groups of related information of the time-frequency resource location of the second DMRS may be expressed in the manner (2).

Implementation 3: The second indication information is carried through the physical layer signaling, and the second indication information may include one or more groups of related information of the time-frequency resource location of the second demodulation reference signal. For example, if two layers/two antenna ports are configured, the second indication information may include two groups of related information of the time-frequency resource location of the second demodulation reference signal, a first group of related information of the time-frequency resource location of the second demodulation reference signal corresponds to data transmission of a first layer (or data transmission of a first antenna port), and a second group of related information of the time-frequency resource location of the second demodulation reference signal corresponds to data transmission of a second layer (or data transmission of a second antenna port).

After the reception point receives the information, it can be learned that layers or antenna ports of a code word correspond to different data mapping indication information, and then data of different layers or antenna ports of the code word is received on different time-frequency resources respectively.

A second case is: When a plurality of transmission points coordinate to perform transmission, different transmission points transmit different code words. For each code word, one group of related information of the time-frequency resource location of the second DMRS is indicated.

For the second case, examples of at least the following three implementations may exist.

Implementation 1: One data mapping indication information identifier in higher layer signaling corresponds to one group of related information of the time-frequency resource location of the second DMRS, and identifiers of a plurality of pieces of data mapping indication information are configured in DCI. For example, a maximum of two pieces of data mapping indication information are supported by default. If two code words are configured, two data mapping indication information identifiers are correspondingly configured, a first data mapping indication information identifier corresponds to a first code word, and a second data mapping indication information identifier corresponds to a second code word.

Implementation 2: One data mapping indication information identifier in higher layer signaling corresponds to a plurality of groups of related information of the time-frequency resource location of the second DMRS, and one data mapping indication information identifier is configured

```
PDSCH-RE-MappingConfig::=        SEQUENCE {
    pdsch-RE-MappingConfigId     identification information of data mapping indication information
    (1):
    DMRS pattern1                  ENUMERATED {pattern 1, pattern 2},
    and/or DMRS ports1           ENUMERATED {7, 8, 9, 10, 11, 12, 13, 14, spare1};
    DMRS pattern2                  ENUMERATED {pattern 1, pattern 2},
    and/or DMRS ports2           ENUMERATED {7, 8, 9, 10, 11, 12, 13, 14, spare1};
or (2):
    DMRS port group1             ENUMERATED {group number 1, group number 2, ...};
    DMRS port group2             ENUMERATED {group number 1, group number 2, ...},
    }}
``` in DCI. The terminal device may determine a plurality of groups of related information of the time-frequency resource location of the second DMRS based on the one data mapping indication information identifier in the DCI, and may further determine a time-frequency resource location of data based on a correspondence between data mapping indication information and data. For example, if two code words are configured, one data mapping indication information identifier is correspondingly configured, and the identifier includes two groups of related information of the time-frequency resource location of the second DMRS. A first group of related information of the time-frequency resource location of the second DMRS corresponds to data transmission of a first code word, and a second group of related information of the time-frequency resource location of the second DMRS corresponds to data transmission of a second code word. For specific RRC information, refer to the description in the foregoing embodiment. Details are not described herein again.

Implementation 3: The second indication information is carried through the physical layer signaling, and the second indication information may include one or more groups of related information of the time-frequency resource location of the second demodulation reference signal. For example, if two code words are configured, the second indication information may include two groups of related information of the time-frequency resource location of the second demodulation reference signal, a first group of related information of the time-frequency resource location of the second demodulation reference signal corresponds to data transmission of a first code word, and a second group of related information of the time-frequency resource location of the second demodulation reference signal corresponds to data transmission of a second code word.

After the reception point receives the information, it can be learned that layers or ports for different code words correspond to different data mapping indication information, and then data of the different code words is received on different time-frequency resources respectively.

This embodiment of this application is optionally applicable to a case in which only one transmission point transmits data at a scheduling moment, and also applicable to a case in which a plurality of transmission points transmit data at a scheduling moment; and applicable to a case in which data of only one code word, layer, or antenna port is transmitted at a scheduling moment, and also applicable to a case in which data of a plurality of code words, layers, or antenna ports is transmitted at a scheduling moment.

An example in which a transmission point is a network device and a reception point is a terminal is described below.

In this embodiment of this application, optionally, the reception point may determine information about time-frequency resource locations of data of different code words/layers/antenna ports according to a predefined rule. For example, if scheduled resource locations of two code words indicated by one piece of downlink control information overlap, no data may be mapped by default to either of time-frequency resource locations of DMRSs corresponding to the two code words. For another example, if scheduled resource locations for two layers or ports in one piece of DCI overlap, no data may be mapped by default to either of overlapping locations of DMRSs corresponding to the two layers or ports.

In this embodiment of this application, optionally, the reception point may determine information about time-frequency resource locations of data of different code words/layers/antenna ports according to a predefined rule. For example, if scheduled resource locations of two pieces of data indicated by two pieces of downlink control information overlap, no data may be mapped by default to either of time-frequency resource locations of DMRSs corresponding to the two pieces of data. For another example, regardless of whether scheduled resource locations of two pieces of data overlap, the reception point may map by default no data to either of time-frequency resource locations of DMRSs corresponding to the two pieces of data. Alternatively, whether a time-frequency resource location to which data is mapped is related to overlapping of resource locations may be predefined, or may be notified by the transmission point to the reception point through signaling. This is not specifically limited herein.

In this embodiment of this application, optionally, in a non-ideal backhaul (backhaul) case, different transmission points may separately send downlink control information to schedule and transmit data. Therefore, the different transmission points mutually do not know whether to schedule the data. To improve accuracy of channel estimation of the reception point, on a location on which a transmission point sends a DMRS, another transmission point does not send a signal. Therefore, corresponding data mapping may be performed based on different DMRS antenna port groups. In coordination, to indicate QCL (quasi-co-location) information, the different transmission points send data by using antenna ports in the different DMRS antenna port groups. Therefore, a time-frequency resource location of the data may be determined based on information about the DMRS port antenna port groups.

Specifically, for example, it may be determined, based on DMRS antenna port group information in the higher layer signaling or predefined DMRS antenna port group information, that different transmission points send data by using antenna ports in different DMRS antenna port groups, and then it may be determined, based on information that is about a DMRS antenna port group to which a DMRS antenna port transmitting data belongs and that is in the physical layer signaling, that data is not mapped to a time-frequency resource location corresponding to a DMRS antenna port in another DMRS antenna port group.

A case in which a data transmission unit is a code word is described below by using an example, and data whose data transmission unit is a layer or data whose data transmission unit is an antenna port is in a similar case. Details are not described herein again.

For example, a code word 1 is transmitted by using a DMRS antenna port in a DMRS antenna port group 1, and a code word 2 is transmitted by using a DMRS antenna port in a DMRS antenna port group 2. Therefore, the reception point may determine that data of the code word 1 is not mapped to a time-frequency resource corresponding to the DMRS antenna port in the DMRS antenna port group 2, and data of the code word 2 is not mapped to a time-frequency resource corresponding to the DMRS antenna port in the DMRS antenna port group 1.

In this embodiment of this application, optionally, manner 1: A time-frequency resource location of data is related to a scheduling resource location of the data. For example, when two code words are transmitted, the time-frequency resource location of the data is determined on only overlapping scheduling resources by using the foregoing embodiment. For example, if frequency bands on which the code word 1 is transmitted include a frequency band 1 and a frequency band 2, and frequency bands on which the code word 2 is transmitted include the frequency band 1 and a frequency band 3, the code word 2 and the code word 2 overlap on the frequency band 1, but there is no data of the code word 2 on the frequency band 2 of the code word 1, and there is no data of the code word 1 on the frequency band 3 of the code word 2. Therefore, when data is mapped for the code word 1, data is not mapped for the code word 1 on a time-frequency resource corresponding to a DMRS antenna port in a DMRS antenna port group 2 in the frequency band 1; and data may be mapped for the code word 1 on a time-frequency resource corresponding to a DMRS antenna port in a DMRS antenna port group 2 in the frequency band 2. When data is mapped for the code word 2, data is not mapped for the code word 2 on a time-frequency resource corresponding to a DMRS antenna port in a DMRS antenna port group 1 in the frequency band 1; and data may be mapped for the code word 2 on a time-frequency resource corresponding to a DMRS antenna port in a DMRS antenna port group 1 in the frequency band 3.

In this embodiment of this application, optionally, manner 2: A time-frequency resource location of data is unrelated to a scheduling resource location of the data. For example, regardless of whether scheduling resources of two code words overlap, data is not mapped for the code word 1 on a time-frequency resource corresponding to any DMRS antenna port in a DMRS antenna port group 2; and data is not mapped for the code word 2 on a time-frequency resource corresponding to any DMRS antenna port in a DMRS antenna port group 1.

In this embodiment of this application, optionally, whether the time-frequency resource location of the data is specifically determined in the manner 1 or the manner 2 may be a predefined manner that can be known by both the network device and the terminal, or may be a specific used manner that the network device notifies to the UE through signaling, where the signaling may be the physical layer signaling or the higher layer signaling. A specific implementation is not limited herein.

Further, optionally, when the terminal is in a coordination mode, no data may be mapped by default to time-frequency resource locations corresponding to DMRS antenna ports in all DMRS antenna port groups.

For example, if two DMRS antenna port groups are allocated through a higher layer signal or a predefinition, the terminal may predefine that no data is transmitted on time-frequency resource locations corresponding to DMRS antenna ports in the two DMRS antenna port groups.

In a non-ideal backhaul scenario, network devices may negotiate a specific group division case of DMRS antenna port groups and respective used DMRS antenna ports, and transmit, during subsequent coordinated transmission, only DMRSs corresponding to respective antenna port groups but do not transmit data on time-frequency resource locations corresponding to the two groups of DMRS antenna ports. Whether the network devices mutually schedule data is not determined. Therefore, to avoid interference from data to a DMRS, it is predefined that a base station does not map data to a time-frequency resource corresponding to an antenna port in a DMRS antenna port group of a neighboring base station, and the terminal receives only a DMRS based on an indication but does not receive data on the time-frequency resource of the antenna port corresponding to the DMRS antenna port group.

For example, transmission points make an agreement on data transmission for the reception point. If the transmission point A uses a DMRS antenna port (and/or a pattern) corresponding to the DMRS antenna port group 1, and the transmission point B uses a DMRS antenna port (and/or a pattern) corresponding to the DMRS antenna port group 2, the transmission point A does not perform data mapping of the reception point on a time-frequency resource of the DMRS antenna port corresponding to the DMRS antenna port group 2, and the transmission point B does not perform data mapping of the reception point on a time-frequency resource of the DMRS antenna port corresponding to the DMRS antenna port group 1. When receiving data of the transmission point A (or when receiving data sent by the DMRS antenna port corresponding to the DMRS antenna port group 1), the reception point does not receive data on the time-frequency resource of the DMRS antenna port corresponding to the DMRS antenna port group 2; and when receiving data of the transmission point B (or when receiving data sent by the DMRS antenna port corresponding to the DMRS antenna port group 2), the reception point does not receive data on the time-frequency resource of the DMRS antenna port corresponding to the DMRS antenna port group 1.

Alternatively, whether the reception point receives no data on a DMRS antenna port group other than the DMRS antenna port group for data transmission is indicated through an indication of one bit. It should be understood that, for a specific implementation in which the transmission point A sends the first indication information to the reception point in step S401, refer to a specific implementation in which a transmission point sends configuration information of a demodulation reference signal to a reception point in the prior art, or refer to the foregoing specific implementation in which the transmission point B sends the second indication information to the reception point. This is not limited herein.

Step S404. The transmission point A sends the first demodulation reference signal to the reception point, and the reception point receives the first demodulation reference signal on the time-frequency resource location of the first demodulation reference signal according to the first indication information.

Step S405. The reception point determines a time-frequency resource location of the first data based on the time-frequency resource location of the second demodulation reference signal.

Step S406. The reception point demodulates the first data based on the first demodulation reference signal.

For a manner of performing step S404 to step S406, refer to the related specific description in the embodiment related to FIG. 2. Details are not described herein again.

In this embodiment of this application, optionally, the transmission point B may send the second demodulation reference signal to the reception point, the reception point can receive the second demodulation reference signal on the time-frequency resource location of the second demodulation reference signal according to the second indication information, and the reception point can determine the time-frequency resource location of the second data based on the time-frequency resource location of the first demodulation reference signal. In other words, when determining the time-frequency resource location of the second data, the reception point can exclude the time-frequency resource location of the first demodulation reference signal. To be specific, the reception point may not receive the second data on the time-frequency resource location of the first demodulation reference signal, thereby not affecting receiving of the first demodulation reference signal by the reception point. Moreover, the reception point can demodulate the second data based on the second demodulation reference signal.

It should be noted that, the steps performed in the foregoing method are not specifically limited in this embodiment of this application.

Figure 5:
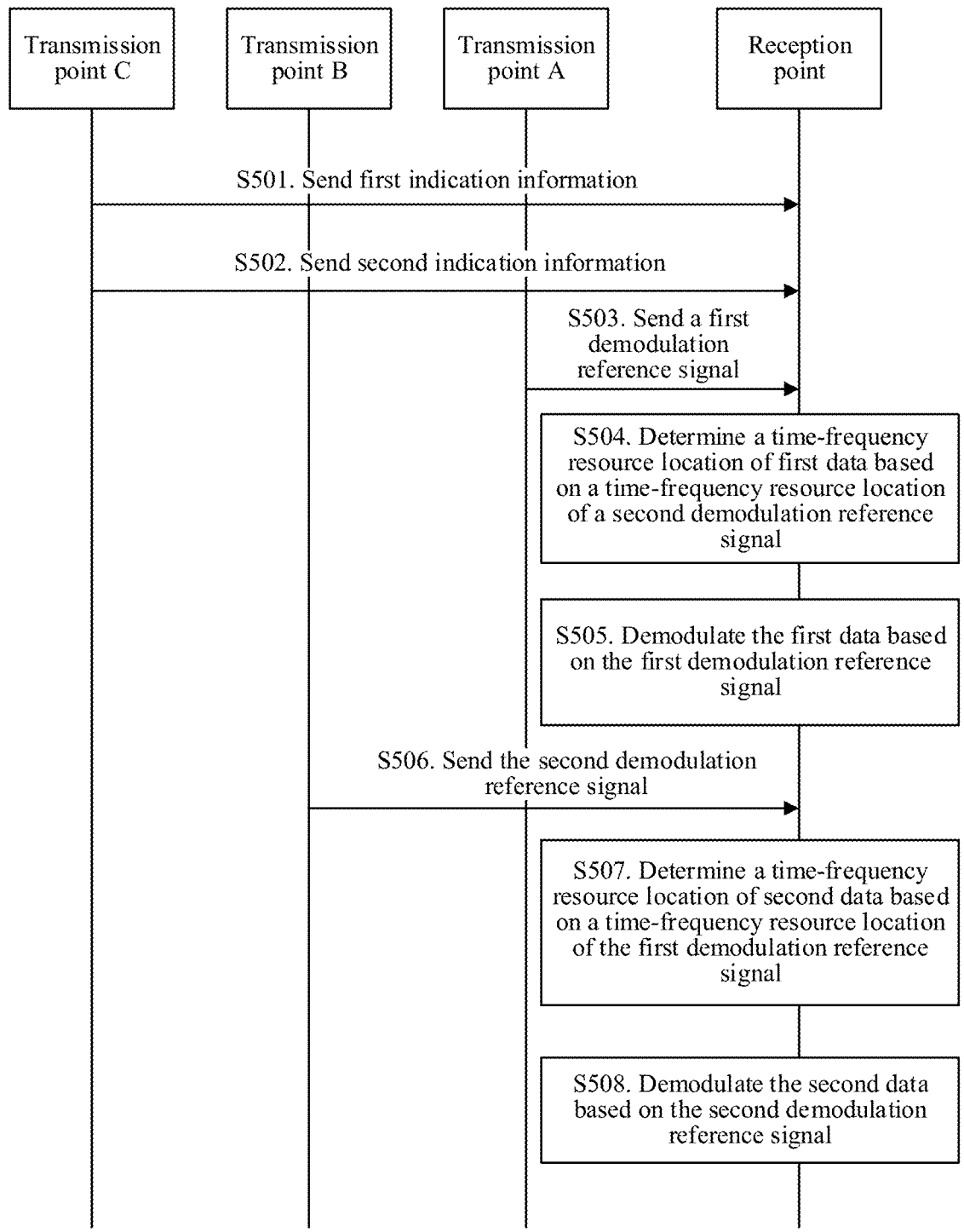
FIG. 5 is a schematic flowchart of still another communication method according to an embodiment of this application.

FIG. 5 is a schematic flowchart of still another communication method according to an embodiment of this application. As shown in FIG. 5, the method may include the following steps.

Step S501. A transmission point C sends first indication information to a reception point, where the first indication information is used to indicate a time-frequency resource location of a first demodulation reference signal of first data that a transmission point A needs to send; and the reception point receives the first indication information.

Step S502. The transmission point C sends second indication information to the reception point, where the second indication information is used to indicate a time-frequency resource location of a second demodulation reference signal of second data that a transmission point B needs to send; and the reception point receives the second indication information.

Step S503. The transmission point A sends the first demodulation reference signal to the reception point, and the reception point receives the first demodulation reference signal according to the first indication information.

Step S504. The reception point determines a time-frequency resource location of the first data based on the time-frequency resource location of the second demodulation reference signal.

Step S505. The reception point demodulates the first data based on the first demodulation reference signal.

Step S506. The transmission point B sends the second demodulation reference signal to the reception point, and the reception point receives the second demodulation reference signal according to the second indication information.

Step S507. The reception point determines a time-frequency resource location of the second data based on the time-frequency resource location of the first demodulation reference signal.

Step S508. The reception point demodulates the second data based on the second demodulation reference signal.

In some possible implementations, a transmission point in a coordinated multipoint transmission system uniformly manages and sends indication information. For example, in this embodiment, the transmission point C can learn that the transmission point A needs to send the first data and the transmission point B needs to send the second data, and then the transmission point C configures indication information for the reception point. The time-frequency resource location of the first demodulation reference signal of the first data is indicated through the first indication information, and the time-frequency resource location of the second demodulation reference signal of the second data is indicated through the second indication information. For a manner in which the transmission point C sends indication information to the reception point, refer to the foregoing embodiment.

In this embodiment of this application, optionally, when the transmission point A sends the first demodulation reference signal and the first data to the reception point, the transmission point A determines the time-frequency resource location of the first data based on the time-frequency resource location of the second demodulation reference signal. For example, the transmission point A does not map the first data to the time-frequency resource location of the second demodulation reference signal. Optionally, further, when the transmission point B sends the second demodulation reference signal and the second data to the reception point, the transmission point B determines the time-frequency resource location of the second data based on the time-frequency resource location of the first demodulation reference signal. For example, the transmission point B does not map the second data to the time-frequency resource location of the first demodulation reference signal.

Herein, the first data transmitted by the transmission point A and the second data transmitted by the transmission point B may be different code words. Alternatively, the first data and the second data may be data of different layers corresponding to a same code word. For example, if one code word corresponds to data of two layers, the first data represents data of a first layer, and the second data represents data of a second layer. Alternatively, the first data and the second data may be data of different antenna ports corresponding to a same layer. For example, if data of a first layer of one code word corresponds to first antenna port data and second antenna port data, the first data may represent the first antenna port data, and the second data may represent the second antenna port data. The first data and the second data may be simultaneously sent or not simultaneously sent based on negotiation. This is not specifically limited herein.

For a manner of performing other steps in this embodiment of this application, refer to the foregoing embodiment. Details are not described herein again.

It should be noted that, an order of performing steps is not limited in this embodiment of this application.

Figure 6:
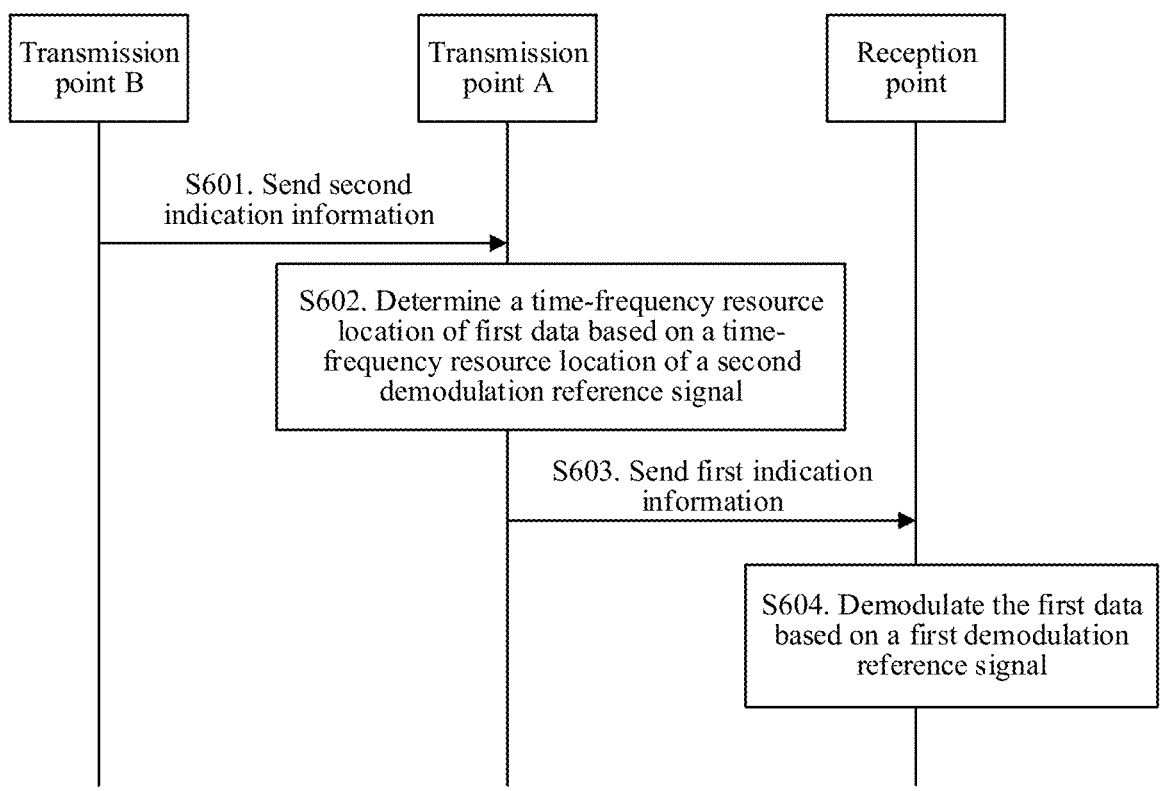
FIG. 6 is a schematic flowchart of still another communication method according to an embodiment of this application.

FIG. 6 is a schematic flowchart of still another communication method according to an embodiment of this application. As shown in FIG. 6, the method includes the following steps.

Step S601. A transmission point B sends second indication information to a transmission point A, where the second indication information is used to indicate a time-frequency resource location of a second demodulation reference signal; and the transmission point A receives the second indication information.

Step S602. The transmission point A determines a time-frequency resource location of first data based on the time-frequency resource location of the second demodulation reference signal.

Step S603. The transmission point A sends first indication information to a reception point, where the first indication information is used to indicate a time-frequency resource location of a first demodulation reference signal of the first data; and the reception point receives the first indication information.

Step S604. The reception point demodulates the first data based on the first demodulation reference signal.

Figure 7:
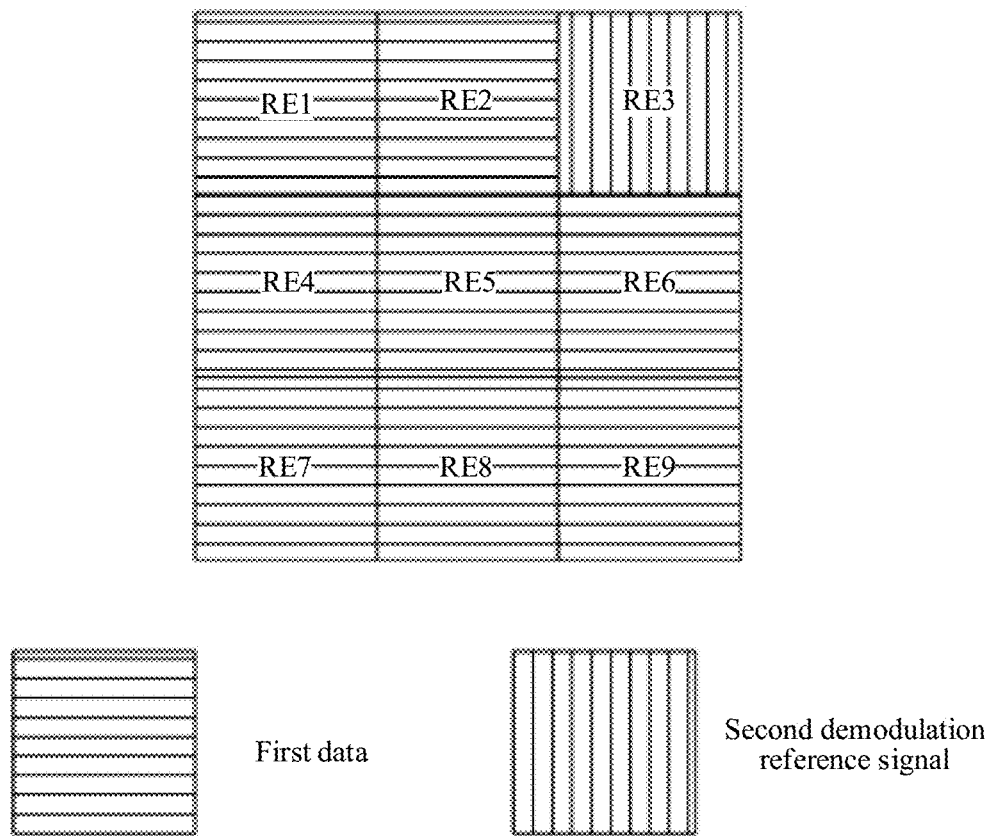
FIG. 7 is a schematic diagram of locations on which REs carry data and a second demodulation reference signal when a transmission point performs data mapping according to an embodiment of this application.

In some possible implementations, the transmission point B sends the second indication information to the transmission point A, where the second indication information is used to indicate the time-frequency resource location of the second demodulation reference signal. Specifically, after receiving a request of the transmission point A for the second indication information, the transmission point B may send the second indication information to the transmission point A; or after learning that the transmission point A needs to determine the time-frequency resource location of the first data, the transmission point B may send the second indication information to the transmission point A, or the transmission point B is triggered in another manner to send the second indication information to the transmission point A. After receiving the second indication information, the transmission point A can determine the time-frequency resource location of the first data based on the time-frequency resource of the second demodulation reference signal. For example, the time-frequency resource location of the first data does not include the time-frequency resource location of the second demodulation reference signal. To be specific, the first data is not mapped to the time-frequency resource location of the second demodulation reference signal. An example in which the transmission point A determines the time-frequency resource location of the first data is described herein with reference to FIG. 7. In FIG. 7, the transmission point A may allocate an RB to the first data, where the RB includes an RE 1 to an RE 9. If the transmission point A can determine, after receiving the second indication information, that the time-frequency resource location of the second demodulation reference signal is the RE 3, the transmission point may map, when mapping the first data to an RE, the first data to at least one location of the RE 1, the RE 2, and the RE 4 to the RE 9. Therefore, when mapping the first data, the transmission point A can exclude the time-frequency resource location of the second demodulation reference signal, and can further ensure that the first data does not interfere with the second demodulation reference signal on a same time-frequency resource location. The transmission point A sends the first indication information to the reception point, where the first indication information is used to indicate the time-frequency resource location of the demodulation reference signal of the first data. The reception point can receive the first demodulation reference signal according to the first indication information, and receive and demodulate the first data based on the first demodulation reference signal. Herein, the reception point does not need to determine whether the first data conflicts with a resource occupied by another demodulation reference signal, thereby improving data receiving performance of the reception point.

Optionally, in a coordinated multipoint transmission system, a commonly learned manner is determined between coordinated transmission points or between a transmission point and the reception point, to determine that a time-frequency resource location of data sent by the transmission point to the reception point is different from that of a demodulation reference signal sent by the transmission point to the reception point; or determine that the reception point does not receive data when it is detected that both the data and a demodulation reference signal exist on one time-frequency resource location.

It should be noted that, types of the first demodulation reference signal and the second demodulation reference signal in the foregoing methods shown in FIG. 2 to FIG. 7 may include at least the following several cases. This is not particularly limited in this application.

The first demodulation reference signal is a front loaded DMRS, and the second demodulation reference signal is a front loaded DMRS; the first demodulation reference signal is an additional DMRS, and the second demodulation reference signal is an additional DMRS;

the first demodulation reference signal is a front loaded DMRS, and the second demodulation reference signal is an additional DMRS;

the first demodulation reference signal is an additional DMRS, and the second demodulation reference signal is a front loaded DMRS; and the first demodulation reference signal is an additional DMRS, and the second demodulation reference signal is an additional DMRS.

The front loaded DMRS may also be referred to as a basic demodulation reference signal (Demodulation reference signal, DMRS), and may be placed at the beginning of or on a relatively front location of data. The additional DMRS may also be referred to as an attached DMRS. The basic DMRS and the attached DMRS may be carried on different symbol locations of a same scheduling unit, and the same scheduling unit includes at least any one of a subframe, a slot, or a mini-slot. This is not particularly limited in this embodiment of this application.

Figure 8:
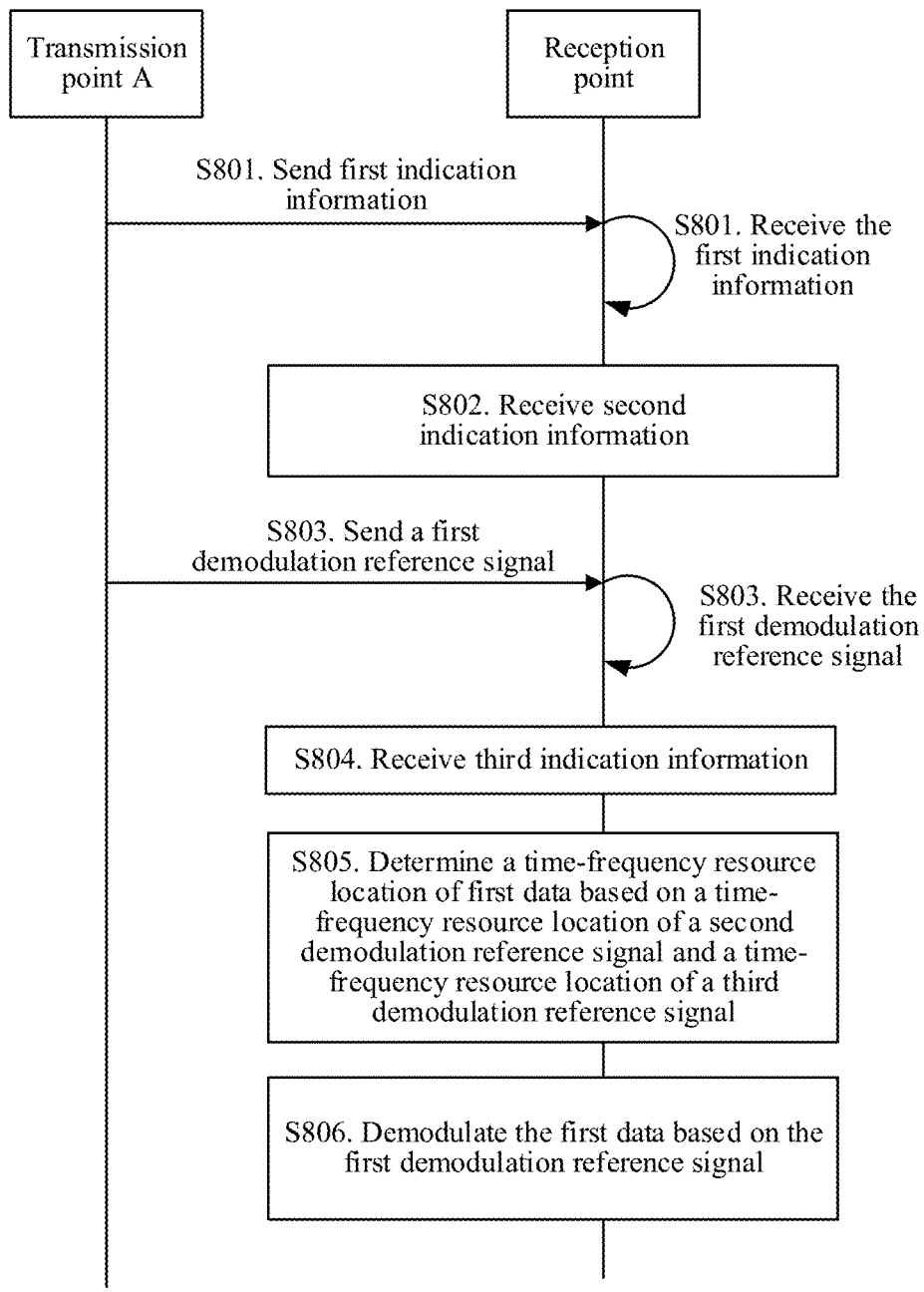
FIG. 8 is a schematic flowchart of a communication method according to another embodiment of this application.

FIG. 8 is a schematic flowchart of a communication method according to another embodiment of this application. As shown in FIG. 8, the method includes at least the following steps.

Step S801. A transmission point A sends first indication information to a reception point, where the first indication information is used to indicate a time-frequency resource location of a first demodulation reference signal of first data; and the reception point receives the first indication information.

Step S802. The reception point receives second indication information, where the second indication information is used to indicate a time-frequency resource location of a second demodulation reference signal.

Step S803. The transmission point A sends the first demodulation reference signal to the reception point, and the reception point receives the first demodulation reference signal on the time-frequency resource location of the first demodulation reference signal according to the first indication information.

It should be noted that, step S801 to step S803 are consistent with step S201 to step S203 in the method shown in FIG. 2. For specific descriptions of step S801 to step S803, refer to step S201 to step S203. For brevity, details are not described herein again.

Step S804. The reception point receives third indication information, where the third indication information is used to indicate a time-frequency resource location of a third demodulation reference signal.

In some possible embodiments, the reception point can receive the third indication information, where the third indication information is used to indicate the time-frequency resource location of the third demodulation reference signal. In this embodiment of this application, the third demodulation reference signal may be specific to at least one piece of data transmitted by at least one transmission point in a coordinated multipoint transmission system to the reception point. For example, the third demodulation reference signal may be specific to second data transmitted by a transmission point B in the coordinated multipoint transmission system to the reception point; or the third demodulation reference signal may be specific to third data transmitted by the transmission point A to the reception point, and the third data is different from the first data, where that the third data is different from the first data includes: a time-frequency resource location occupied by the third data is different from that occupied by the first data, data content of the third data is different from that of the first data, or the like. Alternatively, the third demodulation reference signal may be not specific to data, and the time-frequency resource location of the third demodulation reference signal is predefined by the coordinated multipoint transmission system. To be specific, the time-frequency resource location of the third demodulation reference signal is not specific to one time of particular data transmission, but is universal in data transmission, and the time-frequency resource location of the third demodulation reference signal may be universal for one or more transmission points in the coordinated multipoint transmission system.

In some possible implementations, the third indication information that is used to indicate the time-frequency resource location of the third demodulation reference signal and that is received by the reception point may be sent by a transmission point that needs to transmit data. For example, if the transmission point B needs to transmit the second data, where the third demodulation reference signal is used to demodulate the second data, the transmission point B sends the third indication information to the reception point. Alternatively, the third indication information may be uniformly sent by one transmission point after a plurality of coordinated transmission points make an agreement on a requirement of sending indication information once or each time. A transmission point transmitting the third indication information is not specifically limited in this embodiment of this application.

Step 805. The reception point determines a time-frequency resource location of the first data based on the time-frequency resource location of the second demodulation reference signal and the time-frequency resource location of the third demodulation reference signal.

Figure 9A:
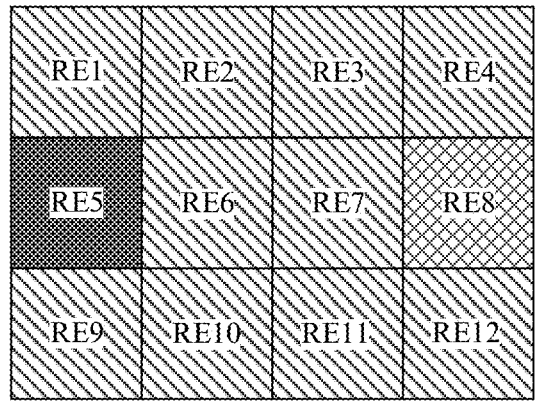
FIG. 9A and FIG. 9B are a schematic diagram of locations on which REs carry data and a third demodulation reference signal when some reception points receive data according to another embodiment of this application.
Figure 9A:
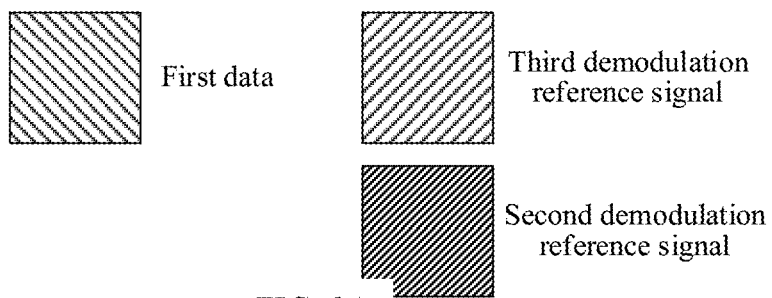
Figure 9B:
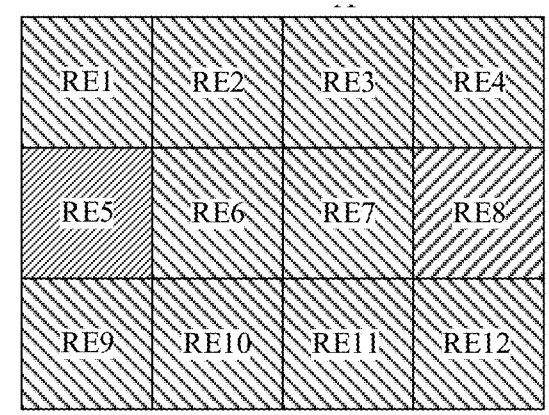
Figure 9B:
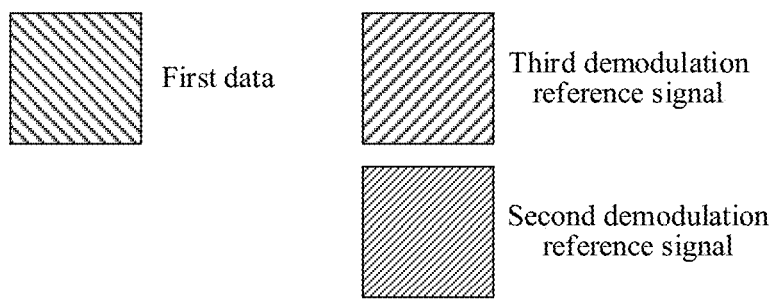

In some possible implementations, after receiving the second indication information and the third indication information, the reception point can determine the time-frequency resource location of the second demodulation reference signal according to the second indication information, and can determine the time-frequency resource location of the third demodulation reference signal according to the third indication information; and then the reception point can determine the time-frequency resource location of the first data based on the time-frequency resource location of the second demodulation reference signal and the time-frequency resource location of the third demodulation reference signal. Herein, an example in which the reception point determines the time-frequency resource location of the first data is described with reference to FIG. 9A and FIG. 9B. As shown in FIG. 9A, the reception point can determine a location of an RB of the first data, and the RB includes an RE 1 to an RE 12, where the RE 1 to the RE 12 jointly carry the first data. The reception point has determined that the RE 5 carries the second demodulation reference signal, and has determined that the RE 8 carries the third demodulation reference signal. To be specific, the time-frequency resource location of the second demodulation reference signal is the RE 5, and the time-frequency resource location of the third demodulation reference signal is the RE 8. In other words, the RE 5 not only carries data in the first data, but also carries the second demodulation reference signal, and the RE 8 not only carries data in the first data, but also carries the third demodulation reference signal. The reception point determines that time-frequency resource locations of the first data are the RE 1 to the RE 4, the RE 6, the RE 7, and the RE 9 to the RE 12. After determining the time-frequency resource locations of the first data, the reception point receives data on these time-frequency resource locations. As shown in FIG. 9B, the reception point can determine a location of an RB of the first data, and the RB includes an RE 1 to an RE 12, where the REs except the RE 5 and the RE 8 jointly carry the first data. The reception point has determined that the RE 5 carries the second demodulation reference signal, and the RE 8 carries the third demodulation reference signal. To be specific, the time-frequency resource location of the second demodulation reference signal is the RE 5, and the time-frequency resource location of the third demodulation reference signal is the RE 8. Therefore, the reception point determines that time-frequency resource locations of the first data are the RE 1 to the RE 4, the RE 6, the RE 7, and the RE 9 to the RE 12. After determining the time-frequency resource locations of the first data, the reception point receives data on these time-frequency resource locations. To sum up, if the reception point receives the second indication information and the third indication information, the reception point may learn that the second demodulation reference signal is carried on the RE 5, the third demodulation reference signal is carried on the RE 8, and the first data is not mapped to the RE 5 and the RE 8, thereby preventing the reception point from receiving the first data on the RE 5 and the RE 8, to perform normal data rate matching and improve data receiving performance.

Optionally, the reception point may first separately determine data related to the time-frequency resource location of the second demodulation reference signal and data related to the time-frequency resource location of the third demodulation reference signal, and then determine time-frequency resource locations of the related data. If the first data includes a plurality of code words, that is, a minimum data unit of the first data is a code word, one or more code words related to the time-frequency resource location of the second demodulation reference signal and one or more code words related to the time-frequency resource location of the third demodulation reference signal may be first determined separately; and then a time-frequency resource location of the one or more code words related to the time-frequency resource location of the second demodulation reference signal is determined based on the time-frequency resource location of the second demodulation reference signal, and a time-frequency resource location of the one or more code words related to the time-frequency resource location of the third demodulation reference signal is determined based on the time-frequency resource location of the third demodulation reference signal. If the first data includes data of layers corresponding to a plurality of code words, that is, a minimum data unit of the first data is a layer, data of one or more layers related to the time-frequency resource location of the second demodulation reference signal and data of one or more layers related to the time-frequency resource location of the third demodulation reference signal may be first determined separately; and then a time-frequency resource location of the data of the one or more layers related to the time-frequency resource location of the second demodulation reference signal is determined based on the time-frequency resource location of the second demodulation reference signal, and a time-frequency resource location of the data of the one or more layers related to the time-frequency resource location of the third demodulation reference signal is determined based on the time-frequency resource location of the third demodulation reference signal. If the first data includes antenna port data corresponding to a plurality of layers, that is, a minimum data unit of the first data is an antenna port, one or more pieces of antenna port data related to the time-frequency resource location of the second demodulation reference signal and one or more pieces of antenna port data related to the time-frequency resource location of the third demodulation reference signal may be first determined separately; and then a time-frequency resource location of the one or more pieces of antenna port data related to the time-frequency resource location of the second demodulation reference signal is determined based on the time-frequency resource location of the second demodulation reference signal, and a time-frequency resource location of the one or more pieces of antenna port data related to the time-frequency resource location of the third demodulation reference signal is determined based on the time-frequency resource location of the third demodulation reference signal.

Optionally, the reception point may jointly determine data related to the time-frequency resource location of the second demodulation reference signal and the time-frequency resource location of the third demodulation reference signal, and then determine time-frequency resource locations of the related data. If the first data includes a plurality of code words, that is, a minimum data unit of the first data is a code word, one or more code words related to the time-frequency resource location of the second demodulation reference signal and the time-frequency resource location of the third demodulation reference signal may be determined jointly; and then a time-frequency resource location of the one or more code words related to the time-frequency resource location of the second demodulation reference signal and the time-frequency resource location of the third demodulation reference signal is determined based on the time-frequency resource location of the second demodulation reference signal and the time-frequency resource location of the third demodulation reference signal. If the first data includes data of layers corresponding to a plurality of code words, that is, a minimum data unit of the first data is a layer, data of one or more layers related to the time-frequency resource location of the second demodulation reference signal and the time-frequency resource location of the third demodulation reference signal may be determined jointly; and then a time-frequency resource location of the data of the one or more layers related to the time-frequency resource location of the second demodulation reference signal and the time-frequency resource location of the third demodulation reference signal is determined based on the time-frequency resource location of the second demodulation reference signal and the time-frequency resource location of the third demodulation reference signal. If the first data includes antenna port data corresponding to a plurality of layers, that is, a minimum data unit of the first data is an antenna port, one or more pieces of antenna port data related to the time-frequency resource location of the second demodulation reference signal and the time-frequency resource location of the third demodulation reference signal may be determined jointly; and then a time-frequency resource location of the one or more pieces of antenna port data related to the time-frequency resource location of the second demodulation reference signal and the time-frequency resource location of the third demodulation reference signal is determined based on the time-frequency resource location of the second demodulation reference signal and the time-frequency resource location of the third demodulation reference signal.

In some possible implementations, if the reception point determines that the RE 8 carries data, and the data belongs to the first data, the reception point may request the transmission point to perform retransmission, or request the transmission point to map the data on the time-frequency resource location to another time-frequency resource location, or choose to ignore the data on the time-frequency resource location. Further, optionally, after receiving the first data, the reception point sends a receiving report to the transmission point, to notify the transmission point that the data on the RE 8 is not received.

Step S806. The reception point demodulates the first data based on the first demodulation reference signal.

In some possible implementations, after receiving the first data, the reception point may demodulate the first data based on the first demodulation reference signal.

It should be noted that, an order of related execution steps is not specifically limited in this embodiment of this application. For example, the transmission point B may simultaneously receive the first indication information, the second indication information, and the second indication information, that is, step S801, step S802, and step S804 are performed in parallel; or step S805 is performed before step S803.

It may be learned that, in this embodiment of this application, the reception point can determine, by receiving the first indication information, the time-frequency resource location of the first demodulation reference signal of the first data; and the reception point can determine, by receiving the second indication information, the time-frequency resource location of the second demodulation reference signal, the reception point can determine, by receiving the third indication information, the time-frequency resource location of the third demodulation reference signal, and the reception point can determine the time-frequency resource location of the first data based on the time-frequency resource location of the second demodulation reference signal and the time-frequency resource location of the third demodulation reference signal, so that the time-frequency resource location of the first data is excluded from the time-frequency resource location of the second demodulation reference signal and the time-frequency resource location of the third demodulation reference signal; and further, receiving interference from the reception point to the first data and the second demodulation reference signal can be avoided, and receiving interference from the reception point to the first data and the third demodulation reference signal can be avoided, to determine the time-frequency resource location of the first data, perform correct data rate matching, and improve receiving performance of the reception point.

Figure 10:
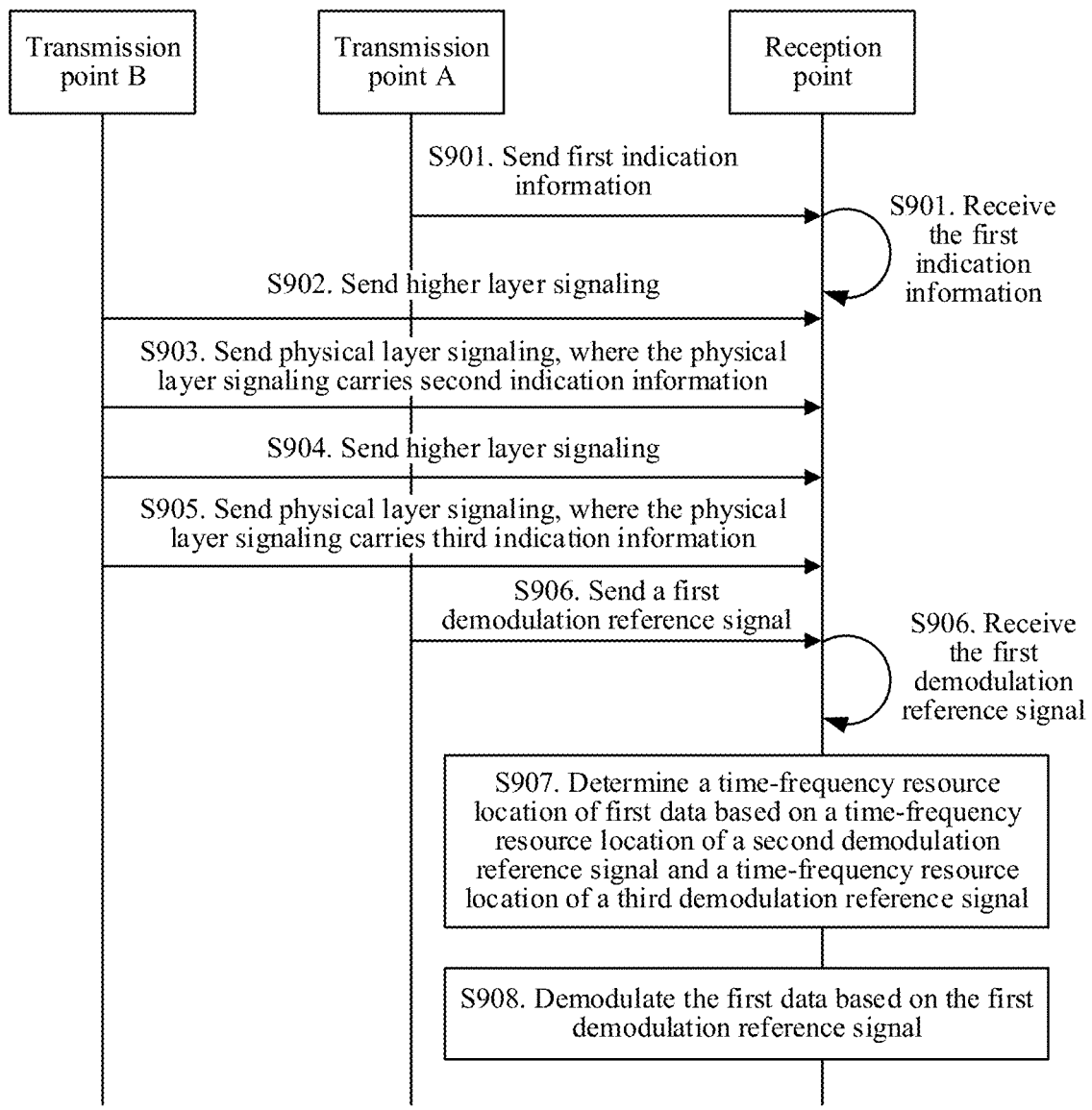
FIG. 10 is a schematic flowchart of another communication method according to another embodiment of this application.

FIG. 10 is a schematic flowchart of another communication method according to another embodiment of this application. As shown in FIG. 10, the method includes the following steps.

Step S901. A transmission point A sends first indication information to a reception point, where the first indication information is used to indicate a time-frequency resource location of a first demodulation reference signal of first data; and the reception point receives the first indication information.

Step S902. A transmission point B sends higher layer signaling to the reception point, where the higher layer signaling carries related information of the time-frequency resource location of the second demodulation reference signal and an identifier corresponding to the related information.

Step S903. The transmission point B sends physical layer signaling to the reception point, and the reception point receives second indication information through the physical layer signaling, where the second indication information includes at least one first identifier, and the first identifier corresponds to at least one group of related information of the time-frequency resource location of the second demodulation reference signal.

It should be noted that, step S901 to step S903 are consistent with step S401 to step S403 in the method shown in FIG. 4. For specific descriptions of step S901 to step S903, refer to step S401 to step S403. For brevity, details are not described herein again.

Step S904. The transmission point B sends higher layer signaling to the reception point, where the higher layer signaling carries related information of the time-frequency resource location of the third demodulation reference signal and an identifier corresponding to the related information.

Step S905. The transmission point B sends physical layer signaling to the reception point, and the reception point receives the third indication information through the physical layer signaling, where the third indication information includes at least one second identifier, and the second identifier corresponds to at least one group of related information of the time-frequency resource location of the third demodulation reference signal.

In some possible implementations, the transmission point B may first send the higher layer signaling such as radio resource control (Radio Resource Control, RRC) signaling or broadcast signaling to the reception point, where the higher layer signaling carries the related information of the time-frequency resource location of the third demodulation reference signal and the identifier corresponding to the related information.

In some possible implementations, the higher layer signaling carries the related information of the time-frequency resource location of the third demodulation reference signal and the identifier corresponding to the related information. The higher layer signaling may carry at least one group of related information of the time-frequency resource location of the third demodulation reference signal, and an identifier corresponding to the related information. A relationship between related information and an identifier is not specifically limited in this embodiment of this application. For example, each group of related information corresponds to one identifier, or a plurality of groups of related information correspond to one identifier. For example, the higher layer signaling may carry related information of all time-frequency resource locations of the third demodulation reference signal, the higher layer signaling may carry a group of related information of the time-frequency resource location of the third demodulation reference signal, or the higher layer signaling may carry one or more groups of related information, of the time-frequency resource location of the third demodulation reference signal, related to data. After receiving the related information and the identifier corresponding to the related information that are carried in the higher layer signaling, the reception point may store the related information and the identifier corresponding to the related information.

The higher layer signaling corresponds to at least one piece of physical layer signaling, and the physical layer signaling corresponding to the higher layer signaling includes at least one identifier carried in the higher layer signaling. In other words, the reception point receives the third indication information through the physical layer signaling, where the third indication information includes at least one identifier. The reception point may determine, based on the received at least one identifier, related information corresponding to the identifier, and then determine the time-frequency resource location of the third demodulation reference signal based on the determined related information. Herein, if the transmission point is a base station, the physical layer signaling may be control signaling such as DCI.

In this embodiment of this application, optionally, the higher layer signaling such as RRC signaling includes one or more groups of data resource mapping indication (PDSCH-RE-MappingConfig) information, and the data resource mapping indication information includes identification information (pdsch-RE-MappingConfigId) of the data resource mapping indication information and the related information of the time-frequency resource location of the third DMRS (the third demodulation reference signal). For example, the related information may indicate a pattern (DMRS pattern) of a demodulation reference signal and/or an antenna port (DMRS port) of a demodulation reference signal.

A specific signaling implementation is as follows:

```
PDSCH-RE-MappingConfig::=    SEQUENCE {
    pdsch-RE-MappingConfigId identification   information of data
    resource mapping indication information
    DMRS ports        ENUMERATED {7, 8, 9, 10, 11, 12, 13, 14,
                      spare1},
    and/or
    DMRS pattern      ENUMERATED {pattern 1, pattern 2};
    or
    DMRS port group ENUMERATED {group number 1, group
                      number 2, ...},
    }
}
```

Based on the foregoing signaling implementation, content included in a type of data resource mapping indication information in RRC signaling is shown. The data resource mapping indication information includes identification information (pdsch-RE-MappingConfigId) of the data resource mapping indication information and the related information of the time-frequency resource location of the third DMRS, and the related information herein includes DMRS ports and/or a DMRS pattern; or a DMRS port group. Herein, the DMRS ports represent antenna port information of a DMRS (for example, the antenna port information herein includes a port number of an antenna port); the DMRS pattern represents a DMRS pattern; or the DMRS port group represents information about an antenna port group of a DMRS. For the related information of the time-frequency resource location of the third DMRS, refer to the following specific description in this application.

In this embodiment of this application, optionally, DCI specifically indicates a group of data resource mapping indication information that is configured through RRC. For example, identification information (for example, pdsch-RE-MappingConfigId) of data resource mapping indication information configured in the RRC signaling may be indicated through bits of a data resource mapping and quasi-co-location indicator (PDSCH RE Mapping and Quasi-Co-Location Indicator, PQI) field in the DCI. For a specific implementation, refer to Table 5. In Table 5, an example in which two bits represent a data resource mapping and quasi-co-location indicator field is described.

TABLE 5

| Data resource mapping and quasi-co-location indicator field (bit value) | Description |
| --- | --- |
| 00 | Identifier 1 of data resource mapping indication information |
| 01 | Identifier 2 of data resource mapping indication information |
| 10 | Identifier 3 of data resource mapping indication information |
| 11 | Identifier 4 of data resource mapping indication information |

Herein, the data resource mapping and quasi-co-location indicator field may also be understood as a specific implementation of the third indication information carried in the DCI. The third indication information indicates a corresponding identifier, and then can determine the related information of the time-frequency resource location of the third demodulation reference signal, where the related information corresponds to the identifier and is in the RRC. For example, in the foregoing example of the RRC signaling, the identification information of the data resource mapping indication information is the identifier 1, and the bit value of the data resource mapping and quasi-co-location indicator field in the DCI is "00", so that it may be determined that the DCI indicates the related information that is of the time-frequency resource location of the third demodulation reference signal and that is in the identifier 1, and then it may be determined that the related information is DMRS ports ENUMERATED {7, 8, 9, 10, 11, 12, 13, 14, spare1}, and/or DMRS pattern ENUMERATED {pattern 1, pattern 2}; or DMRS port group ENUMERATED {group number 1, group number 2, . . . }.

It may be learned that, provided that the reception point obtains the time-frequency resource location, of the third DMRS, in the data resource mapping indication information, the reception point may learn that data is not mapped to the time-frequency resource location of the third DMRS. To be specific, the reception point does not receive data on the time-frequency resource location of the third DMRS. The physical layer signaling received by the reception point is physical layer signaling corresponding to higher layer signaling. Optionally, the transmission point B may directly receive the third indication information through physical layer signaling, where the third indication information includes the related information of the time-frequency resource location of the third demodulation reference signal. To be specific, the physical layer signaling can indicate the related information of the time-frequency resource location of the third demodulation reference signal. It should be understood that, the physical layer signaling may include only one or more groups of related information of the time-frequency resource location of the third demodulation reference signal; or the physical layer signaling may include one or more groups of related information of a time-frequency resource location of another demodulation reference signal. For example, the physical layer signaling may include both one or more groups of related information of the time-frequency resource location of the fourth demodulation reference signal and one or more groups of related information of the time-frequency resource location of the third demodulation reference signal.

In this embodiment of this application, optionally, the related information of the time-frequency resource location of the third demodulation reference signal may be indicated in the physical layer signaling through a data mapping indication information field. For example, the data mapping indication information field may be "DMRS pattern and/or port(s) for PDSCH RE mapping". DMRS pattern and/or DMRS port information is indicated through a bit value in the field, and a specific signaling example is as follows:

DMRS pattern and/or port(s) for PDSCH RE mapping

In this embodiment of this application, optionally, the first indication information, the second indication information, and the third indication information may be all sent by the transmission point A, or may be all sent by the transmission point B; the transmission point A sends the first indication information, and the transmission point B sends the second indication information and the third indication information; the transmission point A sends the second indication information, and the transmission point B sends the first indication information and the third indication information; or the transmission point A sends the third indication information, and the transmission point B sends the first indication information and the second indication information. This is not specifically limited herein.

To sum up, in some possible implementations, the related information of the time-frequency resource location of the third demodulation reference signal may include a pattern (DMRS Pattern) of the third demodulation reference signal and/or antenna port (DMRS Port) information related to the third demodulation reference signal. The antenna port information includes a port number of an antenna port and/or a quantity of antenna ports.

During specific implementation, if the pattern of the third demodulation reference signal corresponds to the antenna port information, the higher layer signaling may carry any one of the pattern of the third demodulation reference signal or the antenna port information, and an identifier corresponding to the any one of the pattern of the third demodulation reference signal or the antenna port information. Alternatively, the physical layer signaling directly carries any one of the pattern of the third demodulation reference signal or the antenna port information. For example, a pattern 1 (pattern 1) of the third demodulation reference signal corresponds to port numbers {7, 8, 11, 13} of antenna ports, and a pattern 2 (pattern 2) of the third demodulation reference signal corresponds to port numbers {9, 10, 12, 14} of antenna ports. Therefore, in the physical layer signaling, a pattern or a port number of an antenna port may be indicated through one bit (bit). As shown in Table 6A, in the physical layer signaling, the pattern 1 may be indicated through a bit "0", and the pattern 2 may be indicated through a bit "1". Certainly, other indication manners may be further included. For example, the pattern 2 is indicated through a bit "0", and the pattern 1 is indicated through a bit "1". As further shown in Table 6B, in the physical layer signaling, port numbers {7, 8, 11, 13} of antenna ports may be indicated through a bit "0", and port numbers {9, 10, 12, 14} of antenna ports may be indicated through a bit "1". Certainly, other indication manners are further included. For example, in the physical layer signaling, port numbers {7, 8, 11, 13} of antenna ports may be indicated through a bit "1", and port numbers {9, 10, 12, 14} of antenna ports may be indicated through a bit "0". Herein, a bit value, indication information, and a correspondence between a bit value and indication information are only an example, and another bit value, another indication information, and another correspondence between a bit value and indication information may alternatively be used. This is not specifically limited herein.

TABLE 6A

| Bit value | DMRS pattern |
| --- | --- |
| 0 | Pattern 1 |
| 1 | Pattern 2 |

TABLE 6B

| Bit value | Port number of a DMRS antenna port |
| --- | --- |
| 0 | 7, 8, 11, 13 |
| 1 | 9, 10, 12, 14 |

During specific implementation, if a DMRS pattern does not correspond to a port number of a DMRS antenna port, the related information in the higher layer signaling or the physical layer signaling needs to include both a DMRS pattern and a port number of a DMRS antenna port. A DMRS pattern and a port number of a DMRS antenna port may be separately indicated, or a DMRS pattern and a port number of a DMRS antenna port may be jointly indicated. Two cases of separate indication and joint indication are respectively described below by using examples.

For example, in the physical layer signaling, a DMRS pattern may be indicated through one bit. Referring to Table 7A, the pattern 1 is indicated through one bit "0", and the pattern 2 is indicated through one bit "1". Alternatively, the pattern 1 is indicated through a bit "1", and the pattern 2 is indicated through a bit "0". Antenna port information of a DMRS may be indicated through two bits. Referring to Table 7B, bits "00" are used to indicate a port number {7} or indicate that a quantity of ports is 1; bits "01" are used to indicate port numbers {7, 8} or indicate that a quantity of ports is 2; bits "10" are used to indicate port numbers {7, 8, 9, 10)} or indicate that a quantity of ports is 4; and bits "11" are used to indicate port numbers {7, 8, 9, 10, 11} or indicate that a quantity of ports is 5. The one bit and the two bits are respectively used to indicate a DMRS pattern and a port number of a DMRS antenna port. The one bit and the two bits may be adjacent or not adjacent in the physical layer signaling. Herein, a bit value, indication information, and a correspondence between a bit value and indication information are only an example, and another bit value, another indication information, and another correspondence between a bit value and indication information may alternatively be used. This is not specifically limited herein.

TABLE 7A

| Bit value | DMRS pattern |
|---|---|
| 0 | Pattern 1 |
| 1 | Pattern 2 |

TABLE 7B

| Bit value | DMRS antenna port information (port number/quantity of ports) |
|---|---|
| 00 | 7/1 |
| 01 | 7, 8/2 |
| 10 | 7, 8, 9, 10/4 |
| 11 | 7, 8, 9, 10, 11/5 |

For example, in the physical layer signaling, a DMRS pattern and DMRS antenna port information may be jointly indicated through three bits or four bits. Using three bits as an example, as shown in Table 4, Table 8 shows a bit value of four bits and a correspondence between a DMRS pattern and DMRS antenna port information. Herein, a bit value, indication information, and a correspondence between a bit value and indication information are only an example, and another bit value, another indication information, and another correspondence between a bit value and indication information may alternatively be used. This is not specifically limited herein.

TABLE 8

| Bit value | DMRS antenna port information (port number/quantity of ports) | DMRS pattern |
|---|---|---|
| 000 | 7/1 | Pattern 1 |
| 010 | 7, 8/2 | Pattern 1 |
| 100 | 7, 8, 9, 10/4 | Pattern 1 |
| 110 | 7, 8, 9, 10, 11/5 | Pattern 2 |
| 001 | 7/1 | Pattern 2 |
| 011 | 7, 8/2 | Pattern 2 |
| 101 | 7, 8, 9, 10/4 | Pattern 2 |
| 111 | 7, 8, 9, 10, 11/5 | Pattern 2 |

In some possible implementations, the related information of the time-frequency resource location of the third demodulation reference signal may alternatively include information about an antenna port group corresponding to the third demodulation reference signal. Antenna ports are divided into groups and a correspondence between an antenna port group and each transmission point or quasi-co-location information is determined. For example, the transmission point A sends the fourth demodulation reference signal by using an antenna port having an antenna port number 7 or 8, it may be determined that antenna ports having antenna port numbers 7 and 8 are one antenna port group, and a group number of the antenna port group is an antenna port group 1; and the transmission point B sends the third demodulation reference signal by using an antenna port having an antenna port number 9 or 10, it may be determined that antenna ports having antenna port numbers 9 and 10 are one port group, and a group number of the antenna port group is an antenna port group 2. When receiving information about an antenna port group, the reception point can determine, based on the antenna port group, a time-frequency resource location of a demodulation reference signal corresponding to the information about the antenna port group. For example, if the reception point receives the antenna port group 1, the time-frequency resource location of the third demodulation reference signal is determined. Herein, the information about the antenna port group may be a group number of the antenna port group or other information of the antenna port group. Information about an antenna port group of the third demodulation reference signal may be indicated through one bit or two bits in the physical layer signaling, or information about an antenna port group of the third demodulation reference signal may be indicated through the higher layer signaling or jointly indicated through the higher layer signaling and the physical layer signaling. For example, refer to an indication manner of a DMRS pattern and/or a DMRS antenna port. This is not limited herein. Group division for antenna port groups may be predefined, that is, commonly learned by the reception point and the transmission point in the system, or may be notified by the transmission point to the reception point through signaling. This is not specifically limited herein.

A specific example of the physical layer signaling may be as follows: The transmission point sends a piece of indication information to the reception point, where the indication information may be indication information of data mapping, and the indication information includes the information about the antenna port group of the third demodulation reference signal. For example, the reception point receives the indication information through DCI signaling. When the reception point receives the indication information, it may be determined that data mapping is not performed, that is, data receiving is not performed on a time-frequency resource location corresponding to a DMRS antenna port in the DMRS antenna port group. For example, the information about the DMRS antenna port group is notified by using one or two bits of information. Details are as follows:

DMRS port group for PDSCH RE mapping—1 bit or 2 bits.

In this embodiment of this application, optionally, the reception point determines, based on the time-frequency resource location of the second demodulation reference signal and the time-frequency resource location of the third demodulation reference signal, a time-frequency resource location of data that is related to the time-frequency resource location of the second demodulation reference signal and that is in the first data, and a time-frequency resource location of data that is related to the time-frequency resource location of the third demodulation reference signal and that is in the first data respectively, where the data related to the time-frequency resource location of the second demodulation reference signal includes at least one of a code word included in the first data, data of a layer corresponding to the code word included in the first data, and antenna port data that corresponds to a layer and that is included in the first data; and the data related to the time-frequency resource location of the third demodulation reference signal includes at least one of a code word included in the first data, data of a layer corresponding to the code word included in the first data, and antenna port data that corresponds to a layer and that is included in the first data.

Specifically, for example, using data mapping indication information carrying the related information of the time-frequency resource location of the third demodulation reference signal as an example, a relationship between the related information of the time-frequency resource location of the third demodulation reference signal and the first data (such as code word/layer/DMRS port) is described. Specifically, the relationship between the related information of the time-frequency resource location of the third demodulation reference signal and the first data (such as code word/layer/ DMRS port) may be predefined or indicated, and specific indication signaling may be the higher layer signaling, the physical layer signaling, or the like.

The relationship is predefined. For example, an example of a correspondence between data mapping indication information and a code word is a correspondence between two pieces of data mapping indication information and two code words. For example, first data mapping indication information corresponds to data mapping of a first code word, and second data mapping indication information corresponds to data mapping of a second code word; and vice versa.

An example of a correspondence between data mapping indication information and a layer is a correspondence between two pieces of data mapping indication information and layers. For example, if there are two layers of data, first data mapping indication information corresponds to data mapping of a first layer of data, and second data mapping indication information corresponds to data mapping of a second layer of data. If there are three layers of data, first data mapping indication information corresponds to data mapping of a first layer of data and a second layer of data, and second data mapping indication information corresponds to data mapping of a third layer of data; or if there are three layers of data, first data mapping indication information corresponds to data mapping of a first layer of data, and second data mapping indication information corresponds to data mapping of a second layer of data and a third layer of data. Alternatively, if there are four layers of data, first data mapping indication information corresponds to data mapping of a first layer of data and a second layer of data, and second data mapping indication information corresponds to data mapping of a third layer of data and a fourth layer of data; if there are four layers of data, first data mapping indication information corresponds to data mapping of a first layer of data, and second data mapping indication information corresponds to data mapping of a second layer of data, a third layer of data, and a fourth layer of data; or if there are four layers of data, first data mapping indication information corresponds to data mapping of a first layer of data, a second layer of data, and a third layer of data, and second data mapping indication information corresponds to data mapping of a fourth layer of data. Other layers are also in a similar case. This is not specifically limited herein.

An example of a correspondence between data mapping indication information and an antenna port is a correspondence between two pieces of data mapping indication information and antenna ports. For example, if there are two antenna ports, first data mapping indication information corresponds to data mapping of data of a first antenna port, and second data mapping indication information corresponds to data mapping of data of a second antenna port; and vice versa. If there are three antenna ports, first data mapping indication information corresponds to data mapping of data of a first antenna port and a second antenna port, and second data mapping indication information corresponds to data mapping of data of a third antenna port; or if there are three antenna ports, first data mapping indication information corresponds to data mapping of data of a first antenna port, and second data mapping indication information corresponds to data mapping of data of a second antenna port and a third antenna port. Alternatively, if there are four antenna ports, first data mapping indication information corresponds to data mapping of data of a first antenna port and a second antenna port, and second data mapping indication information corresponds to data mapping of data of a third antenna port and a fourth antenna port; if there are four antenna ports, first data mapping indication information corresponds to data mapping of data of a first antenna port, and second data mapping indication information corresponds to data mapping of data of a second antenna port, a third antenna port, and a fourth antenna port; or if there are four antenna ports, first data mapping indication information corresponds to data mapping of data of a first antenna port, a second antenna port, and a third antenna port, and second data mapping indication information corresponds to data mapping of data of a fourth antenna port. Other layers are also in a similar case. This is not specifically limited herein.

In this embodiment of this application, optionally, when a plurality of transmission points coordinate to transmit data to one terminal device, the time-frequency resource location of the first data is specifically determined based on the time-frequency resource location of the third demodulation reference signal, and a specific example is as follows: The following data mapping indication information is used to carry the related information of the time-frequency resource location of the third demodulation reference signal.

A first case is: When coordinated transmission of a plurality of transmission points comes from a plurality of layers of one code word, the plurality of layers of the one code word respectively come from the plurality of transmission points. In this case, a transmission point may indicate, for each layer/each antenna port of one code word, a group of related information of the time-frequency resource location of the third DMRS to the terminal device.

For the first case, examples of at least the following three implementations may exist.

Implementation 1: One data mapping indication information identifier in higher layer signaling corresponds to one group of related information of the time-frequency resource location of the third DMRS, and a plurality of data mapping indication information identifiers are configured in DCI. For example, if two layers/two antenna ports are configured, two data mapping indication information identifiers are correspondingly configured in the DCI, a first data mapping indication information identifier corresponds to data transmission of a first layer (or data transmission of a first antenna port), and a second data mapping indication information identifier corresponds to data transmission of a second layer (or data transmission of a second antenna port).

Implementation 2: One data mapping indication information identifier in higher layer signaling corresponds to a plurality of groups of related information of the time-frequency resource location of the third DMRS, and one data mapping indication information identifier is configured in DCI. The terminal device may determine a plurality of groups of related information of the time-frequency resource location of the third DMRS based on the one data mapping indication information identifier in the DCI, and may further determine a time-frequency resource location of data based on a correspondence between data mapping indication information and data. For example, if two layers/two antenna ports are configured, one data mapping indication information identifier is correspondingly configured, and the identifier includes two groups of related information of the time-frequency resource location of the third DMRS. A first group of related information of the time-frequency resource location of the third DMRS corresponds to data transmission of a first layer (or data transmission of a first antenna port), and a second group of related information of the time-frequency resource location of the third DMRS corresponds to data transmission of a second layer (or data transmission of a second antenna port).

For example, in RRC signaling, one data mapping indication information identifier corresponds to a plurality of groups of related information of the time-frequency resource location of the third DMRS, and an example of a signaling implementation is as follows:

```
PDSCH-RE-MappingConfig::=      SEQUENCE {
    pdsch-RE-MappingConfigId    identification information of data mapping indication information
    (1):
    DMRS pattern1               ENUMERATED {pattern 1, pattern 2},
    and/or DMRS ports1          ENUMERATED {7, 8, 9, 10, 11, 12, 13, 14, spare1};
    DMRS pattern2               ENUMERATED {pattern 1, pattern 2},
    and/or DMRS ports2          ENUMERATED {7, 8, 9, 10, 11, 12, 13, 14, spare1};
or (2):
    DMRS port group1            ENUMERATED {group number 1, group number 2, ...};
    DMRS port group2            ENUMERATED {group number 1, group number 2, ...},
    }
}
```

In the foregoing signaling implementation, two groups of related information of the time-frequency resource location of the third DMRS may be expressed in the manner (1); or two groups of related information of the time-frequency resource location of the third DMRS may be expressed in the manner (2).

Implementation 3: The third indication information is carried through the physical layer signaling, and the third indication information may include one or more groups of related information of the time-frequency resource location of the third demodulation reference signal. For example, if two layers/two antenna ports are configured, the third indication information may include two groups of related information of the time-frequency resource location of the third demodulation reference signal, a first group of related information of the time-frequency resource location of the third demodulation reference signal corresponds to data transmission of a first layer (or data transmission of a first antenna port), and a second group of related information of the time-frequency resource location of the third demodulation reference signal corresponds to data transmission of a second layer (or data transmission of a second antenna port).

After the reception point receives the information, it can be learned that layers or antenna ports of a code word correspond to different data mapping indication information, and then data of different layers or antenna ports of the code word is received on different time-frequency resources respectively.

A second case is: When a plurality of transmission points coordinate to perform transmission, different transmission points transmit different code words. For each code word, one group of related information of the time-frequency resource location of the third DMRS is indicated.

For the second case, examples of at least the following three implementations may exist.

Implementation 1: One data mapping indication information identifier in higher layer signaling corresponds to one group of related information of the time-frequency resource location of the third DMRS, and identifiers of a plurality of pieces of data mapping indication information are configured in DCI. For example, a maximum of two pieces of data mapping indication information are supported by default. If two code words are configured, two data mapping indication information identifiers are correspondingly configured, a first data mapping indication information identifier corresponds to a first code word, and a second data mapping indication information identifier corresponds to a second code word.

Implementation 2: One data mapping indication information identifier in higher layer signaling corresponds to a plurality of groups of related information of the time-frequency resource location of the third DMRS, and one data mapping indication information identifier is configured in DCI. The terminal device may determine a plurality of groups of related information of the time-frequency resource location of the third DMRS based on the one data mapping indication information identifier in the DCI, and may further determine a time-frequency resource location of data based on a correspondence between data mapping indication information and data. For example, if two code words are configured, one data mapping indication information identifier is correspondingly configured, and the identifier includes two groups of related information of the time-frequency resource location of the third DMRS. A first group of related information of the time-frequency resource location of the third DMRS corresponds to data transmission of a first code word, and a second group of related information of the time-frequency resource location of the third DMRS corresponds to data transmission of a second code word. For specific RRC information, refer to the description in the foregoing embodiment. Details are not described herein again.

Implementation 3: The third indication information is carried through the physical layer signaling, and the third indication information may include one or more groups of related information of the time-frequency resource location of the third demodulation reference signal. For example, if two code words are configured, the third indication information may include two groups of related information of the time-frequency resource location of the third demodulation reference signal, a first group of related information of the time-frequency resource location of the third demodulation reference signal corresponds to data transmission of a first code word, and a second group of related information of the time-frequency resource location of the third demodulation reference signal corresponds to data transmission of a second code word.

After the reception point receives the information, it can be learned that layers or ports for different code words correspond to different data mapping indication information, and then data of the different code words is received on different time-frequency resources respectively.

This embodiment of this application is optionally applicable to a case in which only one transmission point transmits data at a scheduling moment, and also applicable to a case in which a plurality of transmission points transmit data at a scheduling moment; and applicable to a case in which data of only one code word, layer, or antenna port is transmitted at a scheduling moment, and also applicable to a case in which data of a plurality of code words, layers, or antenna ports is transmitted at a scheduling moment.

In this embodiment of this application, optionally, the reception point jointly determines, based on the time-frequency resource location of the second demodulation reference signal and the time-frequency resource location of the third demodulation reference signal, a time-frequency resource location of data that is related to the time-frequency resource location of the second demodulation reference signal and the time-frequency resource location of the third demodulation reference signal and that is in the first data, where the data that is related to the time-frequency resource location of the second demodulation reference signal and the time-frequency resource location of the third demodulation reference signal includes at least one of a code word included in the first data, data of a layer corresponding to the code word included in the first data, and antenna port data that corresponds to a layer and that is included in the first data.

An example in which a transmission point is a network device and a reception point is a terminal is described below.

In this embodiment of this application, optionally, the reception point may determine information about time-frequency resource locations of data of different code words/layers/antenna ports according to a predefined rule. For example, if scheduled resource locations of two code words indicated by one piece of downlink control information overlap, no data may be mapped by default to either of time-frequency resource locations of DMRSs corresponding to the two code words. For another example, if scheduled resource locations for two layers or ports in one piece of DCI overlap, no data may be mapped by default to either of overlapping locations of DMRSs corresponding to the two layers or ports.

In this embodiment of this application, optionally, the reception point may determine information about time-frequency resource locations of data of different code words/layers/antenna ports according to a predefined rule. For example, if scheduled resource locations of two pieces of data indicated by two pieces of downlink control information overlap, no data may be mapped by default to either of time-frequency resource locations of DMRSs corresponding to the two pieces of data. For another example, regardless of whether scheduled resource locations of two pieces of data overlap, the reception point may map by default no data to either of time-frequency resource locations of DMRSs corresponding to the two pieces of data. Alternatively, whether a time-frequency resource location to which data is mapped is related to overlapping of resource locations may be predefined, or may be notified by the transmission point to the reception point through signaling. This is not specifically limited herein.

In this embodiment of this application, optionally, in a non-ideal backhaul (backhaul) case, different transmission points may separately send downlink control information to schedule and transmit data. Therefore, the different transmission points mutually do not know whether to schedule the data. To improve accuracy of channel estimation of the reception point, on a location on which a transmission point sends a DMRS, another transmission point does not send a signal. Therefore, corresponding data mapping may be performed based on different DMRS antenna port groups. In coordination, to indicate QCL (quasi-co-location) information, the different transmission points send data by using antenna ports in the different DMRS antenna port groups. Therefore, a time-frequency resource location of the data may be determined based on information about the DMRS port antenna port groups.

Specifically, for example, it may be determined, based on DMRS antenna port group information in the higher layer signaling or predefined DMRS antenna port group information, that different transmission points send data by using antenna ports in different DMRS antenna port groups, and then it may be determined, based on information that is about a DMRS antenna port group to which a DMRS antenna port transmitting data belongs and that is in the physical layer signaling, that data is not mapped to a time-frequency resource location corresponding to a DMRS antenna port in another DMRS antenna port group.

A case in which a data transmission unit is a code word is described below by using an example, and data whose data transmission unit is a layer or data whose data transmission unit is an antenna port is in a similar case. Details are not described herein again.

For example, a code word 1 is transmitted by using a DMRS antenna port in a DMRS antenna port group 1, and a code word 2 is transmitted by using a DMRS antenna port in a DMRS antenna port group 2. Therefore, the reception point may determine that data of the code word 1 is not mapped to a time-frequency resource corresponding to the DMRS antenna port in the DMRS antenna port group 2, and data of the code word 2 is not mapped to a time-frequency resource corresponding to the DMRS antenna port in the DMRS antenna port group 1.

In this embodiment of this application, optionally, manner 1: A time-frequency resource location of data is related to a scheduling resource location of the data. For example, when two code words are transmitted, the time-frequency resource location of the data is determined on only overlapping scheduling resources by using the foregoing embodiment. For example, if frequency bands on which the code word 1 is transmitted include a frequency band 1 and a frequency band 2, and frequency bands on which the code word 2 is transmitted include the frequency band 1 and a frequency band 3, the code word 2 and the code word 2 overlap on the frequency band 1, but there is no data of the code word 2 on the frequency band 2 of the code word 1, and there is no data of the code word 1 on the frequency band 3 of the code word 2. Therefore, data is mapped for the code word 1, data is not mapped for the code word 1 on a time-frequency resource corresponding to a DMRS antenna port in a DMRS antenna port group 2 in the frequency band 1; and data may be mapped for the code word 1 on a time-frequency resource corresponding to a DMRS antenna port in a DMRS antenna port group 2 in the frequency band 2. When data is mapped for the code word 2, data is not mapped for the code word 2 on a time-frequency resource corresponding to a DMRS antenna port in a DMRS antenna port group 1 in the frequency band 1; and data may be mapped for the code word 2 on a time-frequency resource corresponding to a DMRS antenna port in a DMRS antenna port group 1 in the frequency band 3.

In this embodiment of this application, optionally, manner 2: A time-frequency resource location of data is unrelated to a scheduling resource location of the data. For example, regardless of whether scheduling resources of two code words overlap, data is not mapped for the code word 1 on a time-frequency resource corresponding to any DMRS antenna port in a DMRS antenna port group 2; and data is not mapped for the code word 2 on a time-frequency resource corresponding to any DMRS antenna port in a DMRS antenna port group 1.

In this embodiment of this application, optionally, whether the time-frequency resource location of the data is specifically determined in the manner 1 or the manner 2 may be a predefined manner that can be known by both the network device and the terminal, or may be a specific used manner that the network device notifies to the UE through signaling, where the signaling may be the physical layer signaling or the higher layer signaling. A specific implementation is not limited herein.

Further, optionally, when the terminal is in a coordination mode, no data may be mapped by default to time-frequency resource locations corresponding to DMRS antenna ports in all DMRS antenna port groups.

For example, if two DMRS antenna port groups are allocated through a higher layer signal or a predefinition, the terminal may predefine that no data is transmitted on time-frequency resource locations corresponding to DMRS antenna ports in the two DMRS antenna port groups.

In a non-ideal backhaul scenario, network devices may negotiate a specific group division case of DMRS antenna port groups and respective used DMRS antenna ports, and transmit, during subsequent coordinated transmission, only DMRSs corresponding to respective antenna port groups but do not transmit data on time-frequency resource locations corresponding to the two groups of DMRS antenna ports. Whether the network devices mutually schedule data is not determined. Therefore, to avoid interference from data to a DMRS, it is predefined that a base station does not map data to a time-frequency resource corresponding to an antenna port in a DMRS antenna port group of a neighboring base station, and the terminal receives only a DMRS based on an indication but does not receive data on the time-frequency resource of the antenna port corresponding to the DMRS antenna port group.

For example, transmission points make an agreement on data transmission for the reception point. If the transmission point A uses a DMRS antenna port (and/or a pattern) corresponding to the DMRS antenna port group 1, and the transmission point B uses a DMRS antenna port (and/or a pattern) corresponding to the DMRS antenna port group 2, the transmission point A does not perform data mapping of the reception point on a time-frequency resource corresponding to a DMRS antenna port in the DMRS antenna port group 2, and the transmission point B does not perform data mapping of the reception point on a time-frequency resource of the DMRS antenna port corresponding to the DMRS antenna port group 1. When receiving data of the transmission point A (or when receiving data sent by the DMRS antenna port corresponding to the DMRS antenna port group 1), the reception point does not receive data on the time-frequency resource of the DMRS antenna port corresponding to the DMRS antenna port group 2; and when receiving data of the transmission point B (or when receiving data sent by the DMRS antenna port corresponding to the DMRS antenna port group 2), the reception point does not receive data on the time-frequency resource of the DMRS antenna port corresponding to the DMRS antenna port group 1.

Alternatively, whether the reception point receives no data on a DMRS antenna port group other than the DMRS antenna port group for data transmission is indicated through an indication of one bit. It should be understood that, for a specific implementation in which the transmission point A sends the fourth indication information to the reception point in step S801, refer to a specific implementation in which a transmission point sends configuration information of a demodulation reference signal to a reception point in the prior art, or refer to the foregoing specific implementation in which the transmission point B sends the third indication information to the reception point. This is not limited herein.

Step S906. The transmission point A sends the first demodulation reference signal to the reception point, and the reception point receives the first demodulation reference signal on the time-frequency resource location of the first demodulation reference signal according to the first indication information.

Step S907. The reception point determines the time-frequency resource location of the first data based on the time-frequency resource location of the second demodulation reference signal and the time-frequency resource location of the third demodulation reference signal.

Step S908. The reception point demodulates the first data based on the first demodulation reference signal.

It should be noted that, for a manner of performing step S906 to step S908, refer to the related specific description in the embodiment related to FIG. 8. Details are not described herein again.

In this embodiment of this application, optionally, the transmission point B may send the second demodulation reference signal and the third demodulation reference signal to the reception point, the reception point can receive, according to the second indication information and the third indication information, the second demodulation reference signal on the time-frequency resource location of the second demodulation reference signal and the third demodulation reference signal on the time-frequency resource location of the third demodulation reference signal, and the reception point can determine the time-frequency resource location of the second data based on the time-frequency resource location of the first demodulation reference signal. In other words, when determining the time-frequency resource location of the second data, the reception point can exclude the time-frequency resource location of the first demodulation reference signal. To be specific, the reception point may not receive the second data on the time-frequency resource location of the first demodulation reference signal, thereby not affecting receiving of the first demodulation reference signal by the reception point. Moreover, the reception point can demodulate the second data based on the second demodulation reference signal and the third demodulation reference signal.

It should be noted that, the steps performed in the foregoing method are not specifically limited in this embodiment of this application.

Figure 11:
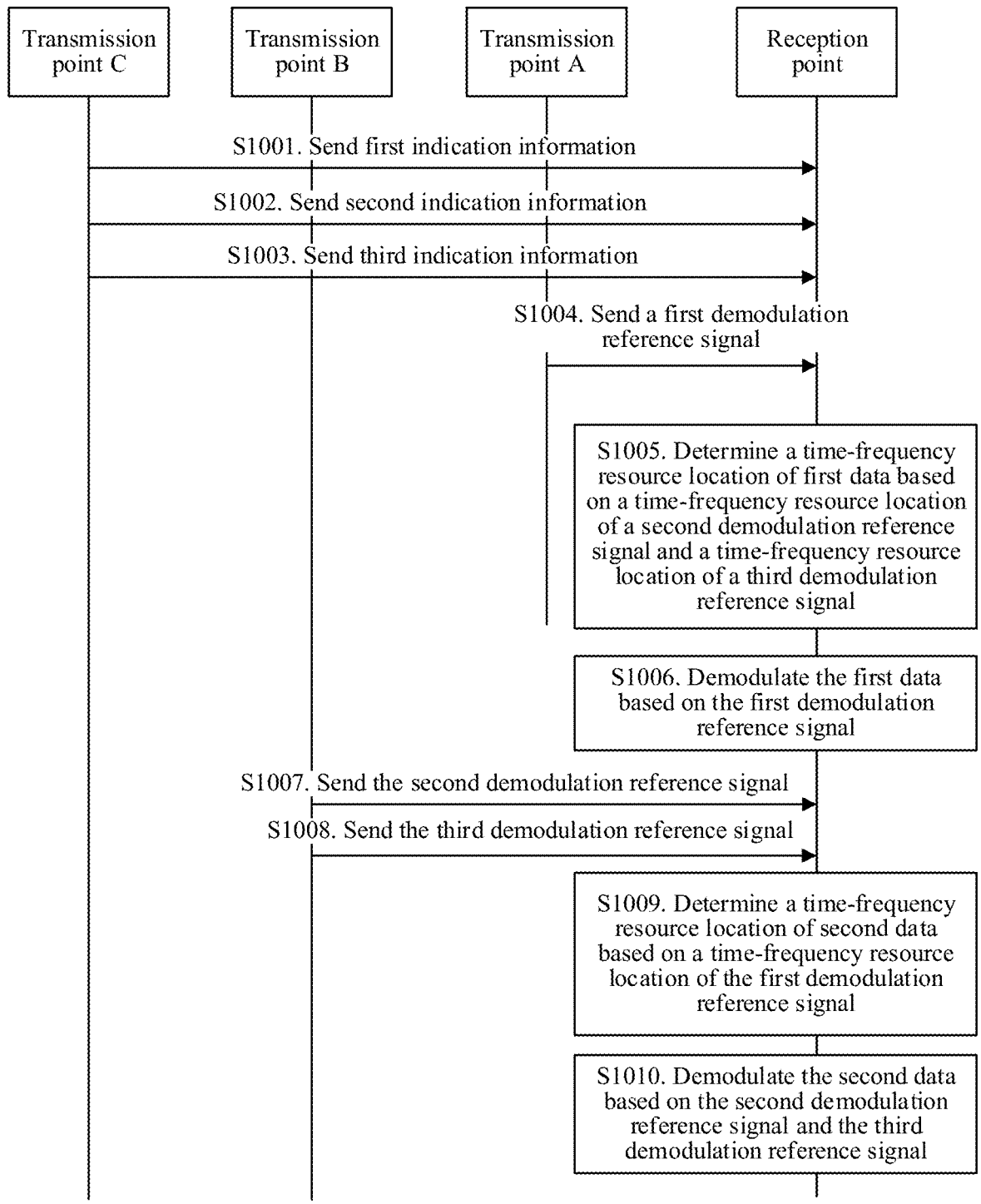
FIG. 11 is a schematic flowchart of still another communication method according to another embodiment of this application.

FIG. 11 is a schematic flowchart of still another communication method according to another embodiment of this application. As shown in FIG. 11, the method may include the following steps.

Step S1001. A transmission point C sends first indication information to a reception point, where the first indication information is used to indicate a time-frequency resource location of a first demodulation reference signal of first data that a transmission point A needs to send; and the reception point receives the first indication information.

Step S1002. The transmission point C sends second indication information to the reception point, where the second indication information is used to indicate a time-frequency resource location of a second demodulation reference signal of second data that a transmission point B needs to send; and the reception point receives the second indication information.

Step S1003. The transmission point C sends third indication information to the reception point, where the third indication information is used to indicate a time-frequency resource location of a third demodulation reference signal of the second data that the transmission point B needs to send; and the reception point receives the third indication information.

Step S1004. The transmission point A sends the first demodulation reference signal to the reception point, and the reception point receives the first demodulation reference signal according to the first indication information.

Step S1005. The reception point determines a time-frequency resource location of the first data based on the time-frequency resource location of the second demodulation reference signal and the time-frequency resource location of the third demodulation reference signal.

Step S1006. The reception point demodulates the first data based on the first demodulation reference signal.

Step S1007. The transmission point B sends the second demodulation reference signal to the reception point, and the reception point receives the second demodulation reference signal according to the second indication information.

Step S1008. The transmission point B sends the third demodulation reference signal to the reception point, and the reception point receives the third demodulation reference signal according to the third indication information.

Step S1009. The reception point determines a time-frequency resource location of the second data based on the time-frequency resource location of the first demodulation reference signal.

Step S1010. The reception point demodulates the second data based on the second demodulation reference signal and the third demodulation reference signal.

In some possible implementations, a transmission point in a coordinated multipoint transmission system uniformly manages and sends indication information. For example, in this embodiment, the transmission point C can learn that the transmission point A needs to send the first data, and the transmission point B needs to send the second data; and then the transmission point C configures indication information for the reception point. The time-frequency resource location of the first demodulation reference signal of the first data is indicated through the first indication information, the time-frequency resource location of the second demodulation reference signal of the second data is indicated through the second indication information, and the time-frequency resource location of the third demodulation reference signal of the second data is indicated through the third indication information. For a manner in which the transmission point C sends indication information to the reception point, refer to the foregoing embodiment.

In this embodiment of this application, optionally, when the transmission point A sends the first demodulation reference signal and the first data to the reception point, the transmission point A determines the time-frequency resource location of the first data based on the time-frequency resource location of the second demodulation reference signal and the time-frequency resource location of the third demodulation reference signal. For example, the transmission point A does not map the first data to the time-frequency resource location of the second demodulation reference signal and the time-frequency resource location of the third demodulation reference signal. Optionally, further, when the transmission point B sends the second demodulation reference signal, the third demodulation reference signal, and the second data to the reception point, the transmission point B determines the time-frequency resource location of the second data based on the time-frequency resource location of the first demodulation reference signal. For example, the transmission point B does not map the second data to the time-frequency resource location of the first demodulation reference signal.

Herein, the first data transmitted by the transmission point A and the second data transmitted by the transmission point B may be different code words. Alternatively, the first data and the second data may be data of different layers corresponding to a same code word. For example, if one code word corresponds to data of two layers, the first data represents data of a first layer, and the second data represents data of a second layer. Alternatively, the first data and the second data may be data of different antenna ports corresponding to a same layer. For example, if data of a first layer of one code word corresponds to first antenna port data and second antenna port data, the first data may represent the first antenna port data, and the second data may represent the second antenna port data. The first data and the second data may be simultaneously sent or not simultaneously sent based on negotiation. This is not specifically limited herein.

For a manner of performing other steps in this embodiment of this application, refer to the foregoing embodiment. Details are not described herein again.

It should be noted that, an order of performing steps is not limited in this embodiment of this application.

Figure 12:
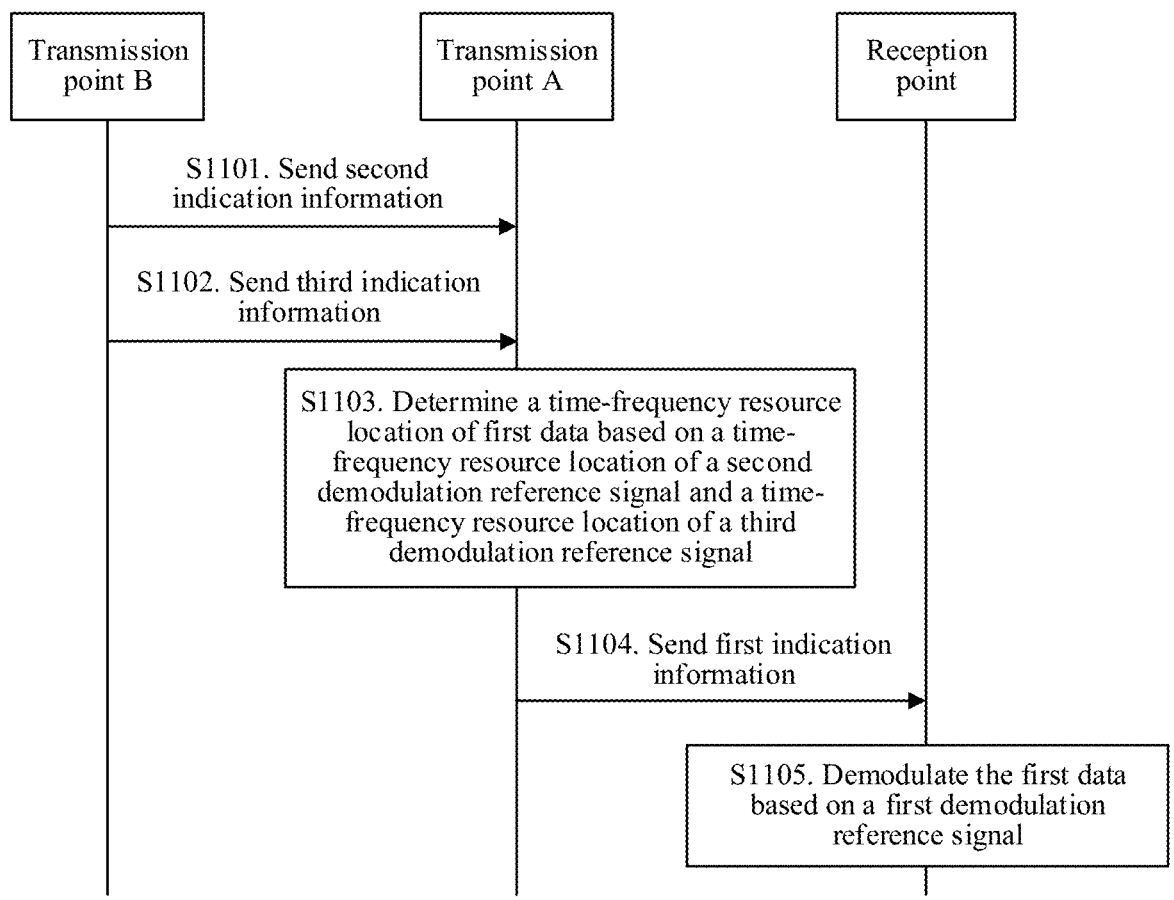
FIG. 12 is a schematic flowchart of still another communication method according to another embodiment of this application.

FIG. 12 is a schematic flowchart of still another communication method according to another embodiment of this application. As shown in FIG. 12, the method includes the following steps.

Step S1101. A transmission point B sends second indication information to a transmission point A, where the second indication information is used to indicate a time-frequency resource location of a second demodulation reference signal; and the transmission point A receives the second indication information.

Step S1102. The transmission point B sends third indication information to the transmission point A, where the third indication information is used to indicate a time-frequency resource location of a third demodulation reference signal; and the transmission point A receives the third indication information.

Step S1103. The transmission point A determines the time-frequency resource location of first data based on the time-frequency resource location of the second demodulation reference signal and the time-frequency resource location of the third demodulation reference signal.

Step S1104. The transmission point A sends first indication information to a reception point, where the first indication information is used to indicate a time-frequency resource location of a first demodulation reference signal of the first data; and the reception point receives the first indication information.

Step S1105. The reception point demodulates the first data based on the first demodulation reference signal.

Figure 13:
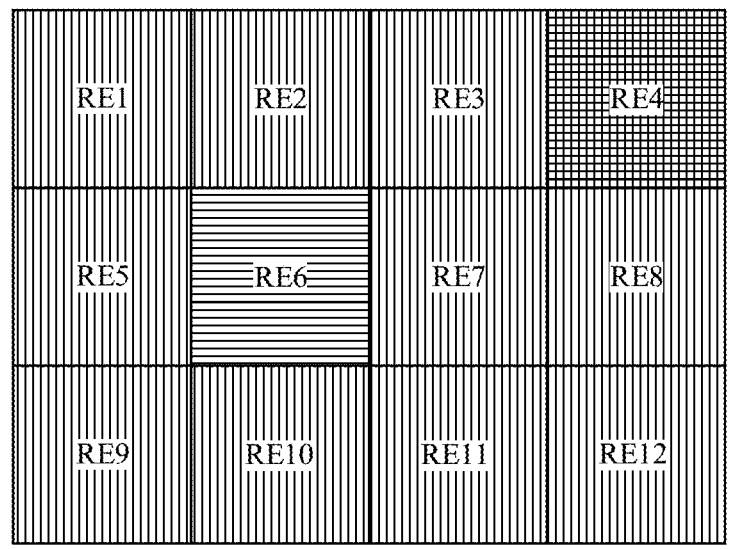
FIG. 13 is a schematic diagram of locations on which REs carry data and a third demodulation reference signal when a transmission point performs data mapping according to another embodiment of this application.
Figure 13:
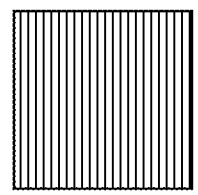
Figure 13:
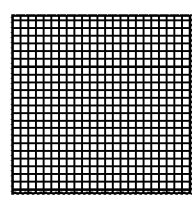
Figure 13:
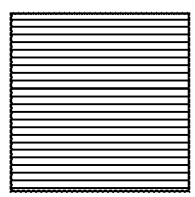

In some possible implementations, the transmission point B sends the second indication information and the third indication information to the transmission point A, where the second indication information is used to indicate the time-frequency resource location of the second demodulation reference signal, and the third indication information is used to indicate the time-frequency resource location of the third demodulation reference signal. Specifically, the transmission point B may send, after receiving a request of the transmission point A for the second indication information, the second indication information to the transmission point A, and send, after receiving a request of the transmission point A for the third indication information, the third indication information to the transmission point A; or after learning that the transmission point A needs to determine the time-frequency resource location of the first data, the transmission point B may send the second indication information and the third indication information to the transmission point A, or the transmission point B is triggered in another manner to send the second indication information and the third indication information to the transmission point A. After receiving the second indication information and the third indication information, the transmission point A can determine the time-frequency resource location of the first data based on the time-frequency resource of the second demodulation reference signal and the time-frequency resource of the third demodulation reference signal. For example, the time-frequency resource location of the first data does not include the time-frequency resource location of the second demodulation reference signal and the time-frequency resource location of the third demodulation reference signal. To be specific, the first data is not mapped to the time-frequency resource location of the second demodulation reference signal and the time-frequency resource location of the third demodulation reference signal. An example in which the transmission point A determines the time-frequency resource location of the first data is described herein with reference to FIG. 13. In FIG. 13, the transmission point A may allocate an RB to the first data, where the RB includes an RE 1 to an RE 12. If the transmission point A can determine, after receiving the second indication information and the third indication information, that the time-frequency resource location of the second demodulation reference signal is the RE 4 and the time-frequency resource location of the third demodulation reference signal is the RE 6, the transmission point may map, when mapping the first data to an RE, the first data to at least one location of the RE 1 to the RE 3, the RE 5, and the RE 7 to the RE 12. Therefore, when mapping the first data, the transmission point A can exclude the time-frequency resource location of the second demodulation reference signal and the time-frequency resource location of the third demodulation reference signal, and can further ensure that the first data does not interfere with the second demodulation reference signal and the third demodulation reference signal on a same time-frequency resource location. The transmission point A sends the first indication information to the reception point, where the first indication information is used to indicate the time-frequency resource location of the demodulation reference signal of the first data. The reception point can receive the first demodulation reference signal according to the first indication information, and receive and demodulate the first data based on the first demodulation reference signal. Herein, the reception point does not need to determine whether the first data conflicts with a resource occupied by another demodulation reference signal, thereby improving data receiving performance of the reception point.

Figure 14:
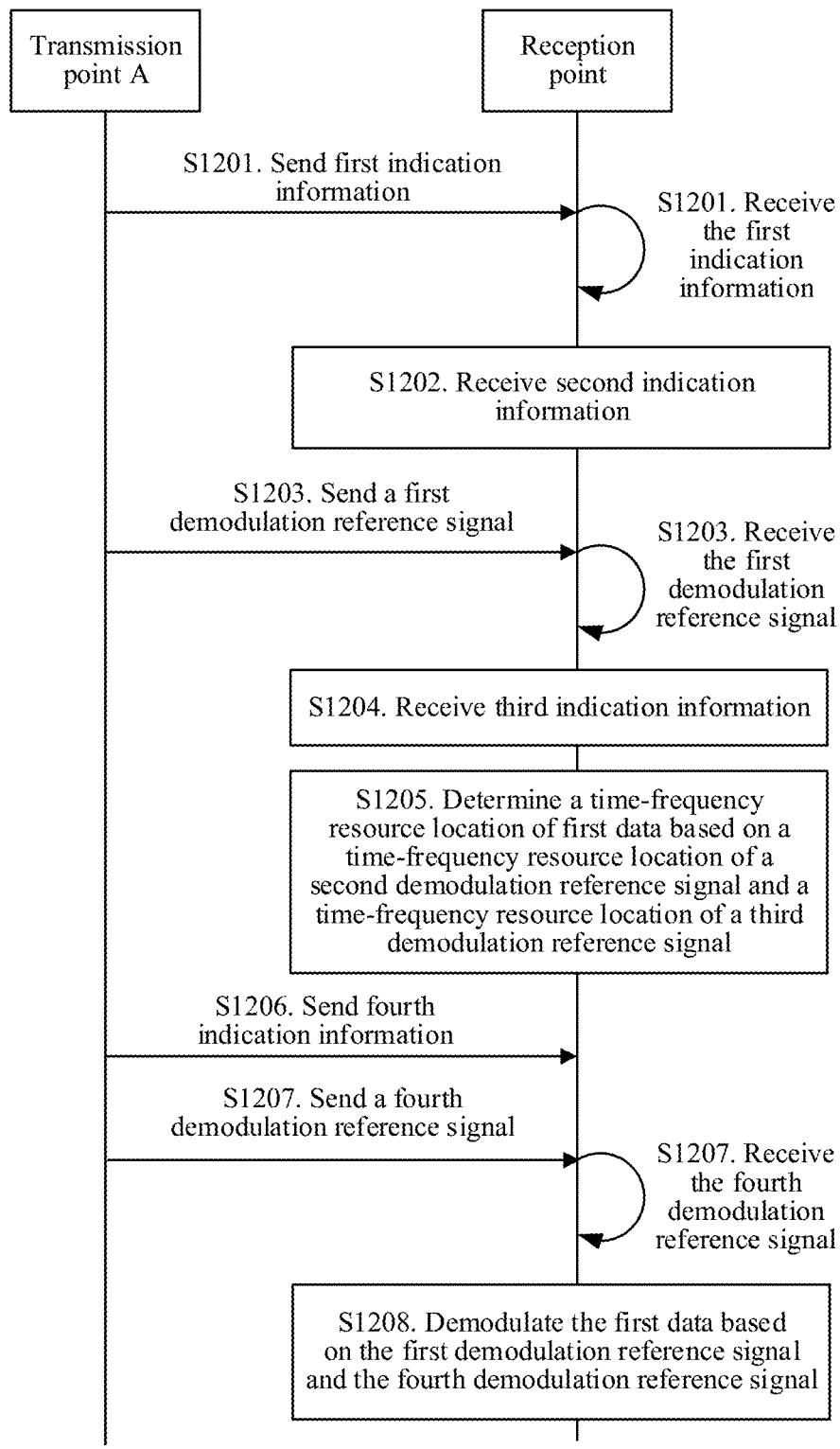
FIG. 14 is a schematic flowchart of a communication method according to still another embodiment of this application.

FIG. 14 is a schematic flowchart of a communication method according to still another embodiment of this application. As shown in FIG. 14, the method includes at least the following steps.

Step S1201. A transmission point A sends first indication information to a reception point, where the first indication information is used to indicate a time-frequency resource location of a first demodulation reference signal of first data; and the reception point receives the first indication information.

Step S1202. The reception point receives second indication information, where the second indication information is used to indicate a time-frequency resource location of a second demodulation reference signal.

Step S1203. The transmission point A sends the first demodulation reference signal to the reception point, and the reception point receives the first demodulation reference signal on the time-frequency resource location of the first demodulation reference signal according to the first indication information.

Step S1204. The reception point receives third indication information, where the third indication information is used to indicate a time-frequency resource location of a third demodulation reference signal (for example, an example of an additional DMRS).

Step S1205. The reception point determines a time-frequency resource location of the first data based on the time-frequency resource location of the second demodulation reference signal and the time-frequency resource location of the third demodulation reference signal.

It should be noted that, step S1201 to step S1205 are consistent with step S801 to step S805 in the method shown in FIG. 8. For specific descriptions of step S1201 to step S1205, refer to step S801 to step S805. For brevity, details are not described herein again.

Step S1206. The transmission point A sends fourth indication information to the reception point, where the fourth indication information is used to indicate a time-frequency resource location of a fourth demodulation reference signal of first data; and the reception point receives the fourth indication information.

In some possible implementations, the transmission point A sends the fourth indication information to the reception point, where the fourth indication information is used to indicate the time-frequency resource location of the fourth demodulation reference signal of the first data. The first data is data that the transmission point A needs to send to the reception point. The reception point can receive the fourth indication information; and can determine the time-frequency resource location of the fourth demodulation reference signal according to the fourth indication information, and then receive the fourth demodulation reference signal based on the time-frequency resource location of the fourth demodulation reference signal.

While transmitting data (for example, the first data) to the reception point, the transmission point A may send the fourth indication information to the reception point; or before or after transmitting the first data to the reception point, the transmission point A may send the fourth indication information to the reception point. A sending time at which the transmission point A sends the fourth indication information is not specifically limited in this embodiment of this application.

The data (for example, the first data) sent by the transmission point A to the reception point may carry the fourth indication information, or control signaling sent by the transmission point A to the reception point may carry the fourth indication information. For example, when the transmission point is a base station, downlink control information (Downlink Control Information, DCI) sent by the transmission point A to the reception point carries the fourth indication information.

Optionally, the fourth indication information may be indicated through higher layer signaling or physical layer signaling. This is not specifically limited herein.

Step S1207. The transmission point A sends the fourth demodulation reference signal to the reception point, and the reception point receives the fourth demodulation reference signal on the time-frequency resource location of the fourth demodulation reference signal according to the fourth indication information.

In some possible implementations, after the reception point receives the fourth indication information, the reception point can determine the time-frequency resource location of the fourth demodulation reference signal according to the fourth indication information, the transmission point A may send the fourth demodulation reference signal to the reception point, and the reception point can receive the fourth demodulation reference signal on the corresponding time-frequency resource location based on the learned time-frequency resource location of the fourth demodulation reference signal.

Step S1208. The reception point demodulates the first data based on the first demodulation reference signal and the fourth demodulation reference signal.

In some possible implementations, after receiving the first data, the reception point may demodulate the first data based on the first demodulation reference signal and the fourth demodulation reference signal.

It should be noted that, an order of related execution steps is not specifically limited in this embodiment of this application.

It should be further noted that, description is made above by using only an example in which the transmission point A sends the first indication information and the fourth indication information, but this embodiment of this application is not limited thereto. For example, the first indication information, the second indication information, the third indication information, and the fourth indication information may be all sent by the transmission point A, or may be all sent by the transmission point B. This is not particularly limited in this embodiment of this application.

It may be learned that, in this embodiment of this application, the reception point can determine, by receiving the first indication information, the time-frequency resource location of the first demodulation reference signal of the first data, and the reception point can determine, by receiving the fourth indication information, the time-frequency resource location of the fourth demodulation reference signal of the first data; and the reception point can determine, by receiving the second indication information, the time-frequency resource location of the second demodulation reference signal, the reception point can determine, by receiving the third indication information, the time-frequency resource location of the third demodulation reference signal, and the reception point can determine the time-frequency resource location of the first data based on the time-frequency resource location of the second demodulation reference signal and the time-frequency resource location of the third demodulation reference signal, so that the time-frequency resource location of the first data is excluded from the time-frequency resource location of the second demodulation reference signal and the time-frequency resource location of the third demodulation reference signal; and further, receiving interference from the reception point to the first data and the second demodulation reference signal can be avoided, and receiving interference from the reception point to the first data and the third demodulation reference signal can be avoided, to determine the time-frequency resource location of the first data, perform correct data rate matching, and improve receiving performance of the reception point.

Figure 15:
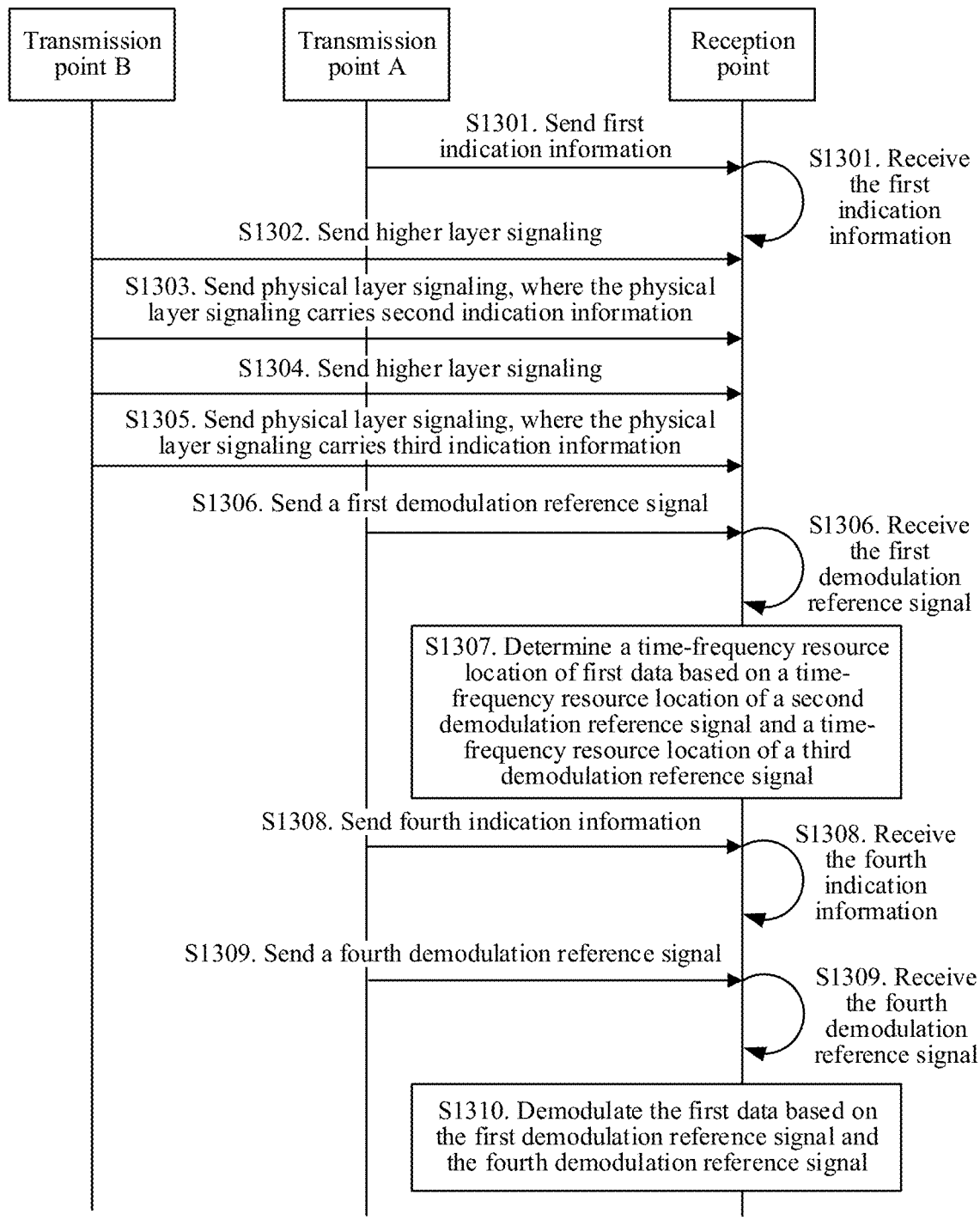
FIG. 15 is a schematic flowchart of another communication method according to still another embodiment of this application.

FIG. 15 is a schematic flowchart of another communication method according to still another embodiment of this application. As shown in FIG. 15, the method includes the following steps.

Step S1301. A transmission point A sends first indication information to a reception point, where the first indication information is used to indicate a time-frequency resource location of a first demodulation reference signal of first data; and the reception point receives the first indication information.

Step S1302. A transmission point B sends higher layer signaling to the reception point, where the higher layer signaling carries related information of a time-frequency resource location of a second demodulation reference signal and an identifier corresponding to the related information.

Step S1303. The transmission point B sends physical layer signaling to the reception point, and the reception point receives second indication information through the physical layer signaling, where the second indication information includes at least one first identifier, and the first identifier corresponds to at least one group of related information of the time-frequency resource location of the second demodulation reference signal.

Step S1304. The transmission point B sends higher layer signaling to the reception point, where the higher layer signaling carries related information of a time-frequency resource location of a third demodulation reference signal and an identifier corresponding to the related information.

Step S1305. The transmission point B sends physical layer signaling to the reception point, and the reception point receives third indication information through the physical layer signaling, where the third indication information includes at least one second identifier, and the second identifier corresponds to at least one group of related information of the time-frequency resource location of the third demodulation reference signal.

Step S1306. The transmission point A sends the first demodulation reference signal to the reception point, and the reception point receives the first demodulation reference signal on the time-frequency resource location of the first demodulation reference signal according to the first indication information.

Step S1307. The reception point determines the time-frequency resource location of the first data based on the time-frequency resource location of the second demodulation reference signal and the time-frequency resource location of the third demodulation reference signal.

Step S1308. The transmission point A sends fourth indication information to the reception point, where the fourth indication information is used to indicate a time-frequency resource location of a fourth demodulation reference signal of first data; and the reception point receives the fourth indication information.

Step S1309. The transmission point A sends the fourth demodulation reference signal to the reception point, and the reception point receives the fourth demodulation reference signal on the time-frequency resource location of the fourth demodulation reference signal according to the fourth indication information.

Step 1310. The reception point demodulates the first data based on the first demodulation reference signal and the fourth demodulation reference signal.

It should be noted that, step S1301 to step S1307 are consistent with step S901 to step S907 in the method shown in FIG. 10. For specific descriptions of step S1301 to step S1307, refer to step S901 to step S907. For brevity, details are not described herein again.

Moreover, step S1308 to step S1310 are consistent with step S1206 to step S1208 in the method shown in FIG. 14. For specific descriptions of step S1308 to step S1310, refer to step S1206 to step S1208. For brevity, details are not described herein again.

In this embodiment of this application, optionally, the transmission point B may send the second demodulation reference signal and the third demodulation reference signal to the reception point, the reception point can receive, according to the second indication information and the third indication information, the second demodulation reference signal on the time-frequency resource location of the second demodulation reference signal and the third demodulation reference signal on the time-frequency resource location of the third demodulation reference signal, and the reception point can determine a time-frequency resource location of second data based on the time-frequency resource location of the first demodulation reference signal. In other words, when determining the time-frequency resource location of the second data, the reception point can exclude the time-frequency resource location of the first demodulation reference signal. To be specific, the reception point may not receive the second data on the time-frequency resource location of the first demodulation reference signal, thereby not affecting receiving of the first demodulation reference signal by the reception point. Moreover, the reception point can demodulate the second data based on the second demodulation reference signal and the third demodulation reference signal.

In this embodiment of this application, optionally, the transmission point B may send the second demodulation reference signal and the third demodulation reference signal to the reception point, the reception point can receive, according to the second indication information and the third indication information, the second demodulation reference signal on the time-frequency resource location of the second demodulation reference signal and the third demodulation reference signal on the time-frequency resource location of the third demodulation reference signal, and the reception point can determine the time-frequency resource location of the second data based on the time-frequency resource location of the first demodulation reference signal and the time-frequency resource location of the fourth demodulation reference signal. In other words, when determining the time-frequency resource location of the second data, the reception point can exclude the time-frequency resource location of the first demodulation reference signal and the time-frequency resource location of the fourth demodulation reference signal. To be specific, the reception point may not receive the second data on the time-frequency resource location of the first demodulation reference signal and the time-frequency resource location of the fourth demodulation reference signal, thereby not affecting receiving of the first demodulation reference signal and the fourth demodulation reference signal by the reception point. Moreover, the reception point can demodulate the second data based on the second demodulation reference signal and the third demodulation reference signal.

It should be noted that, the steps performed in the foregoing method are not specifically limited in this embodiment of this application.

Figure 16:
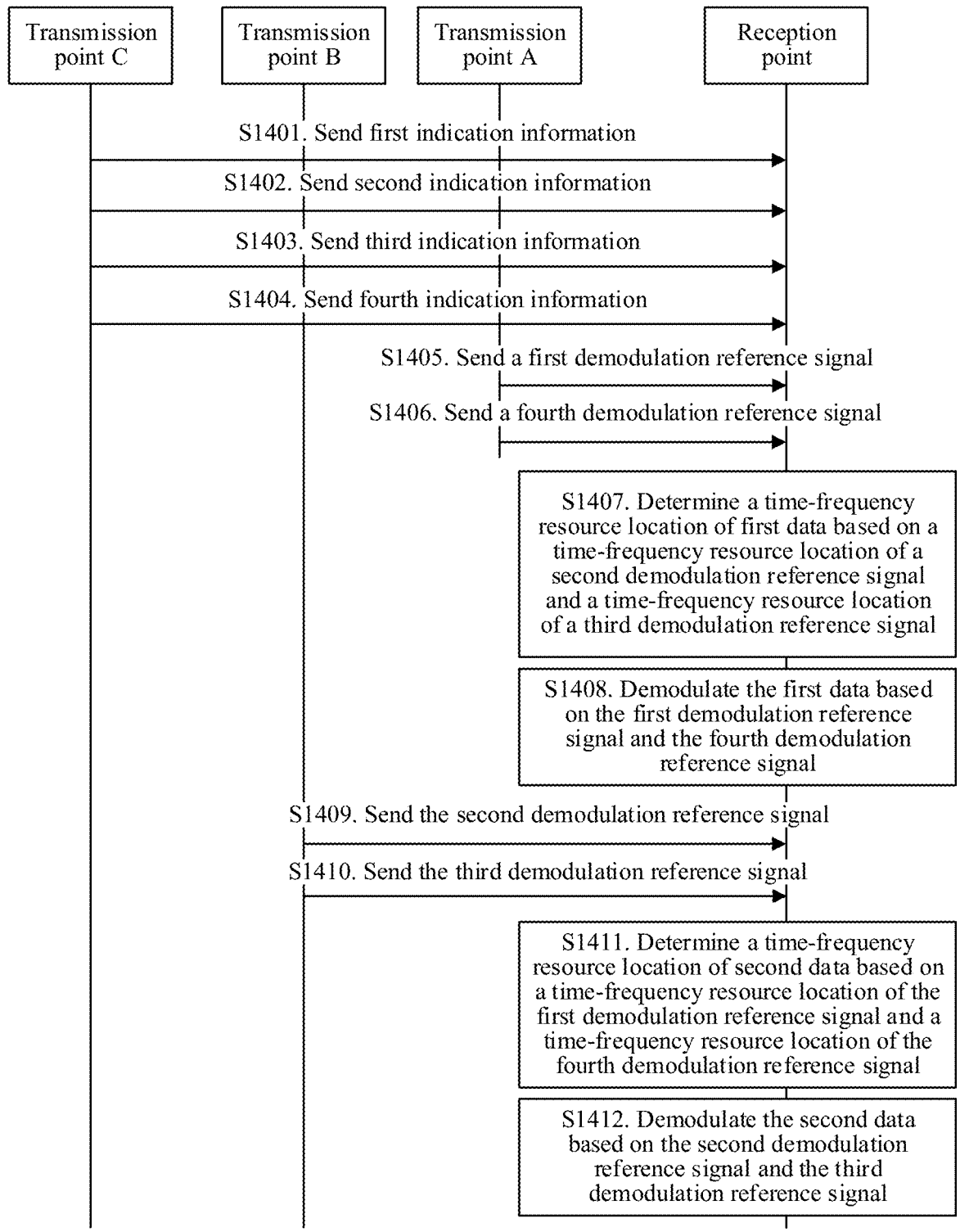
FIG. 16 is a schematic flowchart of still another communication method according to still another embodiment of this application.

FIG. 16 is a schematic flowchart of still another communication method according to still another embodiment of this application. As shown in FIG. 16, the method may include the following steps.

Step S1401. A transmission point C sends first indication information to a reception point, where the first indication information is used to indicate a time-frequency resource location of a first demodulation reference signal of first data that a transmission point A needs to send; and the reception point receives the first indication information.

Step S1402. The transmission point C sends second indication information to the reception point, where the second indication information is used to indicate a time-frequency resource location of a second demodulation reference signal of second data that a transmission point B needs to send; and the reception point receives the second indication information.

Step S1403. The transmission point C sends third indication information to the reception point, where the third indication information is used to indicate a time-frequency resource location of a third demodulation reference signal of the second data that the transmission point B needs to send; and the reception point receives the third indication information.

Step S1404. The transmission point C sends fourth indication information to the reception point, where the fourth indication information is used to indicate a time-frequency resource location of a fourth demodulation reference signal of the first data that the transmission point A needs to send; and the reception point receives the fourth indication information.

Step S1405. The transmission point A sends the first demodulation reference signal to the reception point, and the reception point receives the first demodulation reference signal according to the first indication information.

Step S1406. The transmission point A sends the fourth demodulation reference signal to the reception point, and the reception point receives the fourth demodulation reference signal according to the fourth indication information.

Step S1407. The reception point determines a time-frequency resource location of the first data based on the time-frequency resource location of the second demodulation reference signal and the time-frequency resource location of the third demodulation reference signal.

Step S1408. The reception point demodulates the first data based on the first demodulation reference signal and the fourth demodulation reference signal.

Step S1409. The transmission point B sends the second demodulation reference signal to the reception point, and the reception point receives the second demodulation reference signal according to the second indication information.

Step S1410. The transmission point B sends the third demodulation reference signal to the reception point, and the reception point receives the third demodulation reference signal according to the third indication information.

Step S1411. The reception point determines a time-frequency resource location of the second data based on the time-frequency resource location of the first demodulation reference signal and the time-frequency resource location of the fourth demodulation reference signal.

Step S1412. The reception point demodulates the second data based on the second demodulation reference signal and the third demodulation reference signal.

It should be noted that, step S1401 to step S1403, step S1405, step S1407, step S1409, step S1410, and step S1412 are consistent with step S1001 to step S1005, and step S1007 to step S1010 in the method shown in FIG. 11. For specific descriptions of step S1401 to step S1403, step S1405, step S1407, step S1409, step S1410, and step S1412, refer to step S1001 to step S1005, and step S1007 to step S1010. For brevity, details are not described herein again.

Moreover, step S1404, step S1406, and step S1411 are consistent with step S1206 to step S1208 in the method shown in FIG. 14. For specific descriptions of step S1404, step S1406, and step S1411, refer to step S1206 to step S1208. For brevity, details are not described herein again.

It should be noted that, an order of performing steps is not limited in this embodiment of this application.

Figure 17:
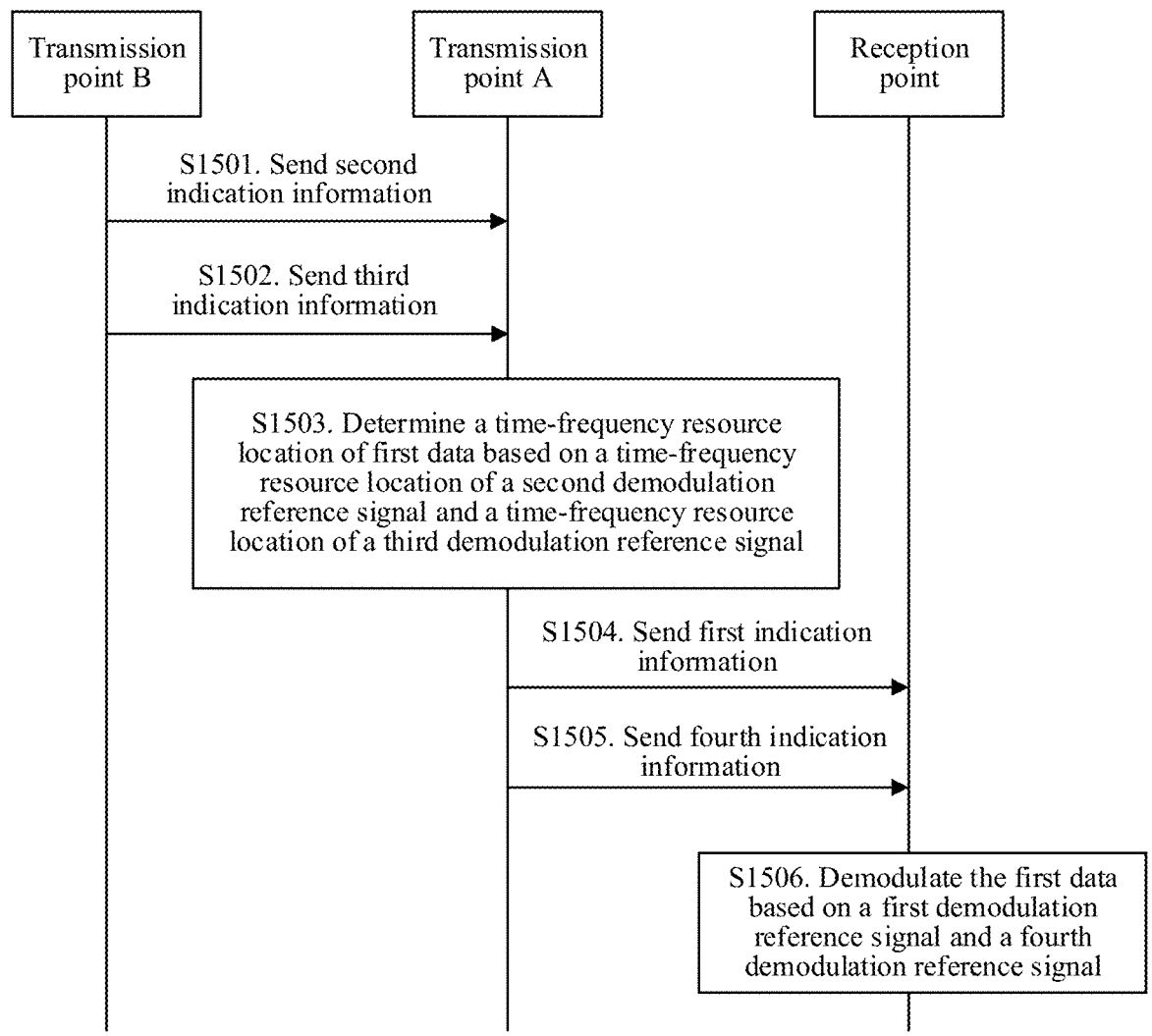
FIG. 17 is a schematic flowchart of still another communication method according to still another embodiment of this application.

FIG. 17 is a schematic flowchart of still another communication method according to still another embodiment of this application. As shown in FIG. 17, the method includes the following steps.

Step S1501. A transmission point B sends second indication information to a transmission point A, where the second indication information is used to indicate a time-frequency resource location of a second demodulation reference signal; and the transmission point A receives the second indication information.

Step S1502. The transmission point B sends third indication information to the transmission point A, where the third indication information is used to indicate a time-frequency resource location of a third demodulation reference signal; and the transmission point A receives the third indication information.

Step S1503. The transmission point A determines the time-frequency resource location of first data based on the time-frequency resource location of the second demodulation reference signal and the time-frequency resource location of the third demodulation reference signal.

Step S1504. The transmission point A sends first indication information to a reception point, where the first indication information is used to indicate a time-frequency resource location of a first demodulation reference signal of the first data; and the reception point receives the first indication information.

Step S1505. The transmission point A sends fourth indication information to the reception point, where the fourth indication information is used to indicate a time-frequency resource location of a fourth demodulation reference signal of the first data; and the reception point receives the fourth indication information.

Step S1506. The reception point demodulates the first data based on the first demodulation reference signal and the fourth demodulation reference signal.

It should be noted that, step S1501 to step S1504 are consistent with step S1101 to step S1104 in the method shown in FIG. 12. For specific descriptions of step S1501 to step S1504, refer to step S1101 to step S1104. For brevity, details are not described herein again.

Moreover, step S1505 and step S1506 are consistent with step S1206 and step S1208 in the method shown in FIG. 14. For specific descriptions of step S1505 and step S1506, refer to step S1206 and step S1208. For brevity, details are not described herein again.

It should be noted that, in this embodiment of this application, in the foregoing methods shown in FIG. 8 to FIG. 17, description is made by using only an example in which the time-frequency resource location of the second demodulation reference signal is indicated through the second indication information and the time-frequency resource location of the third demodulation reference signal is indicated through the third indication information, but the embodiments of this application are not limited thereto. For example, the time-frequency resource location of the second demodulation reference signal and the time-frequency resource location of the third demodulation reference signal may be both indicated through only one piece of indication information.

Optionally, an example in which the second demodulation reference signal is a front loaded DMRS and the third demodulation reference signal is an additional DMRS is used. For example, in higher layer signaling (for example, RRC signaling or MAC signaling), one data mapping indication information identifier corresponds to one or more groups of related information of the time-frequency resource location of the second demodulation reference signal and one or more groups of related information of the time-frequency resource location of the third DMRS. An example of a signaling implementation is as follows:

```
PDSCH-RE-MappingConfig::=         SEQUENCE {
    pdsch-RE-MappingConfigId      identification information of data mapping indication information
    (1):
    front loaded DMRS pattern1         ENUMERATED {pattern 1, pattern 2},
    and/or front loaded DMRS ports1    ENUMERATED {7, 8, 9, 10, 11, 12, 13, 14, spare1};
    front loaded DMRS pattern2         ENUMERATED {pattern 1, pattern 2},
    and/or front loaded DMRS ports2    ENUMERATED {7, 8, 9, 10, 11, 12, 13, 14, spare1};
    additional DMRS pattern1           ENUMERATED {pattern 1, pattern 2},
    and/or additional DMRS ports1      ENUMERATED {7, 8, 9, 10, 11, 12, 13, 14, spare1};
    additional DMRS pattern2           ENUMERATED {pattern 1, pattern 2},
    and/or additional DMRS ports2      ENUMERATED {7, 8, 9, 10, 11, 12, 13, 14, spare1};
    or (2):
    front loaded DMRS port group1      ENUMERATED {group number 1, group number 2, ...};
    front loaded DMRS port group2      ENUMERATED {group number 1, group number 2, ...},
    additional DMRS port group1        ENUMERATED {group number 1, group number 2, ...};
    additional DMRS port group2        ENUMERATED {group number 1, group number 2, ...},
    }
}
```

For the foregoing solution, one data mapping indication information identifier is configured in physical layer signaling (for example, DCI). Based on the one data mapping indication information identifier in the DCI, a terminal device may determine one or more groups of related information of the time-frequency resource location of the second demodulation reference signal, or may simultaneously determine one or more groups of related information of the time-frequency resource location of the second demodulation reference signal and one or more groups of related information of the time-frequency resource location of the third DMRS.

Optionally, the related information of the time-frequency resource location of the second demodulation reference signal and the time-frequency resource location of the third demodulation reference signal may be indicated in the physical layer signaling through a data mapping indication information field. For example, the data mapping indication information field may be "DMRS pattern and/or port(s) for PDSCH RE mapping". DMRS pattern and/or DMRS port information is indicated through a bit value in the field, and a specific signaling example is as follows:

front loaded DMRS pattern and/or port(s) for PDSCH RE mapping additional DMRS pattern and/or port(s) for PDSCH RE mapping Optionally, The transmission point sends a piece of indication information to the reception point, where the indication information may be indication information of data mapping, and the indication information includes information about the antenna port group of the second demodulation reference signal and information about the antenna port group of the third demodulation reference signal. For example, the reception point receives the indication information through DCI signaling. When the reception point receives the indication information, it may be determined that data mapping is not performed, that is, data receiving is not performed on a time-frequency resource location corresponding to a DMRS antenna port in the DMRS antenna port group. For example, the information about the DMRS antenna port group is notified by using one or two bits of information. Details are as follows:

front loaded DMRS port group for PDSCH RE mapping—1 bit or 2 bits; and additional DMRS port group for PDSCH RE mapping—1 bit or 2 bits.

The foregoing methods shown in FIG. 8 to FIG. 12 include a solution in which the transmission point sends the first demodulation reference signal (for example, an example of a front loaded DMRS), the second demodulation reference signal (for example, an example of a front loaded DMRS) and the third demodulation reference signal to the reception point.

It should be noted that, types of the first demodulation reference signal, the second demodulation reference signal, and the third demodulation reference signal in the foregoing methods shown in FIG. 8 to FIG. 12 may be:

The first demodulation reference signal is a front loaded DMRS, the second demodulation reference signal is a front loaded DMRS, and the third demodulation reference signal is an additional DMRS.

The foregoing methods shown in FIG. 14 to FIG. 17 includes a solution in which the transmission point sends the first demodulation reference signal, the second demodulation reference signal, the third demodulation reference signal, and the fourth demodulation reference signal to the reception point.

It should be noted that, types of the first demodulation reference signal, the second demodulation reference signal, the third demodulation reference signal, and the fourth demodulation reference signal in the foregoing methods shown in FIG. 14 to FIG. 17 may be:

The first demodulation reference signal is a front loaded DMRS, the second demodulation reference signal is a front loaded DMRS, the third demodulation reference signal is an additional DMRS, and the fourth demodulation reference signal is an additional DMRS.

It should be further noted that, in this embodiment of this application, a solution in which the transmission point sends the first demodulation reference signal, the second demodulation reference signal, and the fourth demodulation reference signal to the reception point is further included. For specific descriptions of the solution, refer to descriptions of the foregoing solution in which the transmission point sends the first demodulation reference signal, the second demodulation reference signal, and the fourth demodulation reference signal to the reception point in FIG. 14 to FIG. 17. For brevity, details are not described herein again.

When the transmission point sends the first demodulation reference signal, the second demodulation reference signal, and the fourth demodulation reference signal to the reception point, types of the first demodulation reference signal, the second demodulation reference signal, and the fourth demodulation reference signal may be:

The first demodulation reference signal is a front loaded DMRS, the second demodulation reference signal is an additional DMRS, and the fourth demodulation reference signal is an additional DMRS.

It should be noted that, in this embodiment of this application, the time-frequency resource location of the third demodulation reference signal may be indicated through the third indication information, but this application is not limited thereto. The time-frequency resource location of the third demodulation reference signal may be further indicated in another manner. Detailed description is made below.

By way of example, and not limitation, the reception point receives the second demodulation reference signal (for example, an example of a front loaded DMRS) and the third demodulation reference signal (for example, an example of an additional DMRS), where a preset mapping relationship exists between the time-frequency resource location of the second demodulation reference signal and the time-frequency resource location of the third demodulation reference signal.

For example, if the reception point has determined the time-frequency resource location of the second demodulation reference signal, the reception point may determine the time-frequency resource location of the third demodulation reference signal based on the time-frequency resource location of the second demodulation reference signal and the preset mapping relationship.

Specifically, by way of example, and not limitation, the preset mapping relationship existing between the time-frequency resource location of the second demodulation reference signal and the time-frequency resource location of the third demodulation reference signal may be: the time-frequency resource location of the third demodulation reference signal is offset by N symbols (for example, N may be 3) leftward or rightward relative to the time-frequency resource location of the second demodulation reference signal in time domain, and a subcarrier location of the time-frequency resource location of the third demodulation reference signal in frequency domain is not offset relative to the time-frequency resource location of the second demodulation reference signal;

the time-frequency resource location of the third demodulation reference signal is offset by L symbols (for example, L may be 3) leftward or rightward relative to the time-frequency resource location of the second demodulation reference signal in time domain, and a subcarrier location of the time-frequency resource location of the third demodulation reference signal in frequency domain is offset by M subcarriers (for example, M may be 3) upward or downward relative to the time-frequency resource location of the second demodulation reference signal; or related information of the time-frequency resource location of the third demodulation reference signal and related information of the time-frequency resource location of the second demodulation reference signal have a mapping relationship, where related information may indicate, for example, a pattern (DMRS pattern) of a demodulation reference signal and/or an antenna port (DMRS port) of a demodulation reference signal and/or information about a DMRS antenna port group.

Specifically, for example, a pattern of the third demodulation reference signal is the same as a pattern of the second demodulation reference signal; for example, if the pattern of the second demodulation reference signal is a pattern 1, the pattern of third demodulation reference signal is the pattern 1; or for example, if the pattern of the second demodulation reference signal is a pattern 2, the pattern of third demodulation reference signal is the pattern 2;

an antenna port of the third demodulation reference signal is the same as an antenna port of the second demodulation reference signal; for example, if antenna port information of the second demodulation reference signal is ports 7 and 8, antenna port information of the third demodulation reference signal is ports 7 and 8; or for example, if antenna port information of the second demodulation reference signal is ports 9 and 10, antenna port information of the third demodulation reference signal is ports 9 and 10;

antenna port group information of the third demodulation reference signal is the same as antenna port group information of the second demodulation reference signal; for example, if the antenna port group information of the second demodulation reference signal is a group 1, the antenna port group information of the third demodulation reference signal is a group 1; or for example, if the antenna port group information of the second demodulation reference signal is a group 2, the antenna port group information of the third demodulation reference signal is a group 2; or antenna port group information of the third demodulation reference signal is different from antenna port group information of the second demodulation reference signal; for example, if the antenna port group information of the second demodulation reference signal is a group 1, the antenna port group information of the third demodulation reference signal is a group 2; or for example, if the antenna port group information of the second demodulation reference signal is a group 2, the antenna port group information of the third demodulation reference signal is a group 1.

N, L, and M may be integers greater than or equal to 0. For example, a value of N may be 0, 3, 5, 6, or the like; a value of L may be 0, 3, 4, 5, 6, 7, or the like; and a value of M may be 0, 1, 2, 3, or the like. Optionally, the values of N and M may be predefined in a protocol or notified by a base station to a reception point through signaling.

Optionally, a possible value range may be notified to the reception point through higher layer signaling, and then a specific value may be notified to the reception point through another piece of higher layer signaling or physical layer signaling.

For example, a set A and/or B and/or C of possible values of N and/or L and/or M is notified to the reception point through higher layer signaling (for example, RRC signaling), where A may include 3, 5, and the like, B may include 3, 5, and the like, and C may include 1, 2, 3, and the like. A specific value in a set is indicated in higher layer signaling (for example, RRC signaling or MAC signaling) or a physical layer signal (for example, DCI).

If the reception point determines the time-frequency resource location of the second demodulation reference signal, the reception point may determine the time-frequency resource location of the third demodulation reference signal based on the time-frequency resource location of the second demodulation reference signal and the preset mapping relationship.

The mapping relationship may be notified by any transmission point to the reception point through signaling; the mapping relationship may be predefined based on a system; an offset between symbols on time-frequency resource locations of different demodulation reference signals in time domain may be notified by any transmission point to the reception point through signaling, and an offset between subcarriers on time-frequency resource locations of different demodulation reference signals in frequency domain may be predefined based on a system; or an offset between symbols on time-frequency resource locations of different demodulation reference signals in time domain may be predefined based on a system, and an offset between subcarriers on time-frequency resource locations of different demodulation reference signals in frequency domain may be notified by any transmission point to the reception point through signaling.

It should be understood that, description is made above by using only an example in which the reception point determines the time-frequency resource location of the third demodulation reference signal based on the time-frequency resource location of the second demodulation reference signal and the preset mapping relationship; and the reception point may further determine the time-frequency resource location of the second demodulation reference signal based on the time-frequency resource location of the third demodulation reference signal and the preset mapping relationship. This is not particularly limited in this application.

It should be understood that, description is made above by using only an example in which the reception point determines the time-frequency resource location of the third demodulation reference signal based on the time-frequency resource location of the second demodulation reference signal and the preset mapping relationship; and the reception point may further determine the time-frequency resource location of the fourth demodulation reference signal based on the time-frequency resource location of the first demodulation reference signal and the preset mapping relationship. This is not particularly limited in this application.

It should be understood that, description is made above by using only an example in which the reception point determines the time-frequency resource location of the third demodulation reference signal based on the time-frequency resource location of the second demodulation reference signal and the preset mapping relationship; and the reception point may further determine the time-frequency resource location of the first demodulation reference signal based on the time-frequency resource location of the fourth demodulation reference signal and the preset mapping relationship. This is not particularly limited in this application.

By way of example, and not limitation, the reception point (for example, an example of the terminal device) receives the first demodulation reference signal (for example, an example of a front loaded DMRS) sent by the transmission point A (for example, an example of the base station), and the reception point receives the second demodulation reference signal (for example, an example of an additional DMRS) sent by the transmission point B. For different demodulation reference signals (for example, the first demodulation reference signal and the second demodulation reference signal) sent by different transmission points, a time-frequency resource location of one of two different demodulation reference signals may be similarly determined, based on the foregoing mapping relationship, through a time-frequency resource location of the other demodulation reference signal. For brevity, details are not described herein again.

In this embodiment of this application, it is unnecessary for a transmission point to send an additional DMRS to the reception point. The reception point may determine, through the following described method, whether the transmission point sends an additional DMRS.

First, the reception point may determine whether the reception point is currently in a multipoint coordinated transmission mode. Specifically, the reception point may determine, in the following several manners, whether the reception point is currently in the multipoint coordinated transmission mode.

Manner 1: The reception point determines, based on a received configuration quantity of physical downlink control channels (Physical Downlink Control Channel, PDCCH), whether the reception point is currently in the multipoint coordinated transmission mode, and when the configuration quantity of PDCCHs is greater than or equal to 2, the reception point determines that the reception point is currently in the multipoint coordinated transmission mode.

Manner 2: The reception point determines, based on a received configuration quantity of control channel resource sets (Control Resource Set, CORE SET), whether the reception point is currently in the multipoint coordinated transmission mode, and when the quantity configuration of CORESETs is greater than or equal to 2, the reception point determines that the reception point is currently in the multipoint coordinated transmission mode.

Manner 3: The reception point determines, based on a received configuration quantity of DMRS ports, whether the reception point is currently in the multipoint coordinated transmission mode, and when the configuration quantity of DMRS ports is greater than or equal to 2, the reception point determines that the reception point is currently in the multipoint coordinated transmission mode. When the reception point determines that the reception point is currently in the multipoint coordinated transmission mode, the reception point may further determine a transmission point in the multipoint coordinated transmission mode that sends an additional DMRS. Specifically, the reception point may determine, in the following several manners, a transmission point in the multipoint coordinated transmission mode that sends an additional DMRS.

Manner 1: By way of example, and not limitation, the system predefines that none of a plurality of transmission points in the coordinated transmission mode sends an additional DMRS.

Specifically, if the system predefines that none of all the transmission points sends an additional DMRS to the reception point, the reception point does not receive an additional DMRS sent by any transmission point in the multipoint coordinated transmission mode.

Manner 2: By way of example, and not limitation, the system predefines that each of a plurality of transmission points in the coordinated mode sends an additional DMRS; or some of a plurality of transmission points send an additional DMRS.

If the system predefines that all transmission points in the multipoint coordinated transmission mode send additional DMRSs to the reception point, when determining, in any one of the foregoing manner 1 to manner 3, that the reception point is currently in the multipoint coordinated transmission mode, the reception point may determine, based on a transmission mode predefined by the system, to receive the additional DMRSs sent by all the transmission points in the multipoint coordinated transmission mode.

If the system predefines that the transmission point A and the transmission point C in the multipoint coordinated transmission mode send additional DMRSs to the reception point, when determining, in any one of the foregoing manner 1 to manner 3, that the reception point is currently in the multipoint coordinated transmission mode, the reception point may determine, based on a transmission mode predefined by the system, to receive only the additional DMRSs sent by the transmission point A and the transmission point C.

Manner 3: By way of example, and not limitation, the reception point receives signaling sent from a transmission point, where the signaling is used to indicate, to the reception point, a case in which transmission points in the multipoint coordinated transmission mode send additional DMRSs, for example, the signaling indicates, to the reception point, that none of the transmission points sends an additional DMRS to the reception point; the transmission point A and the transmission point B send additional DMRSs to the reception point; or all transmission points send additional DMRSs to the reception point. The reception point determines, based on the signaling, a case in which the transmission points in the multipoint coordinated transmission mode send the additional DMRSs.

Embodiments of this application further provide embodiments of apparatuses for implementing steps and methods in the foregoing method embodiments. The methods, the steps, technical details, technical effects, and the like in the foregoing method embodiments are also applicable to the apparatus embodiments. Details are not described again subsequently.

Figure 18:
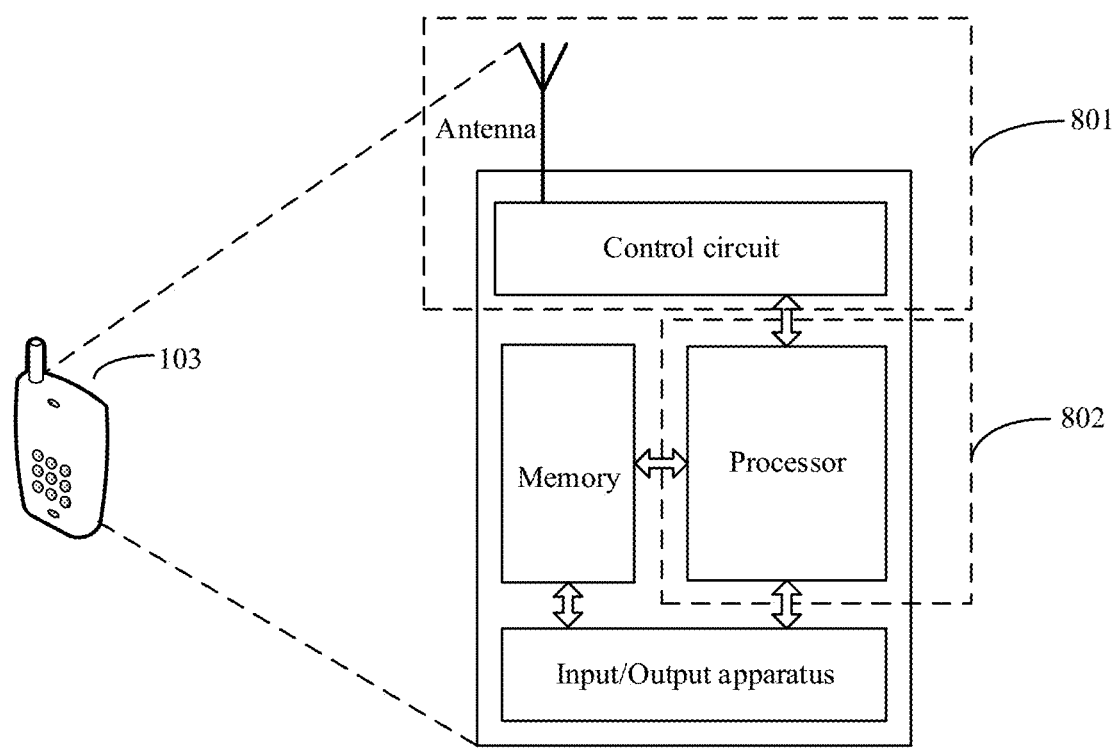
FIG. 18 is a schematic structural diagram of a reception point being a terminal according to an embodiment of this application.

FIG. 18 is a schematic structural diagram of a terminal 103. Herein, a structure of a reception point is described by using an example in which the terminal 103 shown in FIG. 18 is used as a reception point, and the terminal 103 is applicable to the system shown in FIG. 1. For ease of description, FIG. 18 shows only main components of the terminal 103. As shown in FIG. 18, the terminal 103 includes a processor, a memory, a control circuit or an antenna, and an input/output apparatus. The processor is mainly configured to process a communication protocol and communication data, control the entire terminal, execute a software program, and process data of the software program. The memory is mainly configured to store the software program and data, for example, store related information of a demodulation reference signal configured in the higher layer signaling in the foregoing embodiments. The control circuit is mainly configured to: convert a baseband signal and a radio frequency signal, and process the radio frequency signal. The control circuit and the antenna may alternatively be jointly referred to as a transceiver. In this embodiment of this application, the terminal 103 may include one or more groups of antennas, mainly configured to receive and transmit the radio frequency signal in an electromagnetic wave form. The input/output apparatus, for example, a touchscreen, a display screen, or a keyboard, is mainly configured to: receive data entered by a user and output data to the user.

After the terminal 103 is powered on, the processor may read the software program stored in a storage unit, explain and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends the radio frequency signal outward in the electromagnetic wave form through the antenna. When data is sent to the terminal 103, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that for ease of description, FIG. 18 shows only one memory and one processor. A plurality of processors and a plurality of memories may exist in an actual terminal. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to control the entire terminal, execute a software program, and process data of the software program. The processor in FIG. 18 integrates functions of the baseband processor and the central processing unit. A person skilled in the art may understand that the baseband processor and the central processing unit may be respectively independent processors, and are interconnected through technologies such as a bus. A person skilled in the art may understand that the terminal may include a plurality of baseband processors to adapt to different network standards, the terminal may include a plurality of central processing units to enhance a processing capability of the terminal, and components of the terminal may be connected through various buses. The baseband processor may also be referred to as a baseband processing circuit or a baseband processing chip. The central processing unit may also be referred to as a central processing circuit or a central processing chip. A function of processing the communication protocol and the communication data may be built in the processor, or may be stored in the storage unit in a software program form. The processor executes the software program, to implement a baseband processing function.

For example, in this embodiment of this application, the antenna having receiving and sending functions and the control circuit may be regarded as a transceiver unit 801 of the terminal 103, and the processor having a processing function may be regarded as a processing unit 802 of the terminal 103. As shown in FIG. 18, the terminal 103 includes the transceiver unit 801 and the processing unit 802. The transceiver unit may also be referred to as a transceiver, a transceiver machine, a transceiver apparatus, or the like. Optionally, a component configured to implement a receiving function in the transceiver unit 801 may be regarded as a receiving unit, and a component configured to implement a sending function in the transceiver unit 801 may be regarded as a sending unit. To be specific, the transceiver unit 801 includes the receiving unit and the sending unit. For example, the receiving unit may also be referred to as a receiving machine, a receiver, a receiving circuit, or the like. The sending unit may be referred to as a transmitting machine, a transmitter, a transmitting circuit, or the like.

The terminal 103 may be configured to implement a method in the foregoing method embodiments, and specifically the transceiver unit 801 is configured to receive first indication information, where the first indication information is used to indicate a time-frequency resource location of a first demodulation reference signal of first data;

the transceiver unit 801 is configured to receive second indication information, where the second indication information is used to indicate a time-frequency resource location of a second demodulation reference signal; and the processing unit 802 is configured to determine a time-frequency resource location of the first data based on the time-frequency resource location of the second demodulation reference signal, and demodulate the first data based on the first demodulation reference signal.

Optionally, the transceiver unit 801 is further configured to receive higher layer signaling, where the higher layer signaling carries related information of the time-frequency resource location of the second demodulation reference signal and an identifier corresponding to the related information; and the transceiver unit 801 is further configured to receive the second indication information through physical layer signaling, where the second indication information includes at least one first identifier, and the first identifier corresponds to at least one group of related information of the time-frequency resource location of the second demodulation reference signal.

Optionally, the transceiver unit 801 is further configured to receive the second indication information through physical layer signaling, where the second indication information includes related information of the time-frequency resource location of the second demodulation reference signal.

Optionally, the processing unit 802 is further configured to determine, based on the time-frequency resource location of the second demodulation reference signal, a time-frequency resource location of data that is related to the time-frequency resource location of the second demodulation reference signal and that is in the first data, where the data related to the time-frequency resource location of the second demodulation reference signal includes at least one of a code word included in the first data, data of a layer corresponding to the code word included in the first data, and antenna port data that corresponds to a layer and that is included in the first data.

Optionally, the transceiver unit 801 is further configured to receive third indication information, where the third indication information is used to indicate a time-frequency resource location of a third demodulation reference signal of the first data; and the processing unit 802 is further configured to determine the time-frequency resource location of the first data based on the time-frequency resource location of the second demodulation reference signal and the time-frequency resource location of the third demodulation reference signal.

Optionally, the transceiver unit 801 is further configured to receive fourth indication information, where the fourth indication information is used to indicate a time-frequency resource location of a fourth demodulation reference signal of the first data; and the processing unit 802 is further configured to demodulate the first data based on the first demodulation reference signal and the fourth demodulation reference signal.

Figure 19:
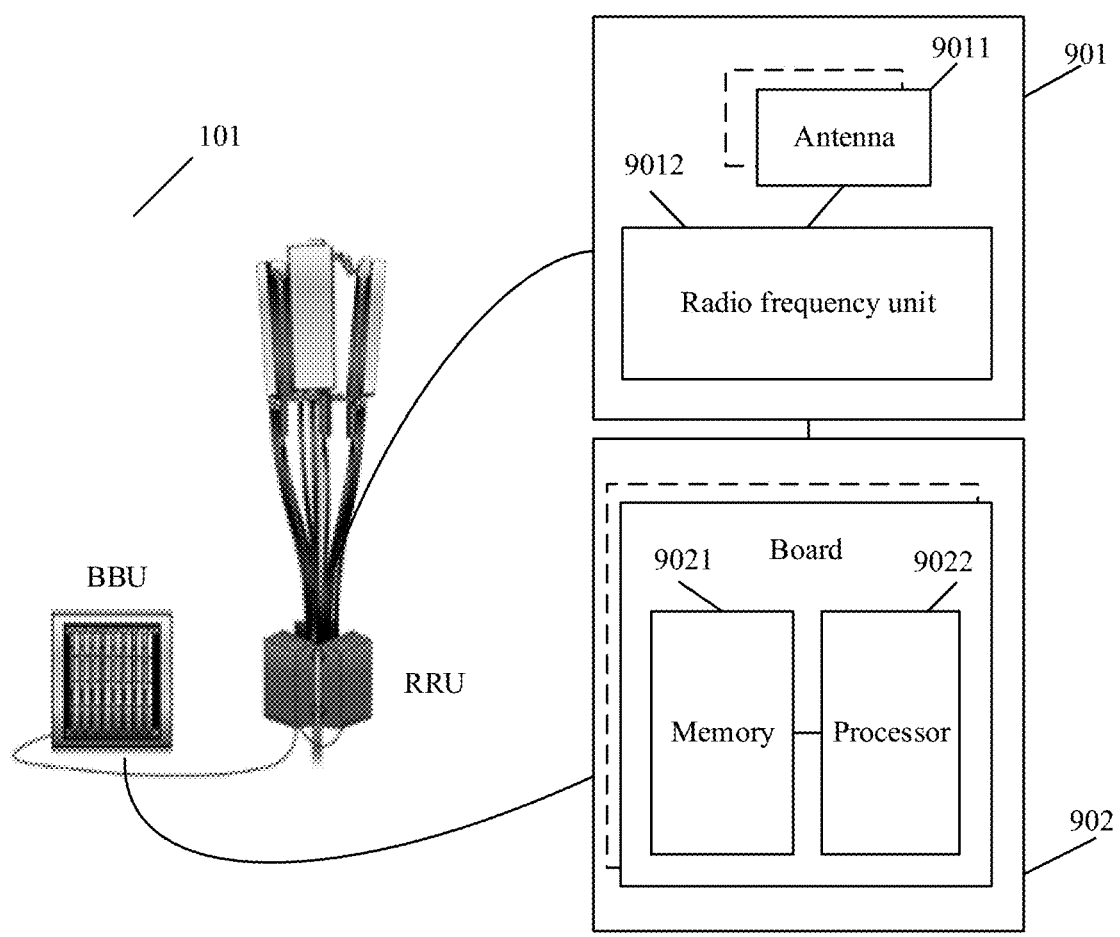
FIG. 19 is a schematic structural diagram of a transmission point being a network device according to an embodiment of this application.

FIG. 19 is a schematic structural diagram of a network device. Herein, a structure of a transmission point is described by using an example in which the network device shown in FIG. 19 is used as a transmission point. For a structure of each of a first transmission point and a second transmission point, refer to a structure of the network device shown in FIG. 19. The network device may be applied to the system shown in FIG. 1. For a structure of each of the network devices 101-A to 101-D in the system shown in FIG. 1, refer to the structure of the network device shown in FIG. 19. As shown in FIG. 19, the network device 101 includes one or more remote radio units (remote radio unit, RRU) 901 and one or more baseband units (baseband unit, BBU) 902. The RRU 901 may be referred to as a transceiver unit, a transceiver machine, a transceiver circuit, a transceiver, or the like, and may include at least one antenna 9011 and a radio frequency unit 9012. The RRU 901 is mainly configured to receive and transmit a radio frequency signal and convert the radio frequency signal into a baseband signal, for example, configured to send a signaling indication or a reference signal in the foregoing embodiments to a terminal. The BBU 902 is mainly configured to perform baseband processing, control the network device, and the like. The RRU 901 and the BBU 902 may be physically disposed together, or may be physically separately disposed, that is, a distributed base station.

The BBU 902 is a control center of the network device, may also be referred to as a processing unit, and is mainly configured to complete a baseband processing function such as channel encoding, multiplexing, modulation, or spreading. In an example, the BBU 902 may include one or more boards, and a plurality of boards may jointly support a radio access network (for example, a 5G network) of an undiversified access standard, or may support radio access networks of different access standards respectively. The BBU 902 further includes a memory 9021 and a processor 9022. The memory 9021 is configured to store a necessary instruction and necessary data. The processor 9022 is configured to control the network device to perform a necessary action. The memory 9021 and the processor 9022 may serve one or more boards. In other words, the memory and the processor may be disposed individually on each board. Alternatively, a plurality of boards may share the same memory and the same processor. In addition, a necessary circuit is disposed on each board.

The foregoing network device may be configured to implement a method of the method embodiments that is performed by the foregoing first transmission point, and specifically the processor is configured to determine a time-frequency resource location of first data based on a time-frequency resource location of a second demodulation reference signal; and the transceiver is configured to send first indication information to a reception point, where the first indication information is used to indicate a time-frequency resource location of a first demodulation reference signal of the first data.

The foregoing network device may also be configured to implement a method of the method embodiments that is performed by the foregoing second transmission point, and specifically the transceiver is configured to send second indication information to a reception point, where the second indication information is used to indicate a time-frequency resource location of a second demodulation reference signal.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A communication method, comprising:

receiving, by a reception point, first indication information, wherein the first indication information is used to indicate a time-frequency resource location of a first demodulation reference signal of first data;

receiving, by the reception point, second indication information, wherein the second indication information is used to indicate a time-frequency resource location of a second demodulation reference signal; and determining, by the reception point, a time-frequency resource location of the first data based on the time-frequency resource location of the second demodulation reference signal, and demodulating the first data based on the first demodulation reference signal.

2. The method according to claim 1, wherein that the second indication information is used to indicate a time-frequency resource location of a second demodulation reference signal comprises:

the second indication information is used to indicate a time-frequency resource location of a second demodulation reference signal of second data, and the second demodulation reference signal is used to demodulate the second data.

3. The method according to claim 2, wherein the first data and the first demodulation reference signal are sent by a first transmission point, the second data and the second demodulation reference signal are sent by a second transmission point, and the first transmission point and the second transmission point are in a coordination relationship.

4. The method according to claim 1, further comprising:

receiving, by the reception point, higher layer signaling, wherein the higher layer signaling carries related information of the time-frequency resource location of the second demodulation reference signal and an identifier corresponding to the related information; and wherein the receiving, by the reception point, second indication information comprises:
   receiving, by the reception point, the second indication information through physical layer signaling, wherein the second indication information comprises at least one first identifier, and the first identifier corresponds to at least one group of related information of the time-frequency resource location of the second demodulation reference signal.

5. The method according to claim 1, wherein the receiving, by the reception point, second indication information comprises:
   receiving, by the reception point, the second indication information through physical layer signaling, wherein the second indication information comprises related information of the time-frequency resource location of the second demodulation reference signal.

6. The method according to claim 1, wherein the determining, by the reception point, a time-frequency resource location of the first data based on the time-frequency resource location of the second demodulation reference signal comprises:
   determining, by the reception point based on the time-frequency resource location of the second demodulation reference signal, a time-frequency resource location of data that is related to the time-frequency resource location of the second demodulation reference signal and that is in the first data, wherein the data related to the time-frequency resource location of the second demodulation reference signal comprises at least one of a code word comprised in the first data, data of a layer corresponding to the code word comprised in the first data, or antenna port data that corresponds to a layer and that is comprised in the first data.

7. The method according to claim 4, wherein the related information of the time-frequency resource location of the second demodulation reference signal comprises at least one of a pattern of the second demodulation reference signal or antenna port information related to the second demodulation reference signal, and the antenna port information comprises at least one of a port number of an antenna port or a quantity of antenna ports.

8. A reception point, comprising a transceiver and a processor, wherein
   the transceiver is configured to receive first indication information, wherein the first indication information is used to indicate a time-frequency resource location of a first demodulation reference signal of first data;
   the transceiver is configured to receive second indication information, wherein the second indication information is used to indicate a time-frequency resource location of a second demodulation reference signal; and
   the processor is configured to determine a time-frequency resource location of the first data based on the time-frequency resource location of the second demodulation reference signal, and demodulate the first data based on the first demodulation reference signal.

9. The reception point according to claim 8, wherein that the second indication information is used to indicate a time-frequency resource location of a second demodulation reference signal comprises:
   the second indication information is used to indicate a time-frequency resource location of a second demodulation reference signal of second data, and the second demodulation reference signal is used to demodulate the second data.

10. The reception point according to claim 9, wherein the first data and the first demodulation reference signal are sent by a first transmission point, the second data and the second demodulation reference signal are sent by a second transmission point, and the first transmission point and the second transmission point are in a coordination relationship.

11. The reception point according to claim 8, wherein
   the transceiver is configured to receive higher layer signaling, wherein the higher layer signaling carries related information of the time-frequency resource location of the second demodulation reference signal and an identifier corresponding to the related information; and
   the transceiver is configured to receive the second indication information through physical layer signaling, wherein the second indication information comprises at least one first identifier, and the first identifier corresponds to at least one group of related information of the time-frequency resource location of the second demodulation reference signal.

12. The reception point according to claim 8, wherein
   the transceiver is configured to receive the second indication information through physical layer signaling, wherein the second indication information comprises related information of the time-frequency resource location of the second demodulation reference signal.

13. The reception point according to claim 8, wherein
   the processor is configured to determine, based on the time-frequency resource location of the second demodulation reference signal, a time-frequency resource location of data that is related to the time-frequency resource location of the second demodulation reference signal and that is in the first data, wherein the data related to the time-frequency resource location of the second demodulation reference signal comprises at least one of a code word comprised in the first data, data of a layer corresponding to the code word comprised in the first data, or antenna port data that corresponds to a layer and that is comprised in the first data.

14. The reception point according to claim 11, wherein the related information of the time-frequency resource location of the second demodulation reference signal comprises at least one of a pattern of the second demodulation reference signal or antenna port information related to the second demodulation reference signal, and the antenna port information comprises at least one of a port number of an antenna port or a quantity of antenna ports.

15. A first transmission point, comprising a transceiver and a processor, wherein
   the processor is configured to determine a time-frequency resource location of first data based on a time-frequency resource location of a second demodulation reference signal; and
   the transceiver is configured to send first indication information to a reception point, wherein the first indication information is used to indicate a time-frequency resource location of a first demodulation reference signal of the first data.

16. The first transmission point according to claim 15, wherein the transceiver is further configured to:
   receive second indication information sent by a second transmission point, wherein the second indication information is used to indicate the time-frequency resource location of the second demodulation reference signal.

17. The first transmission point according to claim 16, wherein the transceiver is configured to receive third indication information sent by the second transmission point, wherein the third indication information is used to indicate a time-frequency resource location of a third demodulation reference signal.

18. The first transmission point according to claim 17, wherein the processor is configured to determine the time-frequency resource location of the first data based on the time-frequency resource location of the second demodulation reference signal and the time-frequency resource location of the third demodulation reference signal.

19. The first transmission point according to claim 15, wherein the transceiver is configured to send fourth indication information to the reception point, wherein the fourth indication information is used to indicate a time-frequency resource location of a fourth demodulation reference signal of fourth data.

\* \* \* \* \*